United States Patent
Ishikawa et al.

(10) Patent No.: US 6,747,745 B2
(45) Date of Patent: Jun. 8, 2004

(54) DISPLACEMENT SENSOR

(75) Inventors: Nobuharu Ishikawa, Kyoto (JP); Yoshihiro Yamashita, Kyoto (JP); Hirotaka Nakashima, Kyoto (JP); Masahiro Kawachi, Kyoto (JP); Koji Shimada, Kyoto (JP); Hitoshi Oba, Kyoto (JP)

(73) Assignee: Omron Corporation, Kyoto (JP)

( * ) Notice: Subject to any disclaimer, the term of this patent is extended or adjusted under 35 U.S.C. 154(b) by 183 days.

(21) Appl. No.: 09/980,310

(22) PCT Filed: Apr. 2, 2001

(86) PCT No.: PCT/JP01/02860
§ 371 (c)(1),
(2), (4) Date: Nov. 30, 2001

(87) PCT Pub. No.: WO01/73375
PCT Pub. Date: Oct. 4, 2001

(65) Prior Publication Data
US 2003/0067613 A1 Apr. 10, 2003

(30) Foreign Application Priority Data
Mar. 31, 2000 (JP) .......................... 2000-136413
Jan. 23, 2001 (JP) .......................... 2001-015125

(51) Int. Cl.⁷ .............................................. G01B 11/14
(52) U.S. Cl. .................................. 356/614; 250/559.31
(58) Field of Search ............................... 356/614–624, 356/3.01–3.22, 399–401; 250/201.6, 559.38, 559.31

(56) References Cited

U.S. PATENT DOCUMENTS 4,897,536 A * 1/1990 Miyoshi .................. 250/201.6
5,583,602 A * 12/1996 Yamamoto ................. 396/133
6,215,959 B1 * 4/2001 Mori et al. ................. 396/91

FOREIGN PATENT DOCUMENTS

JP   63-122211    8/1988
JP   03-237311    10/1991
JP   2001-108418  4/2001

* cited by examiner

Primary Examiner—Richard A. Rosenberger
Assistant Examiner—Vincent P. Barth
(74) Attorney, Agent, or Firm—Foley & Lardner LLP

(57) ABSTRACT

In a displacement sensor (10) comprising a sensor head (1) and a controller (2) either integrally or separately, the sensor head comprises a measurement light emitting optical system (113), an image acquiring optical system (127a, 127b) and a two dimensional imaging device (122). The controller can control the imaging condition associated with the brightness of the image in the form of a video signal both under a measurement mode and an observation mode. Under the measurement mode, with a light source (112) for measurement turned on, the imaging condition is adjusted in such a manner that a measurement light radiated light image (83) can be imaged at an appropriate brightness but a surrounding part (71) of the measurement object is substantially darker than the appropriate brightness, and a desired displacement is computed according the video signal obtained by the two dimensional imaging device (122). Under the observation mode, the imaging condition is adjusted in such a manner that the measurement position and the surrounding part of the measurement object can be imaged both at an appropriate brightness, and an image of the measurement position of the surface of the measurement object and the surrounding region (71) is displayed on the screen of an image monitor (4) according the video signal obtained by the two dimensional imaging device (122).

31 Claims, 44 Drawing Sheets

A view showing the internal structure of the sensor head unit

An overall external view of a displacement sensor system embodying the present invention A block diagram showing the internal functional structure of the controller unit A general flow chart showing the outline of
the displacement measurement process of the controller unit Fig.6
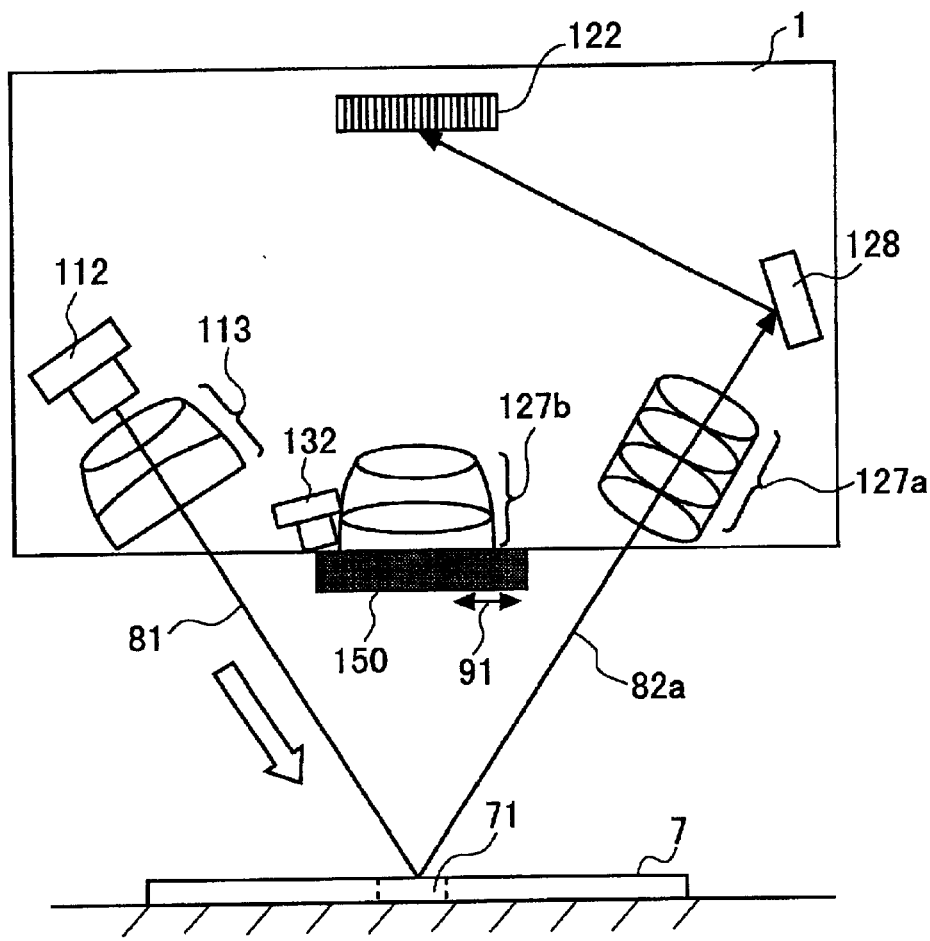
(a) diagram illustrating the measurement mode of the displacement sensor of the present invention
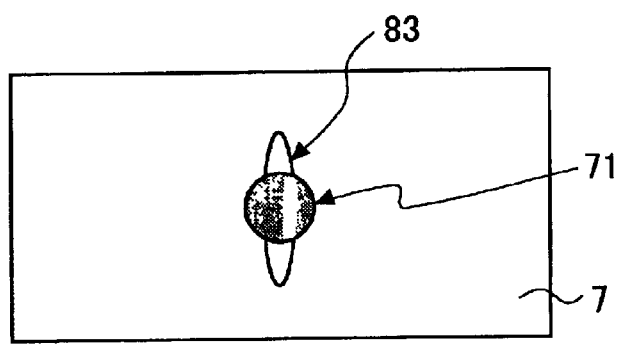
(b) view of the upper surface of the measurement object seen from above
A diagram illustrating the action of the displacement sensor of the present invention under the measurement mode A diagram illustrating the image
captured by the CCD in the sensor head unit A diagram illustrating the measurement point extraction process in the measurement range A diagram showing the relationship between the image captured by the CCD and the line bright waveform A diagram showing the method of determining a threshold value (a) centroid mode (b) edge center mode (c) half edge mode A diagram showing the process of extracting measurement point coordinates A diagram showing an exemplary monitor screen when the displacement sensor of the present invention is under the measurement mode A diagram showing the change in the received light path in the displacement sensor of the present invention when the measurement object moves vertically Fig.15
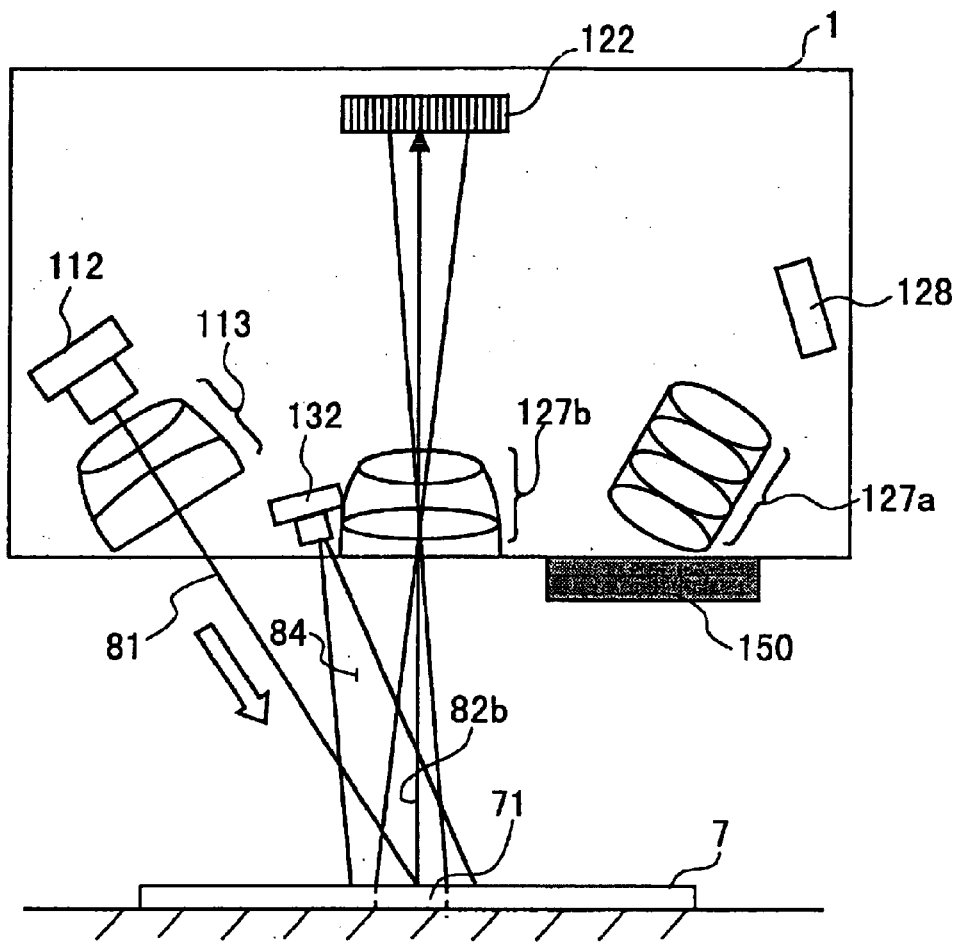
(a) diagram illustrating the observation mode of the displacement sensor of the present invention
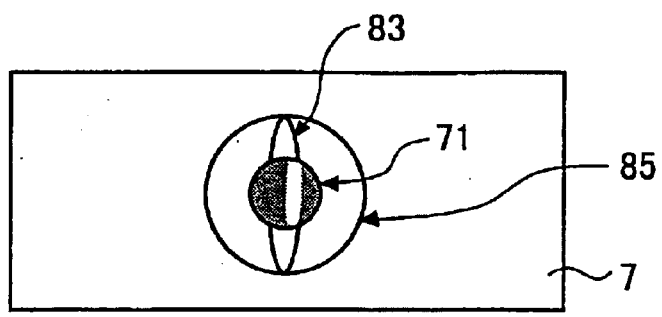
(b) view of the upper surface of the measurement object seen from above
A diagram showing the operation of the displacement sensor of the present invention under the ~~measurement~~ observation mode

Fig.16
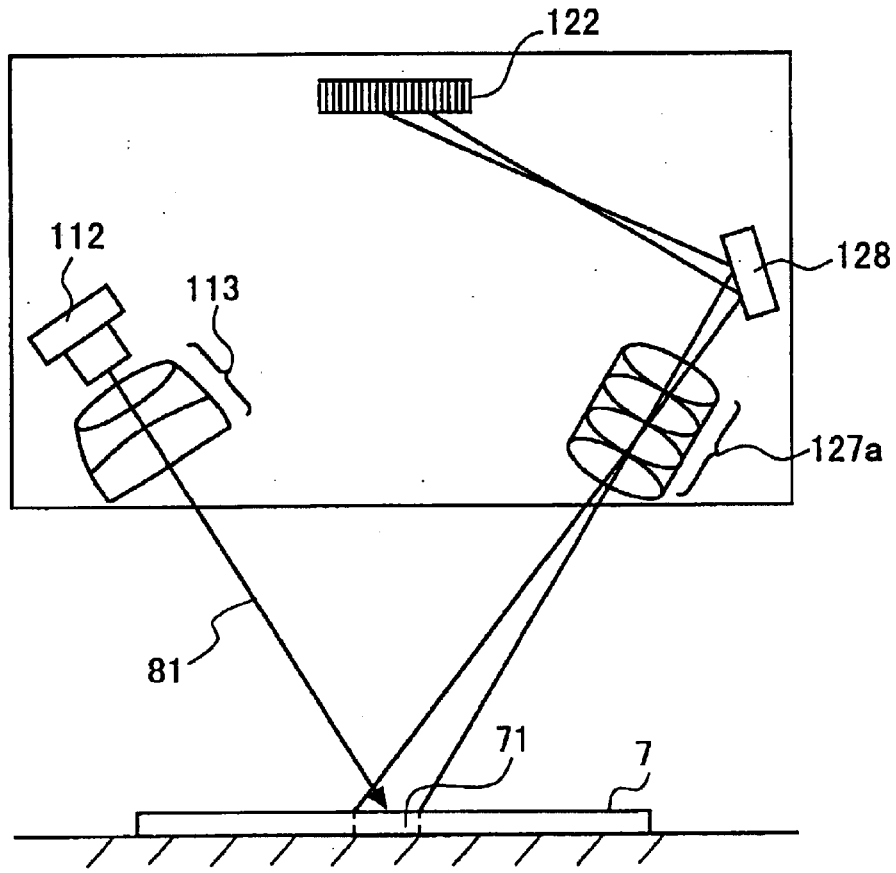
(a) diagram illustrating the observation mode using the measurement light path
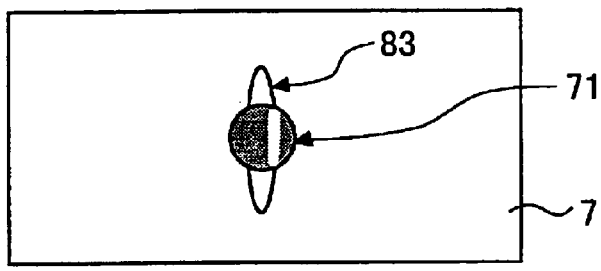
(b) view of the upper surface of the measurement object seen from above
A diagram showing the operation of the displacement sensor of the present invention under the observation mode using the measurement light path

Fig. 17

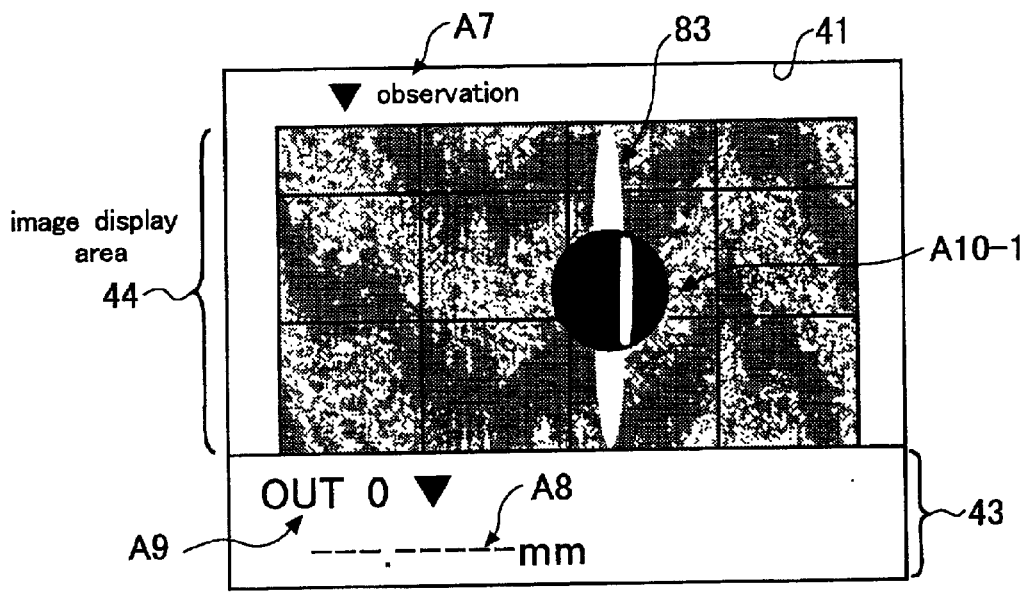

(a) diagram showing an exemplary monitor screen of the displacement sensor of the present invention under the observation mode

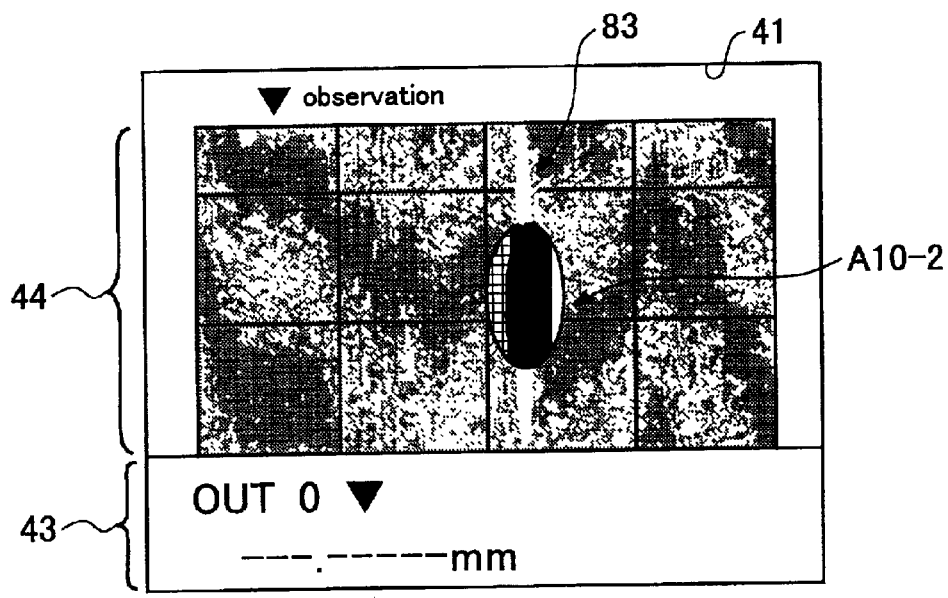

(b) diagram illustrating the observation mode using the measurement light path

A diagram comparing the monitor screens of the displacement sensor of the present invention and a conventional displacement sensor both under the observation mode A view showing a modified embodiment of the sensor head of the present invention A view showing the interior
of the sensor head unit opening a side of the case

*Fig.20*
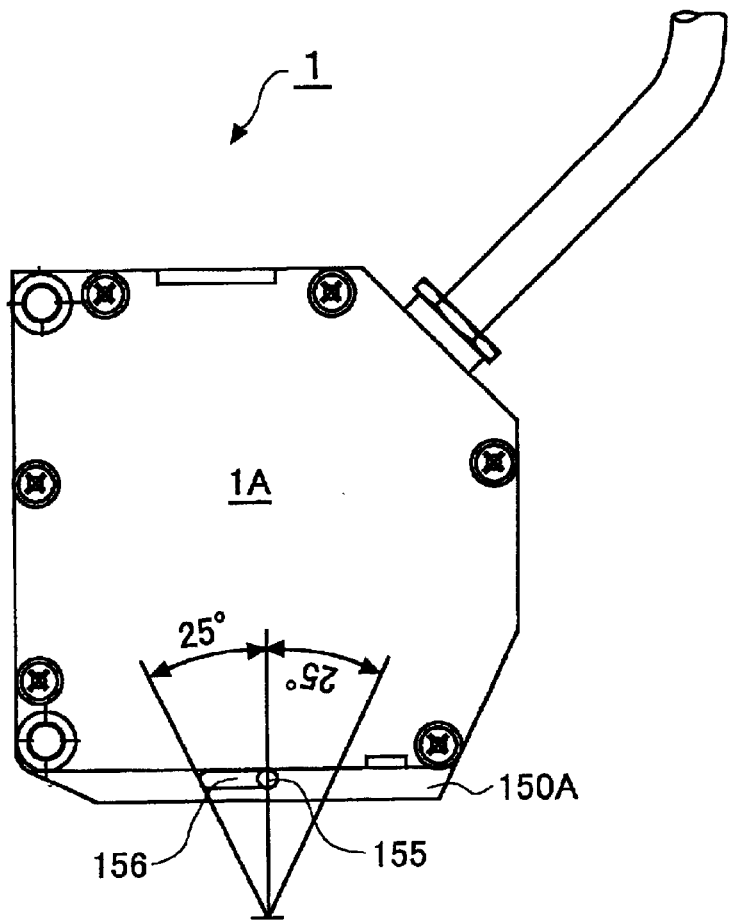
(a) side view
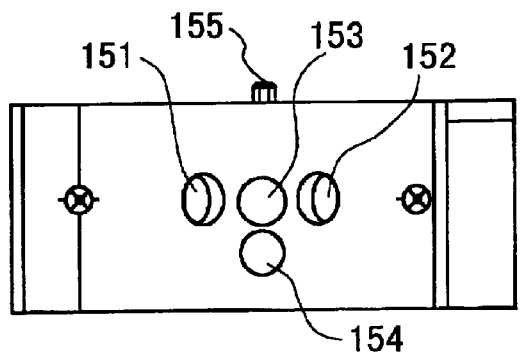
(b) bottom view
A view explaining the structure
of the sensor unit case provided with a shutter unit

*Fig.21*
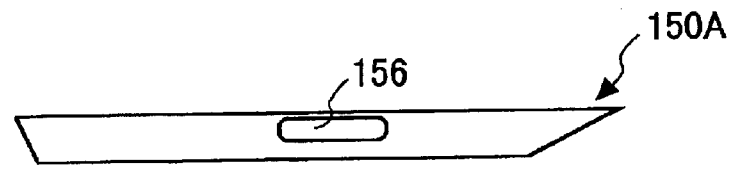
(a) front view
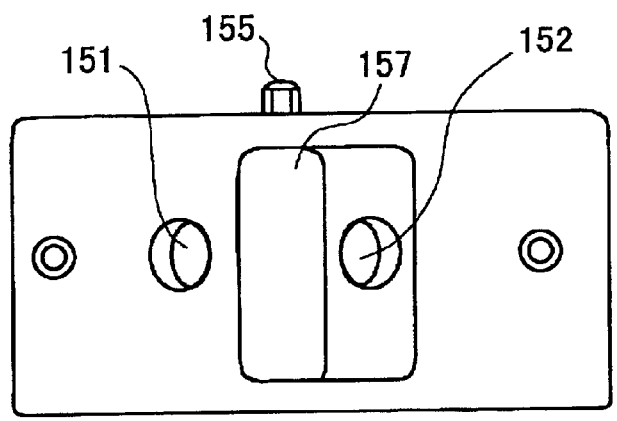
(b) top view
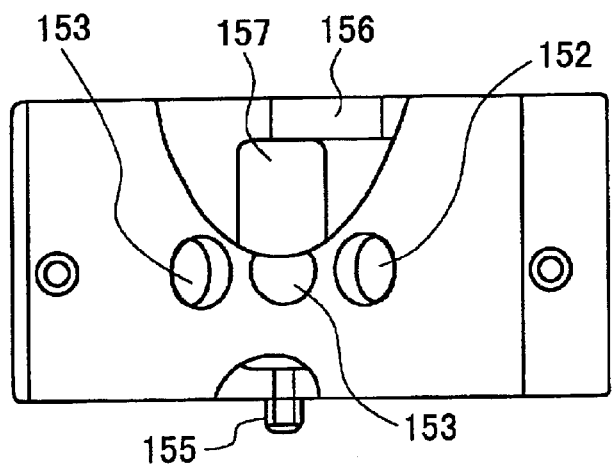
(c) bottom view
A view explaining the structure of the shutter unit A view showing the operation of the measurement laser, LED for illumination and CCD both under the measurement mode and observation mode for comparison A block diagram showing the electric structure of the displacement sensor of the present invention A diagram showing the optical system of the sensor head of the displacement sensor of the present invention A time chart showing the process of superimposing a slit light image and a work surface image Fig.27
(a) slit light image
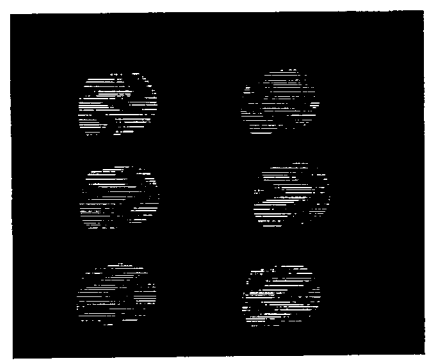
(b) work surface image
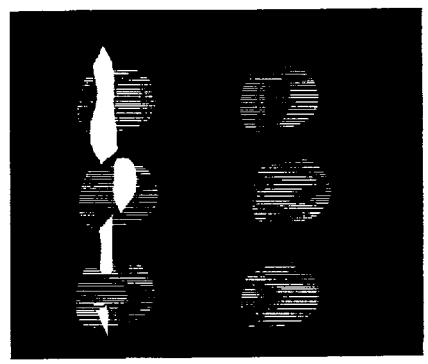
(c) superimposed image
Views showing exemplary monitor images A time chart showing the process of superimposing a slit light image and a work surface image A diagram showing the relationship between the photosensitive pixel region and optically black pixel region of the imaging device used in the imaging unit of the present invention in an actual aspect ratio A diagram showing the internal structure of the transfer pulse generating unit A time chart showing the output mode of the transfer pulse (TP2)

*Fig.36*

| horizontal interval counter value | L2 | L1 | OE |
|---|---|---|---|
| 1 | 1 | 1 | 0 |
| 2 | 1 | 0 | 1 |
| ⋮ | ⋮ | ⋮ | ⋮ |
| 31 | 1 | 0 | 1 |

A diagram showing the content of the transfer protocol table

*Fig.37*

| L1 | L2 | transfer line number |
|----|----|----|
| 0 | 0 | 1 |
| 1 | 0 | 2 |
| 0 | 1 | 4 |
| 1 | 1 | 7 |

(a) relationship between the states of L1 and L2 and the transfer line number

| OE | TP3 output |
|----|----|
| 0 | no |
| 1 | yes |

(b) relationship between the state of OE and the TP3 output

A diagram showing the contents of L1, L2 and OE

A flow chart showing the operation of the transfer control unit

A time chart showing an exemplary drive mode of the imaging device

A view showing a part of the time chart of Figure 39

A view showing a part of the time chart of Figure 39

*Fig.42*

| output line number | contents |
|---|---|
| 1 | empty (no output) |
| 2 | sum of 9 horizontal lines 1 to 9 |
| 3 | sum of 2 horizontal lines 10 and 11 |
| ⋮ | ⋮ |
| 31 | sum of 2 horizontal lines 66 and 67 |

Rows 1–2: ineffective image
Rows 3–31: effective image

A diagram showing the data structure of a single frame in an exemplary drive mode of the imaging device as a table Fig.43
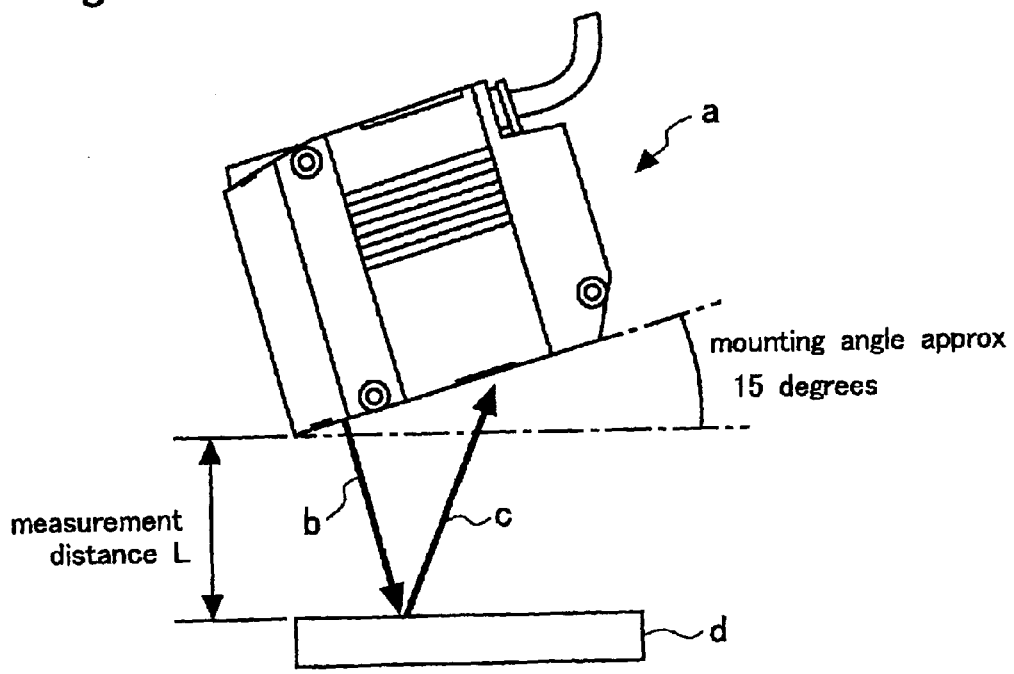
(a) light path for regular reflective surface object
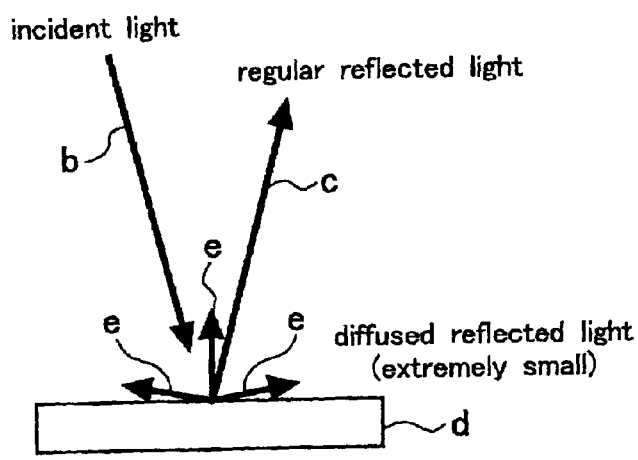
(b) mode of regular reflection
A diagram illustrating the optical system
of the displacement sensor for regular reflective objects

Fig.44
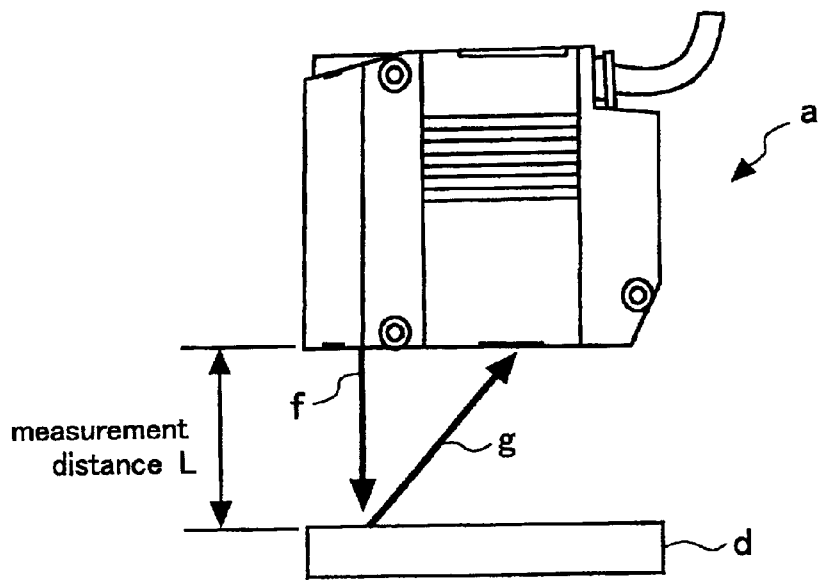
(a) light path for irregular reflective surface object
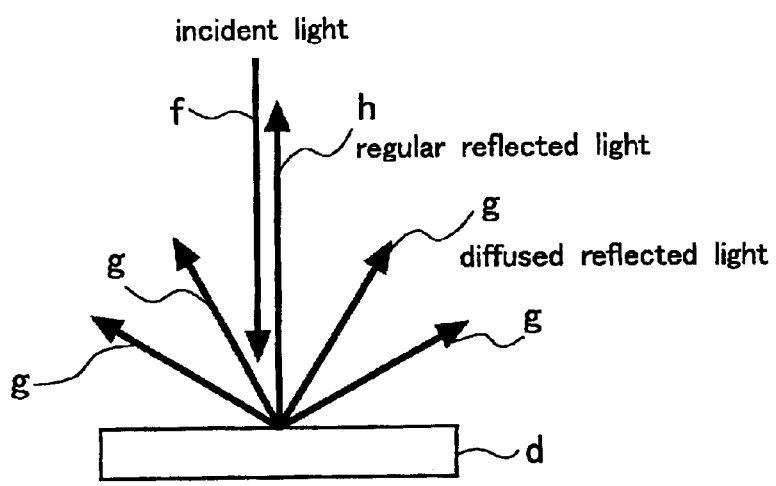
(b) mode of irregular reflection
A diagram illustrating the optical system of the displacement sensor for irregular reflective objects

DISPLACEMENT SENSOR

TECHNICAL FIELD

The present invention relates to an optical displacement sensor for measuring a displacement such as a length of a measurement object according to a light section method, triangulation or the like, and in particular to an optical displacement sensor which allows the state of the surface of the measurement object to be observed on the screen of a video monitor.

BACKGROUND OF THE INVENTION

Two examples of sensor units for such optical displacement sensors are shown in FIG. 43 (regular reflection surface type) and FIG. 44 (irregular reflection surface type).

Referring to FIG. 43, a denotes a sensor head unit, b denotes measurement light (a red laser beam having a circular cross section or a linear cross section, for instance) which is emitted from the sensor head unit mounted at a prescribed position and impinged obliquely downward onto a measurement object, c denotes measurement light which is reflected by the surface of the measurement object and advances obliquely upward onto the sensor head unit, d denotes the measurement object of a regular reflection surface type such as a glass plate or a metallic plate having a smooth surface, and e denotes diffused reflected light produced by the reflection of the measurement light by the surface of the measurement object. The light axis of the measurement light exiting from the unit a and the light axis of the incident measurement light c directed to the unit a are arranged symmetric to each other at a same inclination angle.

Referring to FIG. 44, a denotes a sensor head unit, d denotes a measurement object of a irregular reflection surface type, f denotes measurement light (a red laser beam having a circular cross section or a linear cross section, for instance) which is emitted from the sensor head unit vertically downward onto the measurement object, g denotes measurement light which is reflected by the surface of the measurement object and advances obliquely upward onto the sensor head unit, and h denotes diffused reflected light produced by the reflection of the measurement light by the surface of the measurement object.

The reflected measurement light c and g received by the sensor head unit forms an image on the light receiving surface of the imaging device (such as a one dimensional CCD and a two dimensional CCD) via a light receiving optical system (such as a lens assembly), and is converted into a video signal including the radiated light image (a bright spot or line) of the measurement light by using the photoelectric conversion capability of the imaging device. The video signal thus obtained is forwarded to a controller unit now shown in the drawing, and is used for a computation for displacement measurement based on triangulation.

To accurately measure a displacement (such as a displacement in the vertical direction) of a desired position on the measurement object, it is necessary to coincide the radiated position of the measurement light b and f with the measurement position in a highly accurate manner. When the measurement light consists of visible laser light (such as red laser light), the registration between the measurement position and the radiated position of measurement light can be accomplished by moving the radiated light image of the measurement light to the desired measurement position while visually observing the radiated light image.

However, such conventional displacement sensors are known to have a number of problems.

(1) When the measurement has surface irregularities, the work of adjusting the radiated position of the measurement light right onto the measurement point, and the work of verifying that the measurement light is accurately radiating upon the measurement point involve some difficulty when performed with a direction observation using the naked eye.

(2) In FIGS. 43 and 44, if the measurement distance L which is a displacement measurement range is short, and the sensor head unit a and the measurement object are close to each other, because the sensor head unit a closely covers the measurement position from above, the field of view of the operator is obstructed by the sensor head unit a, and the operator experiences a difficulty in viewing the radiated light image of the measurement light, and is unable to properly carry out the work of achieving a registration between the measurement position and the radiated position of measurement light.

(3) Displacement sensors using a conventional two dimensional imaging device include those allowing the illuminated light image of the measurement light captured by the two dimensional imaging device to be displayed on an image monitor. However, the illuminated light image of the measurement light shows itself far brighter than the surrounding surface of the measurement object. This is because the intensity of the measurement light, the lighting timing of the measurement light and the shutter timing of the two dimensional imaging device are determined in such a manner that the illuminated light image of the measurement light is appropriately imaged but the surrounding surface of the measurement object appears substantially darker in comparison because the image of the shape and pattern of the surface of the measurement object surrounding the measurement point should not interfere with the measurement. Therefore, even though the image monitor allows the radiated light image of the measurement light to be observed, but because the surrounding surface of the measurement object is not shown on the screen, it is not possible to verify the positional relationship between the radiated light image and the surface of the measurement object on the image monitor.

The present invention was made in view of such problems, and its primary object is to provide a displacement sensor which allows the positional relationship between the radiated light image and the surface of the measurement object to be verified on the image monitor, and component technology to such a displacement sensor.

These and other objects, and advantages of the present invention will become apparent to a person skilled in the art in view of the following description.

BRIEF SUMMARY OF THE INVENTION

The sensor head of the present invention may have a sensor head and a controller either integrally or separately. The term "integral" as used herein means that the sensor head unit and the controller unit are accommodated in a common housing. The term "separately" as used herein means that the sensor head unit and the controller unit are accommodated in separate housings. As for the image monitor, it may be provided with a separate housing or may also be accommodated in the housing of the controller unit, for instance.

The sensor head may comprise a measurement light emitting optical system for emitting measurement light onto a measurement position of an measurement object from a prescribed angle, an image acquiring optical system for capturing an image by viewing the measurement position of the measurement object and a surrounding region from an angle different from that of the measurement light emitting optical system, and a two dimensional imaging device for photoelectrically converting an image obtained by the image acquiring optical system into a video signal corresponding to the image.

The "measurement light emitting optical system" as used herein may comprise a lens array defining a light emitting light path, and may also comprise other optical elements such as mirrors and filters. A light source for emitting light may be incorporated in the system or may be drawn from an external source via an optical fiber. An example of a light emitting light source consists of a red laser diode. The "emitting angle" may be either a regular reflective surface type described in connection with FIG. 43 or an irregular reflective surface type described in connection with FIG. 44.

The controller may be adapted to control an imaging condition associated with a brightness of the image in the form of the video signal, and to operate under a measurement mode and an observation mode.

When the controller operates under the measurement mode, with a light source for measurement turned on, the imaging condition being adjusted in such a manner that a measurement light radiated light image can be imaged at an appropriate brightness but a surrounding part of the measurement object is substantially darker than the appropriate brightness, and a desired displacement being computed according to the video signal obtained by the two dimensional imaging device. When the controller operates under the observation mode, the imaging condition being adjusted in such a manner that the measurement position and the surrounding part of the measurement object can be imaged both at an appropriate brightness, and an image of the measurement position of the surface of the measurement object and the surrounding region being displayed on the screen of an image monitor according the video signal obtained by the two dimensional imaging device.

According to this structure, the positional relationship between the measurement light radiated light image and the measurement objection can be verified on the image monitor. Therefore, even when the sensor head closely overlies the intended measurement position or the intended measurement position has an irregular surface that prevents the shape of the intended measurement position from being directly identified with the naked eye and causes difficulty in identifying where the measurement light is radiated, it is possible to obtain the intended measurement result in a reliable manner through accurate positioning of the radiated light image onto the measurement position.

The "imaging condition which is adjusted under the measurement mode" includes the brightness control for the measurement light source and/or exposure time for the two dimensional imaging device. When the measurement light source is lighted in pulses, the brightness of the measurement light source may mean the average brightness which is proportional to the produce of an instantaneous brightness and the duration time.

The controller under the observation mode may be adapted to adjust the imaging condition in such a manner that the measurement light radiated light image is not imaged at all or substantially darker than the appropriate brightness. In this case, the "imaging condition which is adjusted under the observation mode" may include a turned on or turned off state of the measurement light source, the brightness control for the measurement light source and/or the exposure time for the two dimensional imaging device.

The imaging condition that would cause the measurement light radiated light image to be not imaged at all or imaged substantially darker than an appropriate brightness may include turning off the measurement light source, reducing the brightness of the measurement light source, turning on the measurement light source in pulses and assigning the period between the turned on states of the measurement light source to the exposure period of the two dimensional imaging device.

The controller under the observation mode may be adapted to adjust the imaging condition in such a manner that the measurement light source is turned on, and the measurement light radiated light image and the surrounding region are both imaged at an appropriate brightness. The "imaging condition which is adjusted under the observation mode" at this time may include the brightness control for the measurement light source and/or the exposure time for the two dimensional imaging device.

The observation mode may include a first observation mode and a second observation mode, the controller under the first observation mode adjusting the imaging condition in such a manner that a measurement light radiated light image is not imaged at all or imaged substantially darker than an appropriate brightness, the controller under the second observation mode adjusting the imaging condition in such a manner that with the measurement light source turned on the measurement light radiated light image and the surrounding part of the measurement object can be both imaged at an appropriate brightness.

According to the displacement sensor of the present invention, the controller under the observation mode may be adapted to repeatedly carry out one or a plurality of shots under the imaging condition where a measurement light radiated light image is not imaged at all or imaged substantially darker than an appropriate brightness, but a surrounding surface of the measurement object is imaged at an appropriate brightness and one or a plurality of shots under the imaging condition where with the measurement light source turned on a measurement light radiated light image is imaged at an appropriate brightness but a surrounding surface of the measurement object is imaged substantially darker than an appropriate brightness, in an alternating manner.

At this time, the controller may be adapted to display the obtained image every time on the image monitor. If an image substantially consisting solely of the surface image of the measurement object and an image substantially consisting solely of the measurement light radiated light source are shown in an alternating fashion in rapid succession, the viewer would get the impression that both of them are imaged at an appropriate brightness. If successive shots under a same imaging condition are performed in an alternating fashion, and the period for changing the imaging condition is long enough, the viewer can identify the images under different conditions as separate images and observe them in a proper positional relationship.

The controller may be adapted to display two images obtained under different imaging conditions one over the other on the image monitor. Even in such a case, it is still possible to display both the measurement light radiated light source and the surrounding surface image of the measurement object at an appropriate brightness level.

The controller may be adapted to repeatedly carry out one or a plurality of shots under the measurement mode and one or a plurality of shots under the observation mode, in an alternating manner. By so doing, the displacement measurement can be carried out while displaying the surface image of the measurement object on the image monitor. At this time, the controller may be adapted not to display an image obtained under the measurement mode on the image monitor but display an image obtained under the observation mode. By so doing, the displacement measurement can be carried out while verifying the state of the measurement position from the image captured under the observation mode. The controller may also be adapted to display one of an image obtained under the measurement mode or an image obtained under the observation mode in a selective manner. By so doing, the state of the image that is actually used for measurement can be verified whenever necessary.

The displacement sensor of the present invention may further comprise an illuminate for illuminating a measurement position on the measurement object and a surrounding region, the controller being adapted to turn on the illuminator under the observation mode.

The "imaging condition under the observation mode" may include a brightness of the illuminator. According to this structure, even when brightness of the surrounding environment is not adequate, or the distance between the measurement object and sensor head is short, and the brightness of the surface of the measurement object is not adequate because the sensor head is located closely over the measurement object, a clear image can be displayed on the screen of the image monitor by illuminating the surface of the measurement object.

The light source for the illuminator may consist of a light emitting diode, an incandescent lamp, or any other small light source. Typical example of the light source for the illuminator can be found in a green light emitting diode. The illuminator preferably includes a light emitting optical system for radiating a small area having a prescribed shape (such as circular and square) including the measurement position.

In the displacement sensor of the present invention, the image acquiring optical system may comprise an oblique image acquiring optical system for capturing an image by viewing the measurement position of the measurement object and a surrounding region from an oblique angle, and a frontal image acquiring optical system for capturing an image by viewing the measurement position of the measurement object and the surrounding region from the front, and the two dimensional imaging device may comprise a two dimensional oblique image imaging device for photoelectrically converting an image obtained via the oblique image acquiring optical system and a two dimensional frontal image imaging device for photoelectrically converting an image obtained via the frontal image acquiring optical system, the controller under the measurement mode being adapted to compute a desired displacement according to a video signal from the two dimensional oblique image imaging device while the controller under the observation mode is adapted to display the measurement point of the measurement object and the surrounding region according a video signal from the two dimensional frontal image imaging device.

The "oblique image acquiring optical system" as used herein may comprise a lens array defining a light receiving light path, and may also comprise other optical elements such as mirrors and filters. "Viewing from an oblique angle" means "viewing from an oblique angle relative to a prescribed sensor mounting position", and it literally means viewing obliquely from above when the measurement object is placed horizontally. More specifically, the incident angle of the light receiving optical system for measurement in the sensor head for a conventional displacement sensor should give an idea of what it is like (see c of FIG. 43 and g of FIG. 44).

The "frontal image acquiring optical system" as used herein may comprise a lens array defining a light receiving light path, and may also comprise other optical elements such as mirrors and filters. "Viewing from the front" means "viewing from front relative to a prescribed sensor mounting position", and it literally means viewing directly from above when the measurement object is placed horizontally. More specifically, the exit angle of the light emitting optical system in the sensor head for a conventional displacement sensor for irregular reflective surface objects should give an idea of what it is like (see f of FIG. 44).

According to this structure, under the measurement mode, a highly reliable measurement operation can be carried out relying only on the light image from the oblique image acquiring optical system while excluding the light image from the frontal image acquiring optical system. Under the observation mode, a peripheral image (the image of the measurement position of the measurement object and the surrounding region) free from distortion can be displayed on the screen of the image monitor relying only on the light image from the frontal image acquiring optical system while excluding the light image from the oblique image acquiring optical system.

The controller may be additionally adapted to operate under an image processing mode for computing a length or area on a surface of the measurement object by suitably adjusting a magnification factor of an image obtained by the frontal image acquiring optical system according to a displacement computed from an oblique image obtained by the oblique image acquiring optical system.

The image acquiring optical system may comprise an oblique image acquiring optical system for capturing an image by viewing the measurement position of the measurement object and a surrounding region from an oblique angle, and a frontal image acquiring optical system for capturing an image by viewing the measurement position of the measurement object and the surrounding region from the front, and the two dimensional imaging device may be used commonly for the two image acquiring optical systems.

In this case, the two dimensional imaging device may be placed at an intersection of light paths of the frontal image acquiring optical system and the oblique image acquiring optical system.

According to this structure, because a common imaging device can be used for the photoelectric conversion of the oblique image and the photoelectric conversion of the frontal image, it is possible to achieve the function to display an image of the surface of the measurement object on an image monitor without any distortion according to a video signal obtained from a sensor head without impairing the original function to measure displacements and at a low cost.

In this case, an exit light axis of the measurement light emitting optical system and an incident light axis of the oblique image acquiring optical system may be arranged symmetrically at a same inclination angle, and the two dimensional imaging device may be placed on an extension of an incident light axis of the frontal image acquiring optical system, the oblique image acquiring optical system comprising a light axis refracting mechanism for refracting an incident light axis onto the two dimensional imaging device.

According to this structure, because the sensor head can be applied to both regular reflective surface measurement objects and irregular reflective surface measurement objects, and the measurement light emitting optical system, oblique image acquiring optical system and frontal image acquiring optical system can be accommodated in the housing of the sensor head in a well-balanced compact manner.

The light axis refracting mechanism may be adapted in such a manner that light images formed on a light receiving surface of the two dimensional imaging device via the oblique image acquiring optical system and via the frontal image acquiring optical system move in a same direction on the light receiving surface of the two dimensional imaging device for a given change in the measurement displacement.

According to this structure, when the oblique image and the front image are shown on the screen of the image monitor one over the other, with a change in the displacement of the measurement object, the oblique image and the front image both move in a same direction, and this produces a natural impression to the user.

The displacement sensor of the present invention may further comprise shutter means for selectively shutting off one of a first light path reaching the two dimensional imaging device via the oblique image acquiring optical system and a second light path reaching the imaging device via the frontal image acquiring optical system either manually or electrically, so that the light path for the frontal image acquiring optical system is shut off under the measurement mode and the light path for the oblique image acquiring optical system is shut off under the observation mode.

According to this structure, one of the first light path reaching the imaging device via the oblique image acquiring optical system and the second light path reaching the imaging device via the frontal image acquiring optical system can be selectively enabled, and this prevents measurement errors during a displacement measurement by preventing the frontal image from reaching the imaging device and shutting off external disturbances, and allows the observation of the surface of the measurement object to be made without causing any distortion to the image by preventing the oblique image from reaching the imaging device during the observation of the object.

The mounting position of the shutter means may be found at the inlets of the light paths for the optical systems, intermediate points of the light paths or the terminal ends of the light paths. The shutter means may be of a mechanical type which shuts off the light path with a shutter plate or an electro-optical type using an electro-optical device (such as liquid crystal and PZT) which can be electrically controlled so as to be transparent or opaque, among other possibilities. "Selective manner" can be achieved by any means as long as it can produce such a function as a result, and does not exclude the arrangement which can shut off or open both of the light paths at the same time.

The displacement sensor of the present invention may further comprise an illuminator for illuminating a measurement position of a measurement object and a surrounding region, a first optical filter having a band pass property for substantially permitting the passage of the measurement light provided in a first light path reaching the imaging device via the oblique image acquiring optical system, and a second optical filter having a band pass property for substantially permitting the passage of the illuminating light provided in a second light path reaching the imaging device via the frontal image acquiring optical system, the controller under the observation mode being adapted to turn on the illuminator.

According to this structure, by appropriately selecting the wavelengths of the measurement light and illuminating light, the selection of the light path can be accomplished automatically without using any special shutter means.

The measurement light source, illuminator light source, first optical filter and second optical filter may, for instance, consist of a red laser diode, a green light emitting diode, an optical band pass filter having a narrow pass band around the frequency component of the red laser as the first optical filter and an optical band pass filter having a narrow pass band around the frequency component of the green light emitting diode as the second optical filter, respectively.

In the displacement sensor of the present invention, the controller may be additionally adapted to operate under an image processing mode for computing a length or area on a surface of the measurement object by suitably adjusting a magnification factor of an image obtained by the frontal image acquiring optical system according to a displacement computed from an oblique image obtained by the oblique image acquiring optical system.

The sensor head according to the present invention may comprise a measurement light emitting optical system for emitting measurement light onto a measurement position of an measurement object from a prescribed angle, an oblique image acquiring optical system for capturing an image by viewing the measurement position of the measurement object and a surrounding region from an oblique angle, a frontal image acquiring optical system for capturing an image by viewing the measurement position of the measurement object and the surrounding region from the front; and a two dimensional imaging device for photoelectrically converting an oblique image obtained by the oblique image acquiring optical system and a frontal image obtained by the frontal image acquiring optical system into a video signal corresponding to the images.

The "measurement light emitting optical system" as used herein may comprise a lens array defining a light emitting light path, and may also comprise other optical elements such as mirrors and filters. A light source for emitting light may be incorporated in the system or may be drawn from an external source via an optical fiber. An example of a light emitting light source consists of a red laser diode. The "emitting angle" may be either a regular reflective surface type described in connection with FIG. 43 or an irregular reflective surface type described in connection with FIG. 44.

The "oblique image acquiring optical system" as used herein may comprise a lens array defining a light receiving light path, and may also comprise other optical elements such as mirrors and filters. "Viewing from an oblique angle" means "viewing from an oblique angle relative to a prescribed sensor mounting position", and it literally means viewing obliquely from above when the measurement object is placed horizontally. More specifically, the incident angle of the light receiving optical system for measurement in the sensor head for a conventional displacement sensor should give an idea of what it is like (see c of FIG. 43 and g of FIG. 44).

The "frontal image acquiring optical system" as used herein may comprise a lens array defining a light receiving light path, and may also comprise other optical elements such as mirrors and filters. "Viewing from the front" means "viewing from front relative to a prescribed sensor mounting position", and it literally means viewing directly from above when the measurement object is placed horizontally. More specifically, the exit angle of the light emitting optical system in the sensor head for a conventional displacement sensor for irregular reflective surface measurement objects should give an idea of what it is like (see f of FIG. 44).

According to this structure, because video signals corresponding to an oblique image of the surface of the measurement object and a frontal image of the surface of the measurement object can be obtained, it is possible to observe the surface of the measurement object by using the video signal corresponding to the frontal image while carrying out the displacement measurement using a video signal corresponding to the oblique image, and an image of the surface of the measurement object can be displayed on the image monitor without any distortion according to a video signal obtained from the sensor head without impairing the original function to measure displacements.

The two dimensional imaging device may be placed at an intersection of light paths for the frontal image acquiring optical system and the oblique image acquiring optical system.

According to this structure, because a common imaging device can be used for the photoelectric conversion of the oblique image and the photoelectric conversion of the frontal image, it is possible to achieve the function to display an image of the surface of the measurement object on an image monitor without any distortion according to a video signal obtained from a sensor head without impairing the original function to measure displacements and at a low cost.

In this case, an exit light axis of the measurement light emitting optical system and an incident light axis of the oblique image acquiring optical system may be arranged symmetrically at a same inclination angle, and the two dimensional imaging device may be placed on an extension of an incident light axis of the frontal image acquiring optical system, the oblique image acquiring optical system comprising a light axis refracting mechanism for refracting an incident light axis onto the two dimensional imaging device.

According to this structure, because the sensor head can be applied to both regular reflective surface objects and irregular reflective surface objects, and the measurement light emitting optical system, oblique image acquiring optical system and frontal image acquiring optical system can be accommodated in the housing of the sensor head in a well-balanced compact manner.

The light axis refracting mechanism may be adapted in such a manner that light images formed on a light receiving surface of the two dimensional imaging device via the oblique image acquiring optical system and via the frontal image acquiring optical system move in a same direction on the light receiving surface of the two dimensional imaging device for a given change in the measurement displacement.

According to this structure, when the oblique image and the frontal image are shown on the screen of the image monitor one over the other, with a change in the displacement of the measurement object, the oblique image and the front image both move in a same direction, and this produces a natural impression to the user.

The sensor head of the present invention may further comprise shutter means for selectively shutting off one of a first light path reaching the two dimensional imaging device via the oblique image acquiring optical system or a second light path reaching the imaging device via the frontal image acquiring optical system either manually or electrically.

According to this structure, one of the first light path reaching the imaging device via the oblique image acquiring optical system and the second light path reaching the imaging device via the frontal image acquiring optical system can be selectively enabled, and this prevents measurement errors during a displace measurement by preventing the frontal image from reaching the imaging device and shutting off external disturbances, and allows the observation of the surface of the measurement object to be made without causing any distortion to the image by preventing the oblique image from reaching the imaging device during the observation of the object.

The sensor head of the present invention may further comprise an illuminator for illuminating a measurement position of a measurement object and a surrounding region.

According to this structure, even when brightness of the surrounding environment is not adequate, or the distance between the measurement object and sensor head is short, and the brightness of the surface of the measurement object is not adequate because the sensor head is located closely over the measurement object, a clear image can be displayed on the screen of the image monitor by brightly illuminating the surface of the measurement object.

The sensor head of the present invention may further comprise a first optical filter having a band pass property for substantially permitting the passage of the measurement light provided in a first light path reaching the imaging device via the oblique image acquiring optical system, and a second optical filter having a band pass property for substantially permitting the passage of the illuminating light provided in a second light path reaching the imaging device via the frontal image acquiring optical system.

According to this structure, by appropriately selecting the wavelengths of the measurement light and illuminating light, the selection of the light path can be accomplished automatically without using any special shutter means.

The various structures of the present invention discussed above can be combined at will as long as technically possible.

BRIEF DESCRIPTION OF THE DRAWINGS

FIG. 6 is a diagram illustrating the action of the displacement sensor of the present invention under the measurement mode;

FIG. 15 is a diagram showing the operation of the displacement sensor of the present invention under the observation mode;

FIG. 16 is a diagram showing the operation of the displacement sensor of the present invention under the observation mode using the measurement light path;

FIG. 17 is a diagram comparing the monitor screens of the displacement sensor of the present invention and a conventional displacement sensor both under the observation mode;

FIG. 20 is a view explaining the structure of the sensor unit case provided with a shutter unit;

FIG. 21 is a view explaining the structure of the shutter unit;

FIG. 27 is a is a view showing exemplary monitor image;

FIG. 36 is a diagram showing the content of the transfer protocol table;

FIG. 37 is a diagram showing the contents of L1, L2 and OE;

FIG. 42 is a diagram showing the data structure of a single frame in an exemplary drive mode of the imaging device as a table;

FIG. 43 is a diagram illustrating the optical system of the displacement sensor for regular reflective objects; and FIG. 44 is a diagram illustrating the optical system of the displacement sensor for irregular reflective objects.

DETAILED DESCRIPTION OF THE PREFERRED EMBODIMENTS

A preferred embodiment of the present invention is now described in the following with reference to the appended drawings.

Besides from the problems mentioned earlier, according to a conventional sensor head, be it a regular reflection surface type or an irregular reflection surface type, because the measurement position on the measurement object is viewed obliquely from above, it is known that the image formed on the light receiving surface of the incorporated two dimensional imaging device is somewhat distorted, and there is some difficulty in confirming the relationship between the position to be measured and the radiated light image of the measurement light even when the imaging condition is adjusted in such a manner that a measurement light radiated light image and the surrounding region is imaged at appropriate brightness. In particular, the distortion of the image creates a particularly serious problem with the regular reflection surface type sensor head when the measurement distance L is short.

Therefore, the inventors have developed a sensor head having a novel structure which can obtain an image by looking down squarely on the measurement position of the measurement object as well as by looking down obliquely on the measurement position of the measurement object. This sensor head is characterized by comprising, at least, a measurement light emitting optical system for emitting measurement light onto a measurement position of a measurement object, an oblique image acquiring optical system for capturing an image by viewing the measurement position of the measurement object and the surrounding region from an oblique angle, a frontal image acquiring optical system for capturing an image by viewing the measurement position of the measurement object and the surrounding region from the front, and two dimensional imaging means for photoelectrically converting the image from an oblique angle obtained by the oblique image acquiring optical system and the image from the front obtained by the frontal image acquiring optical system to generate video signals corresponding to these images.

According to an optical displacement sensor using a sensor head provided with such a novel structure, even without preparing a special camera, by using the video signal obtained from the sensor head itself, the state of the surface of the measurement object can be shown on the screen of an image monitor.

In this case, the image which is shown on the screen of the image monitor may consist of (1) an image of the surface of the measurement object when the measurement light is not radiated on the object; (2) an image of the surface of the measurement object when the measurement light is radiated on the object; or (3) an enhanced image of the radiate light image of the measurement light which is radiated on the surface of the measurement object.

Figure 1:
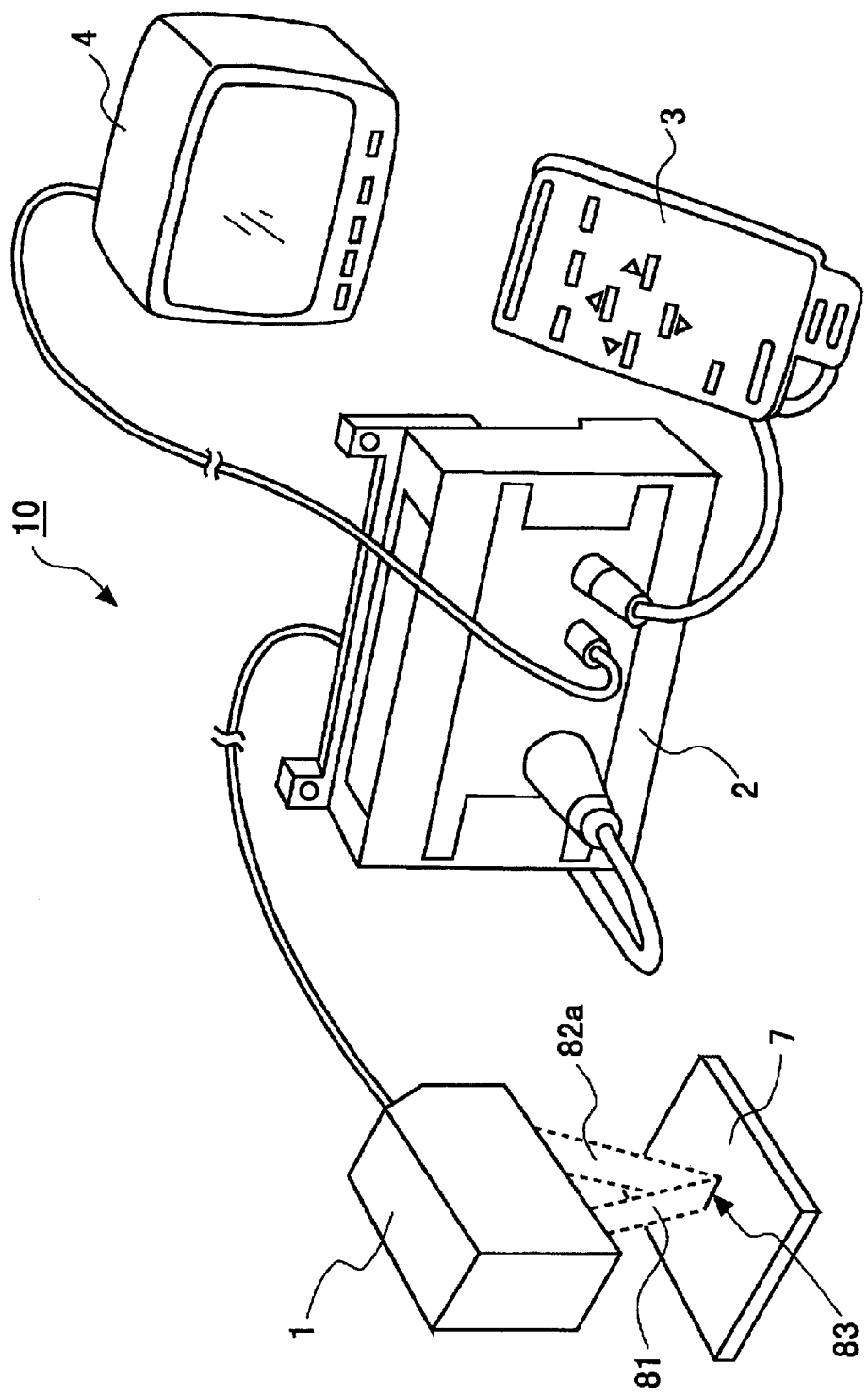
FIG. 1 is an overall external view of a displacement sensor system embodying the present invention.
Figure 2:
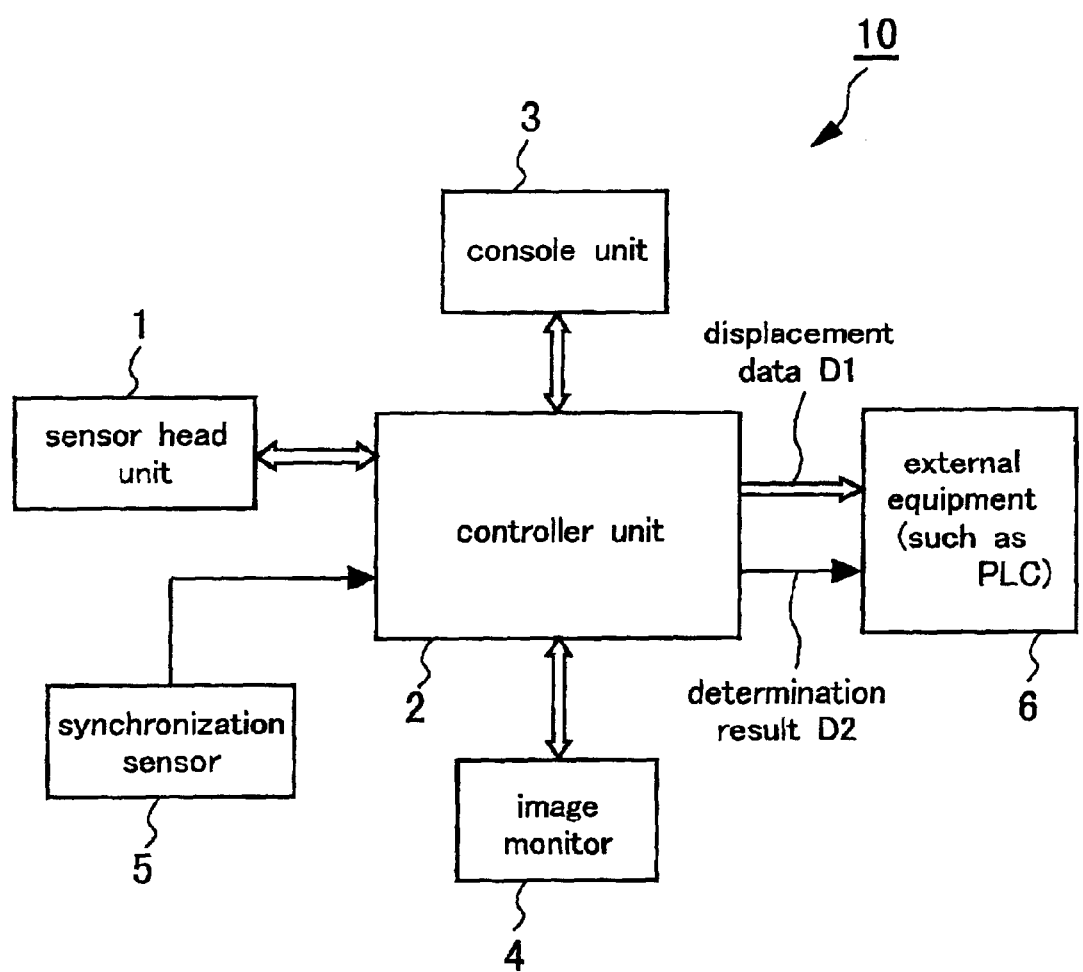
FIG. 2 is a block diagram showing the overall electric hardware structure of the displacement sensor system embodying the present invention.

An overall external view of a displacement sensor system embodying the present invention is shown in FIG. 1, a block diagram showing the overall electric hardware structure of the displacement sensor system embodying the present invention is shown in FIG. 2.

As can be seen from these drawings, this displacement sensor system comprises a sensor head unit 1, a controller unit 2, a console unit 3, an image monitor 4 and a synchronization sensor 5. External equipment 6 represents a PLC (programmable controller) for performing a control action according to displacement data D1 and a determination result D2 produced from the controller unit 2.

As shown in FIG. 1, the sensor head unit 1, controller unit 2, console unit above is now described in the following in terms of a concrete example.

Figure 26:
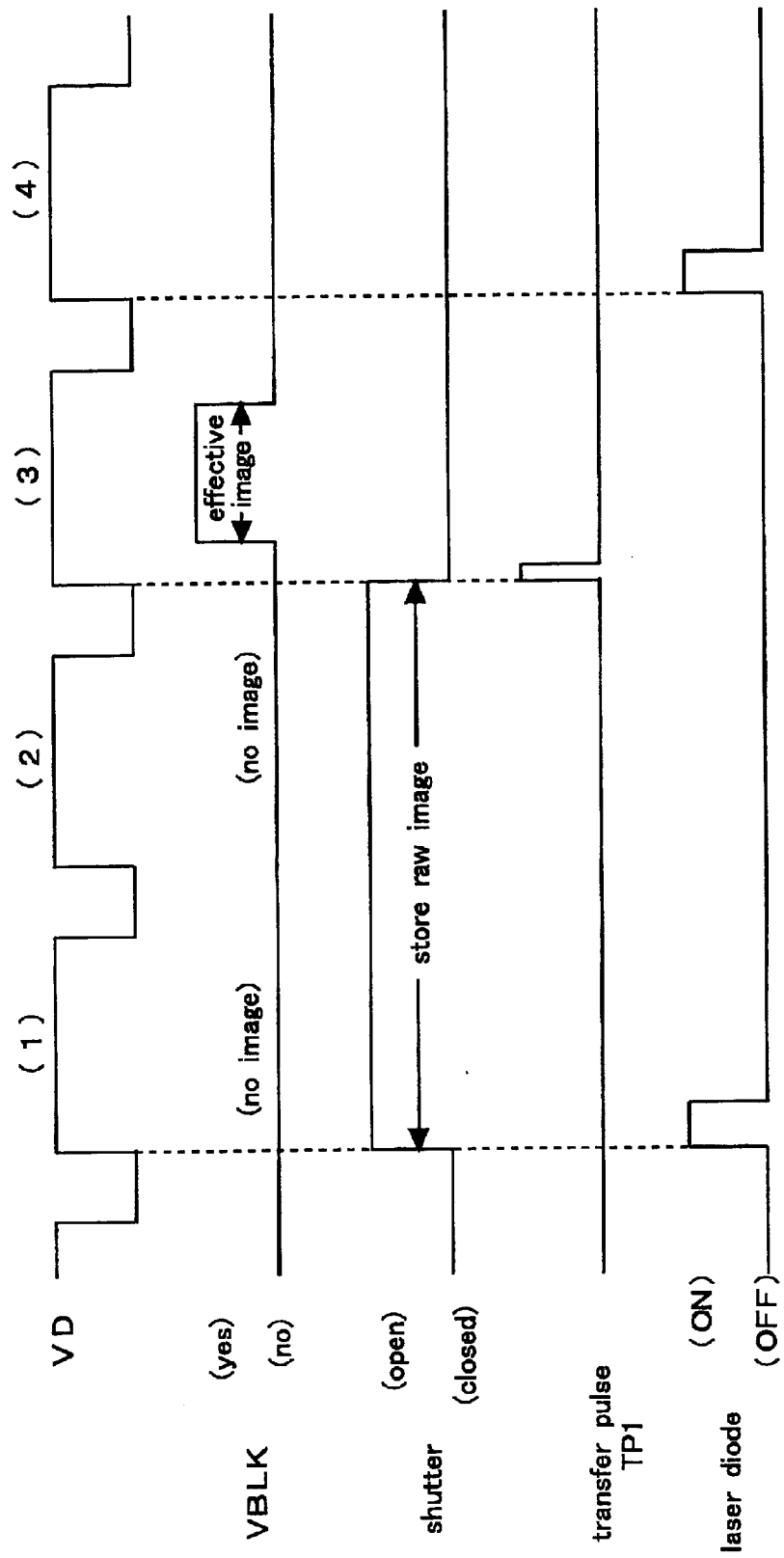
FIG. 26 is a time chart showing the process of superimposing a slit light image and a work surface image.

A time chart showing the superimposing process of a slit light image (line beam radiated light image) and a work surface image is given in FIG. 26. Referring to this drawing, VD denotes a vertical reference signal, VBLK denotes a signal indicting the presence or absence of an image in the video signal, and the transfer pulse TP1 is a pulse for transferring electric charges from each light receiving pixel to the corresponding vertical transfer shift register VR (which is described hereinafter).

Upon the start of the first cycle (1), the shutter opens. More specifically, the electric charges which have been accumulated owing to the preceding photoelectric conversions are discharged, and the accumulation of electric charges is started anew. At the same time the laser diode 112 is powered ON for a short time period. The shutter is kept open during the second cycle (2). Upon the start of the third cycle, the shutter closes. At the same time, the transfer pulse TP1 is produced. Then, the electric charges accumulated in the pixel are transferred to the vertical shift register VR. As a result, when the third cycle (3) starts, the image formed by superimposing the surface raw image of the measurement object and the radiated light image produced by the measurement laser light is obtained as the effective image. Thus, according to this embodiment, the shutter is kept open during two vertical cycles, and the laser diode 112 is turned on for a short time period at the start of the first cycle so that the image formed by superimposing the slit light image and the work surface image can be monitored. This is an example of the second observation mode discussed earlier in connection with the previous embodiment.

As another possible embodiment, if the open period of the shutter is limited to the lighting period of the laser diode, a slit light image containing almost no internally provided with light emitting elements (such as an LD drive circuit 111 and an LD 112) for emitting measurement light onto the measurement object 7, light receiving elements (such as a CCD control circuit 121, a CCD 122, an amplifier circuit 123, a HPF 124, a P/H circuit 125 and an AGC amplifier circuit 126) for acquiring an image of the measurement object 7, and illumination elements (such as an LED drive circuit 131 and an LED 132) for illuminating a circular area including the measurement position on the measurement object 7 and the surrounding region.

The light emitting elements are described in the following. A timing signal generating circuit 101 generates an LD drive pulse signal P1 for lighting the laser diode (which is referred to as LD hereinafter) 112. The LD drive circuit 111 lights the LD 112 in pulses in response to the LD drive pulse signal P1. The timing signal generating circuit controls the peak power of the pulse laser light via the LD drive circuit 111. The pulse laser light emitting from the LD 112 is radiated upon the surface of the measurement object 7 via a measurement light emitting optical system not shown in the drawing as measurement light 81. As a result, a linear light beam (light image of a line beam) 83 (see FIG. 1) is formed on the surface of the measurement object 7 by the radiation of the measurement light 81.

The light receiving system elements are described in the following. The line beam which has been reflected by the surface of the measurement object 7 impinges on the light receiving surface of the two dimensional CCD 122 serving as the imaging device via either one of two image acquiring systems (oblique image acquiring optical system and frontal image acquiring optical system) which are not shown in the drawing.

As will be discussed hereinafter, the oblique image acquiring optical system as used herein consists of an optical system designed to acquire an image by viewing the measurement position of the measurement object 7 and the surrounding region from an oblique angle, and the frontal image acquiring optical system as used herein consists of an optical system designed to acquire an image by viewing the measurement position of the measurement object 7 and the surrounding region from the front. Numeral 82a denotes measurement light which is obliquely reflected upward by the surface of the measurement object 7, numeral 82b denotes measurement light which is vertically reflected by the surface of the measurement object 7, and numeral 150 denotes an mechanical shutter for selecting one of the reflected lights 82a, 82b in an selective manner.

The positional relationship between the oblique image acquiring optical system and the light emitting optical system for measurement system are selected in such a manner that the position of the radiated light image on the light receiving surface of the CCD 122 changes in dependence on the displacement in question (the distance between the sensor head unit 1 and measurement object 7, for instance). The positional relationship may be determined according to a light section method based on triangulation.

The video signal produced from the CCD 122 is amplified by the amplifier circuit 123 for each pixel, and is shaped in such a manner that the fluctuations in the zero level signal of each pixel is removed by the high pass filter (HPF) 124 and the peak hold (P/H) circuit 125 and each pixel signal properly represents the intensity of the received light. Then, the AGC amplifier circuit 126 suitably controls the amplitude of the signal value, and forwarded it to the controller unit 2 as a video signal vs.

The pulse signal P2 produced from the timing signal generating circuit 101 controls the drive mode of the CCD 122 including the shutter time via CCD control circuit 121. Similarly, the pulse signals P3 to P5 control the filter timing of the high pass filter (HPF) 124, the peak hold timing of the peak hold circuit (P/H) 125, and the gain and switching timing of the AGC amplifier circuit 126.

The pulse signal P6 produced from the timing signal generating circuit 101 controls the LED drive circuit 131, and the LED 132 serving as an illuminator is pulse driven so as to illuminate, for instance, a circular area including the measurement position on the surface of the measurement object and the surrounding region.

The laser diode 112 serving as the light source for measurement may consist of a red laser diode, and the LED 132 serving as the illuminator may consist of a green LED. In the drawing, numeral 84 denotes an illuminating light and numeral 128 denotes a mirror.

The measurement condition storage unit 141 stores the light emitting time period of the LED 132 serving as the light source of the illuminator as well as the shutter time of the CCD 122, the light emitting time period of the LD 112, the peak power of the LED 112 and the gain of the AGC amplifier circuit 126, and an optimum measurement condition and imaging condition are selected by the control signal CONT from the controller unit 2.

Figure 3:
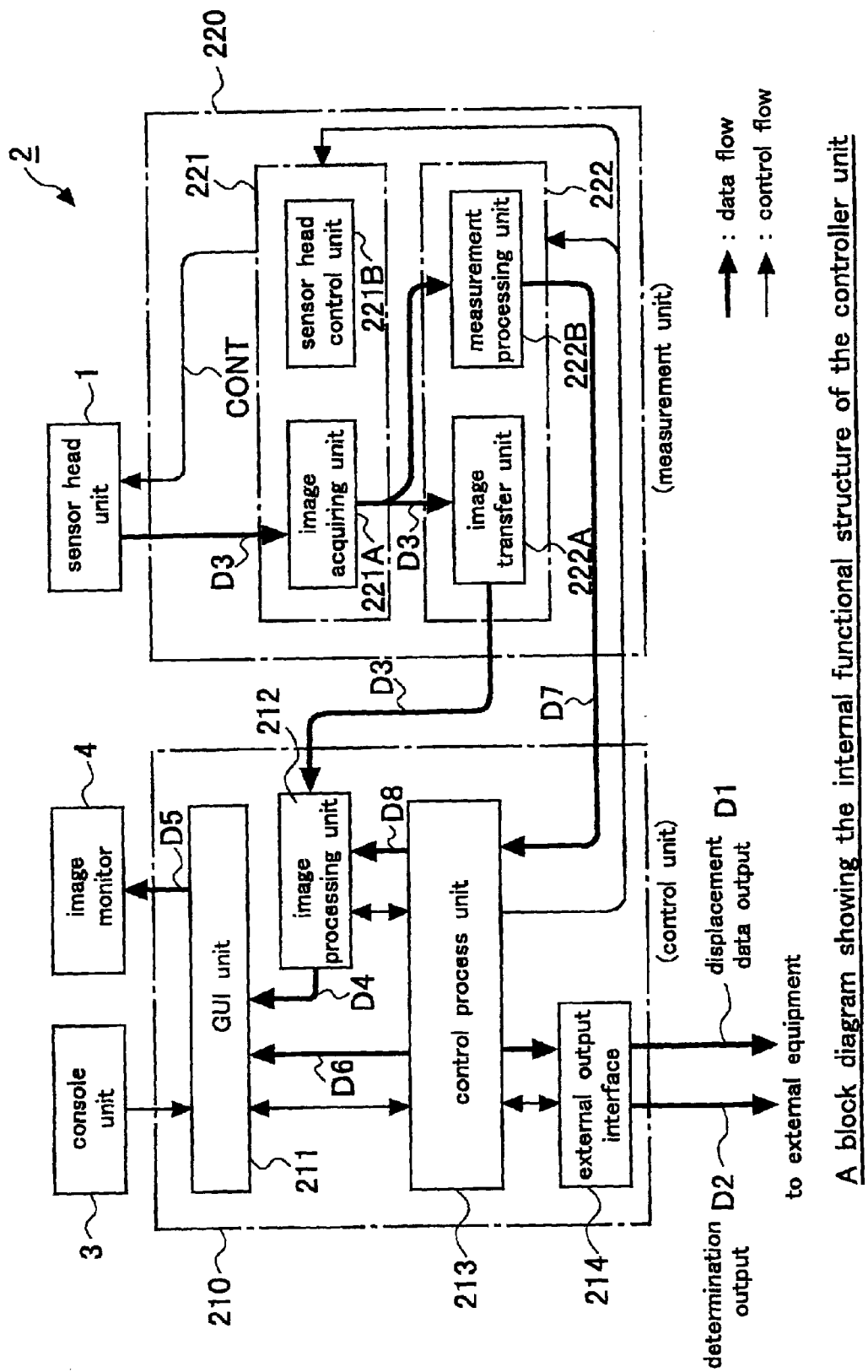
FIG. 3 is a block diagram showing the internal functional structure of the controller unit.

FIG. 3 is a block diagram showing the internal functional structure of the controller unit 2. As shown in the drawing, this controller unit 2 essentially consists of a control unit 210 and a measurement unit 220. The measurement unit 220 comprises an interface unit 221 for the sensor head 1, and an image computing unit 222 for processing the image data obtained from the sensor head unit 1 via interface unit 221.

The control unit 210 is incorporated with a graphic user interface unit (GUI) 211 serving as an interface for the console unit 3 and image monitor 4, an image processing unit 212 for processing the image data forwarded from the measurement unit 220 in an appropriate manner and forward the processed data to the GUI unit 211, an external output interface unit 214 for forwarding the displacement data output D1 and determination output D2 which were described earlier and a control process unit 213 for generally controlling the device as a whole.

The data flow in this device is described in the following. A sensor head control unit 221B incorporated in the interface unit 221 controls the intensity of the light received by the CCD 122 incorporated in the sensor head unit 1 and the intensity of the light emitted from the laser diode 112 serving as the light source for measurement. Also, the sensor head control unit 221B controls the shutter time of an electronic shutter which is incorporated in the system so that the exposure time of the CCD 122 serving as the imaging device to be optimized. The image date D3 obtained by the CCD 122 of the sensor head unit 1 in this manner is forwarded to the measurement unit 220 under the control of the image acquiring unit 221A.

The image data received by the measurement unit 220 is forwarded to an image transfer unit 222A and a measurement processing unit 222B in the image computing unit 222. The image transfer unit 222A transfers the image data D3 arriving from the image acquiring unit 221A to the image processing unit 212 in the control unit 210. The measurement processing unit 222B conducts a measurement process according to the image data D3, and obtains displacement data D1 and a stability output D2 to forward this data D7 to the control processing unit 213 in the control unit 210.

The control processing unit 213 of the control unit 210 obtains line beam direction measurement point coordinate data D8 according to the data D7 forwarded from the measurement processing unit 222B, and forward it to the image processing unit 212. The image processing unit 212 forward data D4 including the image data and line bright to a GUI unit 211. The GUI unit 211 receives various commands from the console unit 3, and edit data for display to forward it to the image monitor 4 as a monitor output D5.

As will be described hereinafter, the controller unit 2 of this embodiment can operate under a measurement mode, a first observation mode and a second observation mode. Under the measurement mode, with the light path of the frontal image acquiring optical system shielded by shutter means (such as a mechanical shutter 150), the light source for measurement (such as a laser diode 112) is turned on while the illuminator (such as an LED 132) is turned off, the imaging condition is automatically adjusted in such a manner that the light image radiated by the measurement light can be imaged at an appropriate brightness but the image of the surface of the surrounding measurement object is imaged substantially darker than the appropriate brightness. Under this condition, the control action for computing the desired displacement according to the video signal vs corresponding to the oblique image obtained by a two-dimensional imaging device (such as CCD 122) is performed.

Under the first observation mode, with the light path of the oblique image acquiring optical system shielded by the shutter means, the light source for measurement is turned off while the illuminator is turned on, and the imaging condition is automatically adjusted in such a manner that the measurement position and the image of the surface of the surrounding measurement object can be imaged at an appropriate brightness. Under this condition, the control action for displaying the measurement light radiated light position on the surface of the measurement object and the surrounding region on the image monitor (such as the image monitor 4) according to the video signal corresponding to the frontal image obtained by the two-dimensional imaging device is performed.

Under the second observation mode, with the light path of the oblique image acquiring optical system shielded by the shutter means, the light source for measurement and the illuminator are both turned on, and the imaging condition is automatically adjusted in such a manner that the measurement light radiated light image and the image of the surface of the surrounding measurement object can be imaged at an appropriate brightness. Under this condition, the control action for displaying the measurement light radiated light image on the surface of the measurement object and the surrounding region on the image monitor according to the video signal corresponding to the frontal image obtained by the two-dimensional imaging device is performed.

The automatic extraction process for the measurement coordinate and displacement measuring process that are required for the above three control actions are substantially performed by the image processing unit 222B, and the display data editing process is substantially performed by the image processing unit 212 and the GUI unit 211. The imaging condition adjustment process is substantially performed by the sensor head control unit 221B.

Referring to FIGS. 1 and 2 once again, the console unit 3 may be of a handy type, and is provided with four arrow keys for moving the cursor as well as various function keys on its surface. This console unit 3 is connected to a controller unit 2 via an electric cord.

The image monitor 4 displays a corresponding image on its screen according to a monitor output (display data) produced from the controller unit 2. The image monitor 4 may consist of any commercially available display unit such as a CRT display, LCD panel or the like.

The optical structure of the displacement sensor unit 1 of the present invention is described in the following. The diagram for showing the operation of the displacement sensor of the present invention under the measurement mode is shown in FIG. 6, and the diagram for showing the mode of operation of the displacement sensor of the present invention under the observation mode is shown in FIG. 15.

As can be seen from these drawings, the housing of this sensor head unit 1 accommodates therein a measurement light emitting optical system (consisting of a lens assembly 113 including one or more than one lenses in this case) for impinging measurement light 81 downwardly onto a measurement position on the measurement object 7 from an oblique angle, an oblique image acquiring optical system (consisting of a lens assembly 127a and a mirror 128 in this case) for acquiring an image of the measurement position on the measurement object 7 and the surrounding region obliquely from above, a frontal image acquiring optical system (consisting of a lens assembly 127b in this case) for acquiring an image of the measurement position on the measurement object 7 and the surrounding region from directly above, a two dimensional imaging device (consisting of a two dimensional CCD 122 in this case) placed at the point where the optical paths of the oblique image acquiring optical system and frontal image acquiring optical system cross each other, shutter means (consisting of a mechanical shutter 150 which reciprocates as indicated by arrow 91 to shield a selected one of the two light paths in this case) for shielding a selected one of the oblique image acquiring optical system and frontal image acquiring optical system, and an illuminator (consisting of a green light emitting diode 132 incorporated with a lens in this case) for illuminating the measurement position on the measurement object 7 and the surrounding region with the light produced from the light source for illumination.

More specifically, the exit light axis (denoted by numeral 81) of the measurement light emitting optical system and the incident light axis (denoted with numeral 82a) of the oblique image acquiring optical system are arranged symmetrically at a same inclination angle as clearly shown in FIG. 6 so that an optical system of a regular reflective object type is formed. Therefore, this sensor head unit 1 can be applied not only to objects demonstrating irregular reflection surface but also to objects having regular reflective surfaces such as glass.

The CCD 122 consisting of an imaging device provided in an upper part of the housing is positioned on an extension line of the incident light axis of the lens assembly 127b forming the frontal image acquiring optical system. Meanwhile, the oblique image acquiring optical system comprises a light axis refracting mechanism (consisting of a mirror 128 in this case) for refracting the incident light axis (denoted with numeral 82a) onto the CCD 122 serving as an imaging device. Therefore, the CCD 122 serving as an imaging device can receive either one of the images acquired by the frontal image acquiring optical system and oblique image acquiring optical system. In other words, only one imaging device is required for both the image acquiring optical systems, and this contributes to the reduction in cost.

The green light emitting diode 132 serving as an illuminator is preferably provided with a beam shaping capability. In this example, the illuminator can form a circular radiated light image 85 having a prescribed size on the upper surface of the measurement object 7 located at a reference distance as shown in FIG. 15.

As shown in FIGS. 6(b) and 15(b), the measurement object 7 of this embodiment consists of a plate member having a flat surface. A central part of this plate member 7 is formed with a circular hole 71 passed across the thickness thereof. In other words, the plate member forming the measurement object 7 is provided with a step corresponding to the thickness of the plate member. This displacement sensor detects the step corresponding to the thickness of the plate member as a displacement by positioning the radiated light image 83 of the line beam on the circular hole 71.

Figure 19:
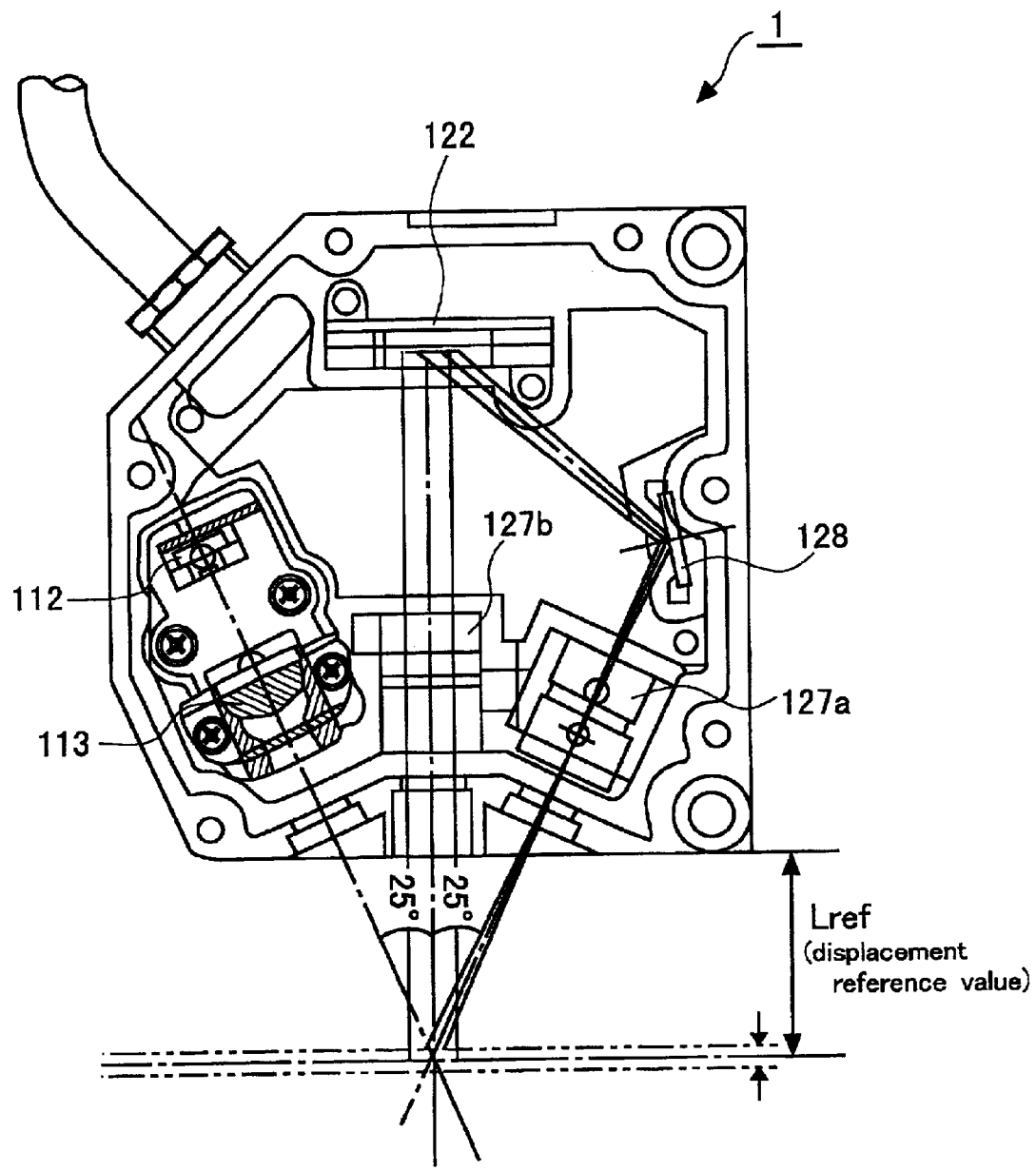
FIG. 19 is a view showing the interior of the sensor head unit opening a side of the case.

The more concrete arrangement of the various optical elements in the sensor head unit 1 is shown in FIG. 19. In the drawing, the interior of the sensor head unit is revealed by opening a side of the case.

In the drawing, numeral 112 denotes a red laser diode device forming the measurement light source, numeral 113 denotes a lens assembly forming the measurement light emitting optical system, numeral 127a denotes a lens assembly forming the oblique image acquiring optical system for acquiring an image of the measurement position on the measurement object and the surrounding region as seen from an oblique angle, numeral 128 denotes a mirror for refracting the light axis of the lens assembly 127a, numeral 127b denotes a lens assembly forming the frontal image acquiring optical system for acquiring an image of the measurement position on the measurement object and the surrounding region as seen directly from the front, and numeral 122 denotes a two dimensional CCD device serving as an imaging device for photoelectrically converting the image obtained from the oblique image acquiring optical system and the image obtained from the frontal image acquiring optical system into corresponding video signals.

As can be seen from the drawing, these optical elements (112, 113, 127a, 127b, 128 and 122) are accommodated in the housing of the sensor head in a balanced and compact manner.

The more concrete exemplary structure of the mechanical shutter 150 is illustrated in FIGS. 20 and 21. As shown in FIG. 20(a), a shutter unit 150A in the form of a plate member is secured to the opening on the lower surface of the sensor unit case 1A by threaded bolts. The shutter unit 150A comprises four windows consisting of a light emitting window 151, an obliquely upward receiving window 152, a directly upward receiving window 153 and an illuminating window 154. The light emitting window 151 emits measurement light 81 therefrom. The obliquely upward receiving window 152 receives measurement reflected light corresponding to the image of the measurement position of the measurement object and the surrounding region as seen obliquely from above. The directly upward receiving window 153 receives measurement reflected light corresponding to the image of the measurement position of the measurement object and the surrounding region as seen directly from above. The illuminating window 154 emits the illuminating light 84 from the green light emitting diode 132 therefrom.

As shown in FIGS. 21(a) and (b), the shutter unit 150A is internally provided with a shutter plate 157 in a slidable manner. The width of the shutter plate 157 in the sliding direction is slightly greater than the diameters of the windows 152, 153 and 154, and the slide stroke is determined in such a manner that the slide plate 157 can reciprocate between the windows 152 and 153 as shown in FIG. 21(b). When the shutter plate 157 is in the position to close the directly upward receiving window 153, the illuminating window 154 is also closed so as to shut off the illuminating light. A shutter operating knob 155 projects from a shutter plate guide slot 156 formed on a side of the shutter unit 150A. By holding this knob 156 and moving it back and forth, a selected one of the obliquely upward receiving window 152 and the directly upward receiving window 153 can be closed with the shutter plate 157.

The operation of this displacement sensor under the measurement mode is described in the following with reference to FIGS. 5 to 13.

A diagram for describing the mode of operation of this displacement sensor of the present invention under the measurement mode is given in FIG. 6. As shown in the drawing, under the measurement mode, with the light path of the frontal image acquiring optical system (including the lens assembly 127b) shielded by shutter means (the mechanical shutter 150), the light source for measurement (the red laser diode 112) is turned on while the illuminator is turned off (either by turning off the green light emitting diode 132 or closing the illuminating window 154 with the shutter plate 157), the imaging condition is automatically adjusted in such a manner that the light image 83 radiated by the measurement light can be imaged at an appropriate brightness but the image of the surface of the surrounding measurement object is too dark to be imaged. Under this condition, the control action for computing the desired displacement according to the video signal vs corresponding to the oblique image obtained by a two-dimensional imaging device (the CCD 122) is performed.

Figure 5:
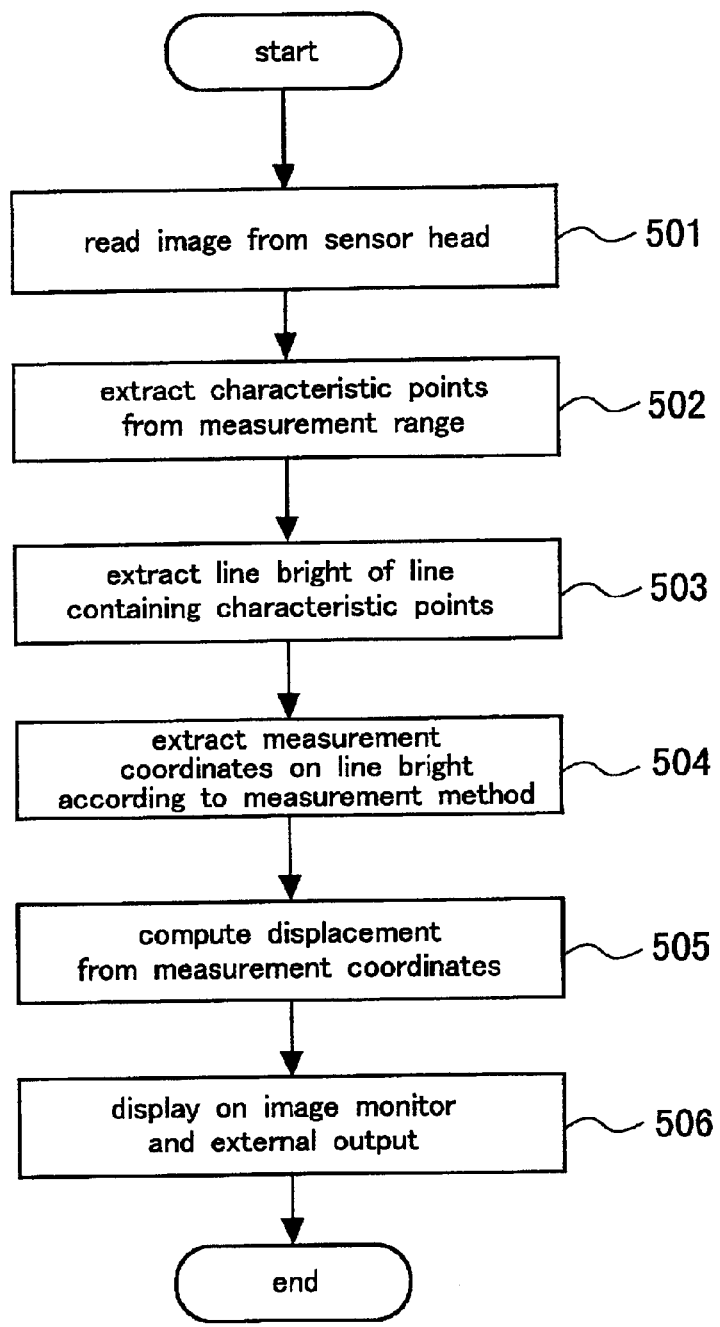
FIG. 5 is a general flow chart showing the outline of the displacement measurement process of the controller unit.

A general flow chart showing the overall action of the displacement measurement in the control unit 2 is given in FIG. 5. In the drawing, first of all, the image captured by the CCD 122 in the sensor head is fed to the controller unit 1 (step 501).

Figure 7:
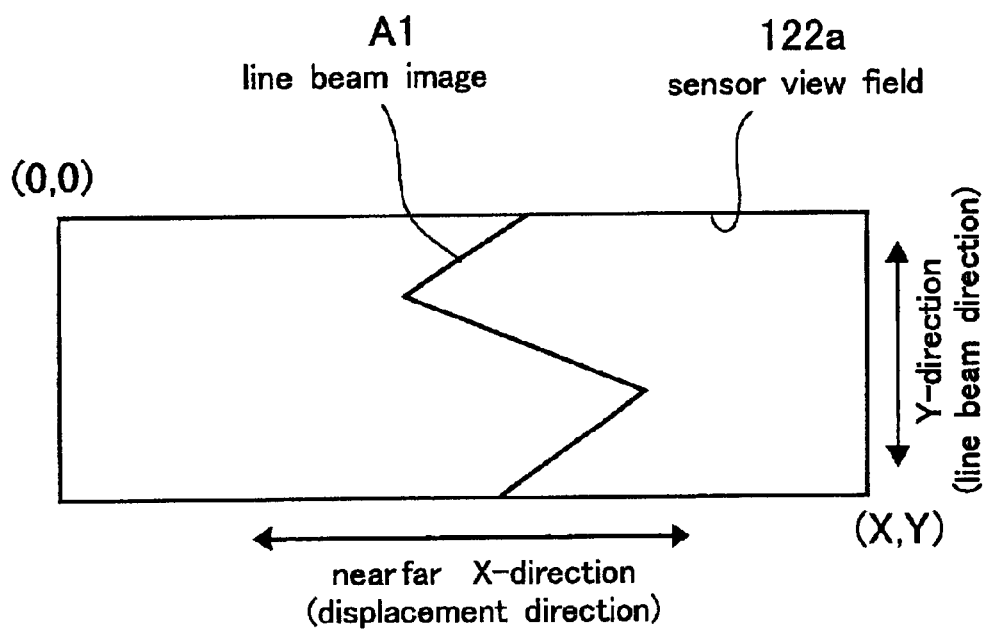
FIG. 7 is a diagram illustrating the image captured by the CCD in the sensor head unit.

A diagram describing the image captured by the CCD 122 in the sensor head 1 is shown in FIG. 7. As shown in the drawing, the CCD 122 incorporated in the sensor head 1 has an elongated rectangular field of the view 122a. The X direction defined along the length of the field of view corresponds to the direction of displacement, and the Y direction defined across the width of the field of view is defined as the line beam direction (which is simply referred to as "line direction" hereinafter). The field of view 122a of the sensor includes a line beam image (radiated light image) A1 given as a zigzag shaped line. With respect to the displacement direction, the left side in the drawing corresponds to the side near the sensor head, and the right side in the drawing corresponds to the side remote from the sensor head.

Figure 8:
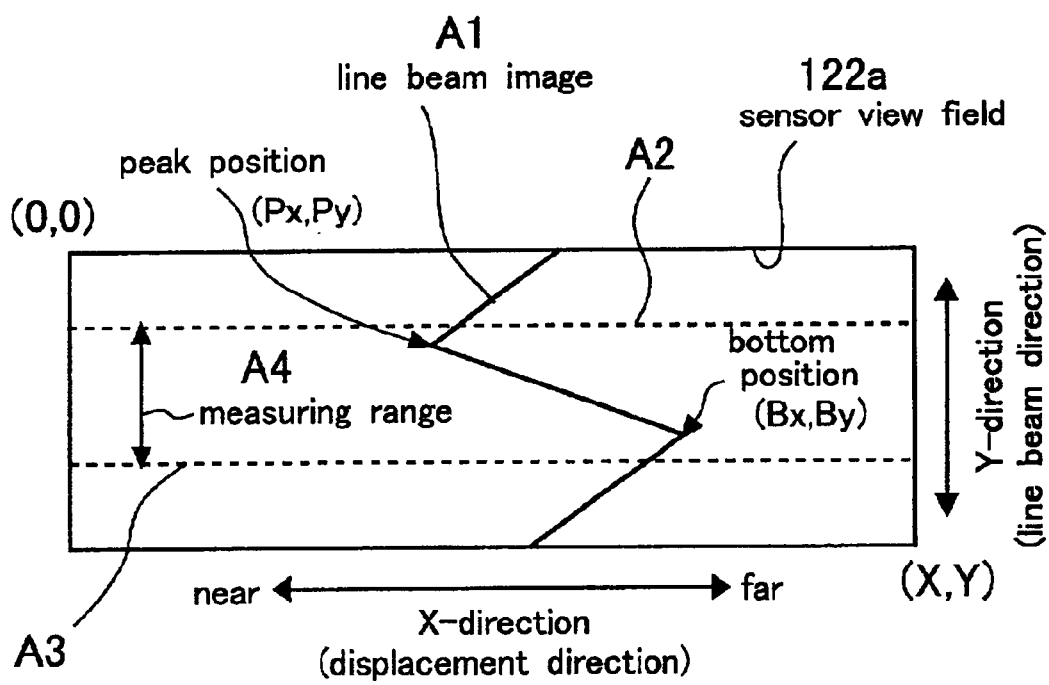
FIG. 8 is a diagram illustrating the measurement point extraction process in the measurement range.

Referring to FIG. 5 once again, the process of extracting characteristic points from a measurement range is conducted as a next step (step 502). The process of extracting characteristic points from a measurement range is illustrated in FIG. 8. As shown in the drawing, the field of view 122a of the sensor includes a measurement range A4 which is defined by a pair of mutually parallel broken lines A2 and A3 extending in the lateral direction in the drawing. In this process of extracting characteristic points, a peak position (Px, Py) and a bottom position (Bx, By) are extracted from the measurement range (measurement point extracting range) by using a prescribed characteristic point extracting algorithm. As will be described hereinafter, the start point line A2 and the end point line A3 are defined by the user in advance.

Figure 9:
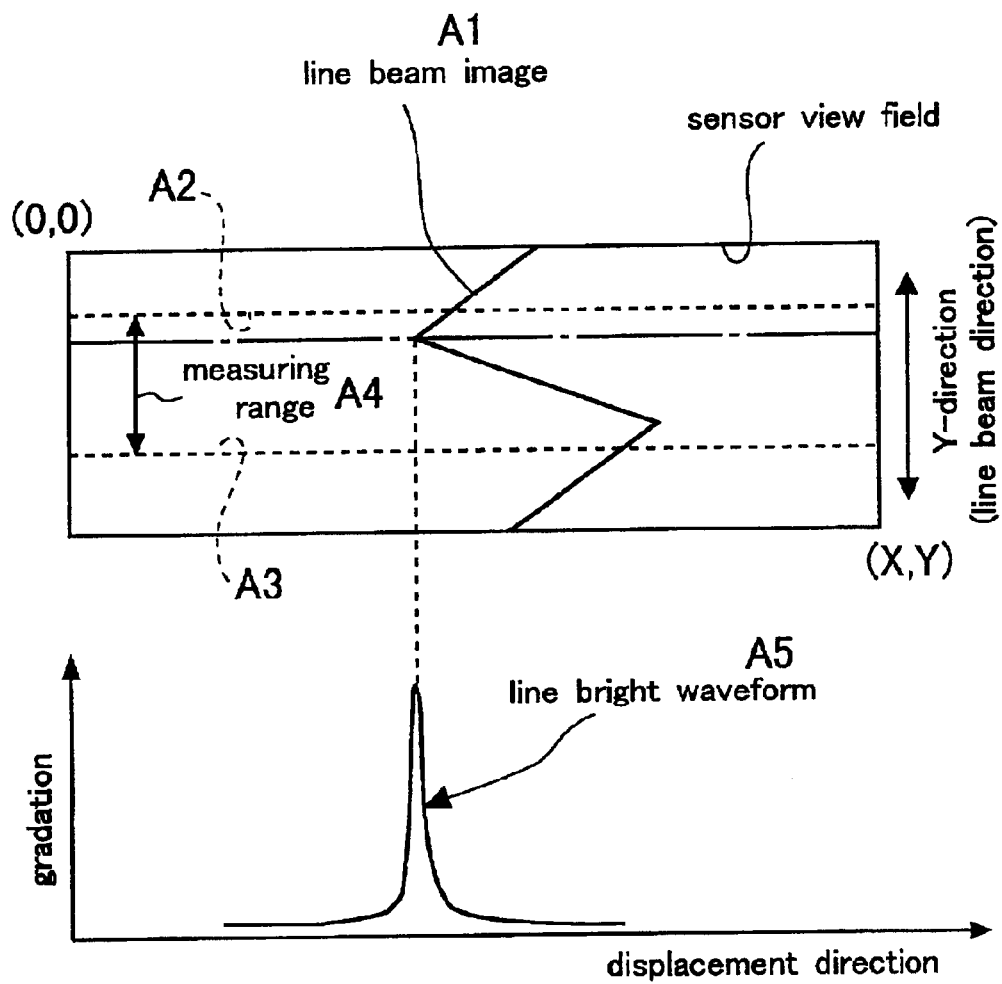
FIG. 9 is a diagram showing the relationship between the image captured by the CCD and the line bright waveform.

Referring to FIG. 5 once again, the line bright of a line passing through the characteristic points is extracted in the next step (step 503). A diagram explaining the relationship between the image captured by the CCD and a line bright waveform is shown in FIG. 9. As shown in the drawing, during this line bright extracting process, the intensity of received light at each pixel on the line containing the peak position indicated by the chain-dot line is extracted, and is arranged along the direction of displacement to generate a line bright waveform A5 as shown in the drawing. As shown in FIG. 9, this line bright waveform A5 is drawn on a Cartesian coordinate system by taking the displacement direction along the abscissa and the gradation along the ordinate.

Referring to FIG. 5 once again, measurement point coordinates are extracted from the line bright waveform according to a prescribed extraction algorithm in the next step (step 504). The extraction of the measurement point coordinates are performed through a threshold value determining process and a measurement point coordinate extraction process.

Figure 10:
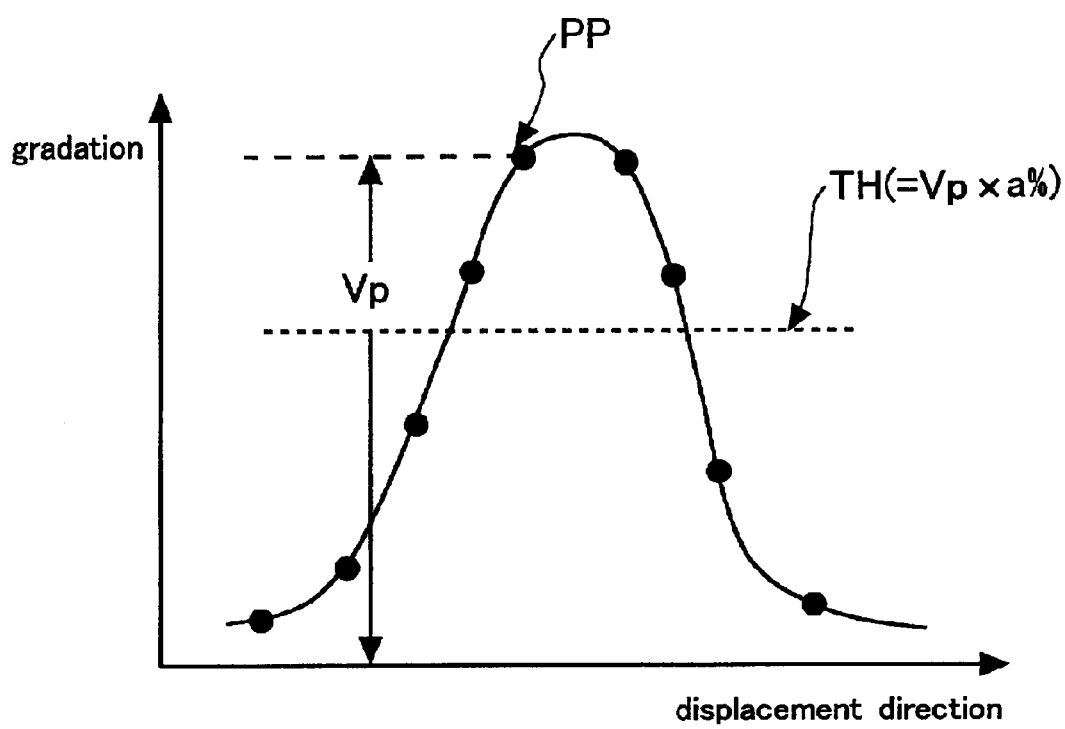
FIG. 10 is a diagram showing the method of determining a threshold value.
Figure 11:
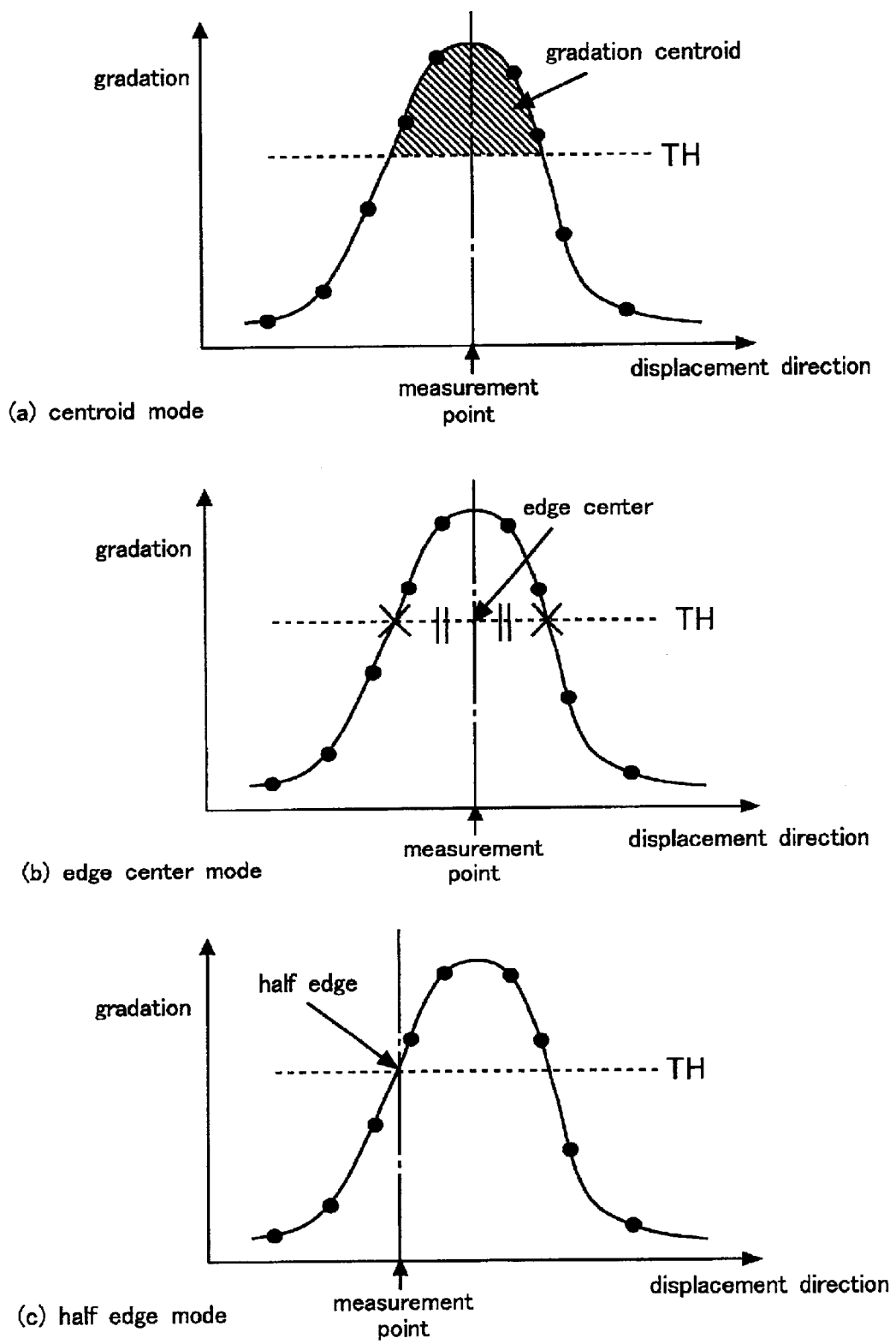
FIG. 11 is a diagram showing the process of extracting measurement point coordinates.

A diagram illustrating an exemplary threshold value determining process is shown in FIG. 10. As shown in the drawing, the determination of the threshold value TH is based on a percentile or a % of the brightness Vp of the pixel demonstrating the peak value PP. In other words, the threshold value is automatically determined from the equation TH=Vp×a (%). A diagram illustrating an exemplary measurement point coordinate extraction process is given in FIG. 11. The measurement point coordinate extraction process can be performed in any of three modes including a centroid mode, an edge center mode and a half edge mode, in this embodiment. According to the centroid mode, as shown in FIG. 10(a), the measurement point is obtained as a centroid of the hatched area where the gradation is higher than the threshold value TH. According to the edge center mode, as shown in FIG. 10(b), the measurement point is obtained as a central point of the intersections between the light bright waveform and the threshold value TH. According to the half edge mode, as shown in FIG. 10(c), the measurement point is obtained as an intersection between one of the two sides of the light bright waveform and the threshold value TH.

Referring to FIG. 5 once again, the displacement is computed from the measurement coordinates in the next step (step 505). This displacement computing process gives the displacement Z by using the following equation if the optical system is based on triangulation.

$$Z = A \times B / (C \times X)$$

where X is the coordinate in the displacement direction and A, B and C are multiplier intrinsic to the optical system.

Referring to FIG. 5 once again, the obtained displacement (and, if necessary, the determination result) is produced to the image monitor 4 and external equipment 6 in the next step (step 506).

Figure 12:
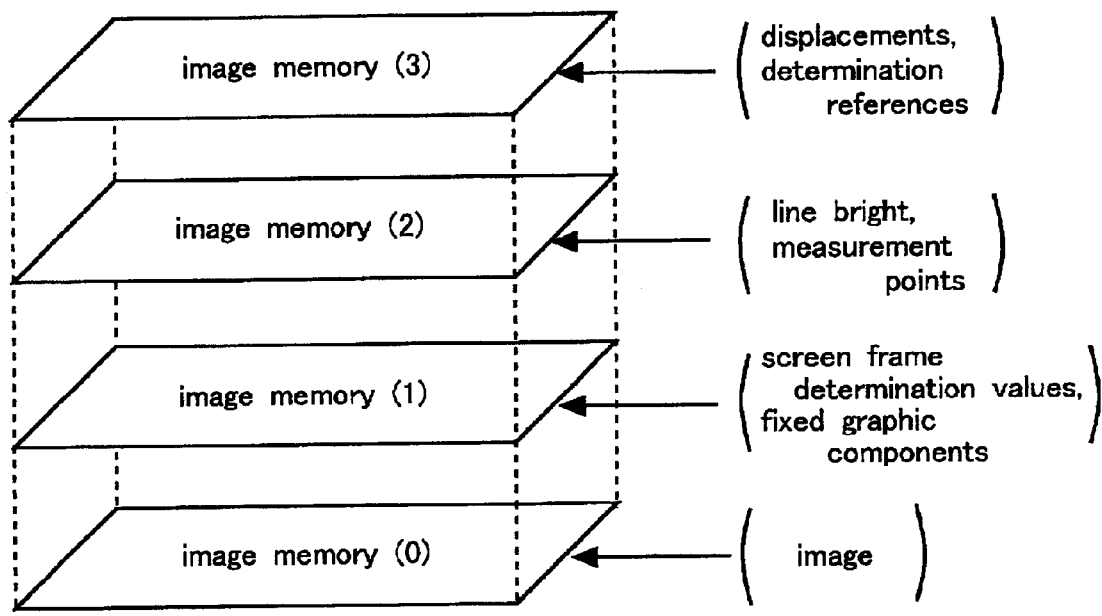
FIG. 12 is a diagram illustrating the method of generating the image on the monitor screen.

A diagram illustrating the process of generating an image on the monitor screen is given in FIG. 12. As shown in the drawing, according to the illustrated embodiment, four layers of image memory (0) to (3) are used. Of these, image memory (0) stores the raw image obtained by the sensor head, image memory (1) stores screen frame determination values and a fixed screen frame portion, image memory (2) stores the line bright and measured values, and image memory (3) stores the displacement and determination reference values. The pieces of data in these layers of image memory (0) to (3) are superimposed one over the other, arranged one next to the other or individually read out to be forwarded to the image monitor 4 as a monitor output (display data) D5 by the action of the GUI unit 121 and image processing unit 122.

Figure 13:
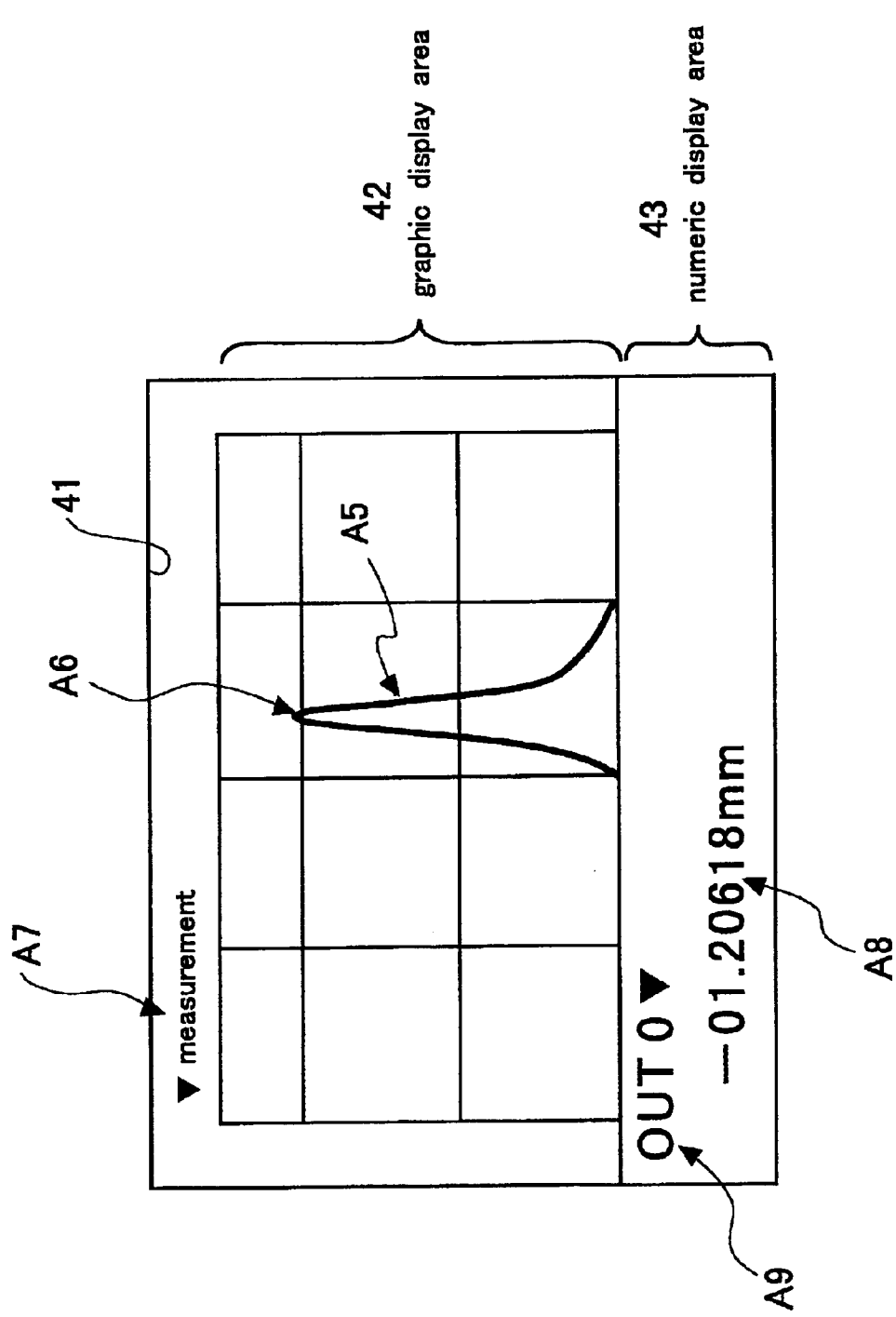
FIG. 13 is a diagram showing an exemplary monitor screen when the displacement sensor of the present invention is under the measurement mode.

A diagram illustrating an exemplary monitor screen of the displacement sensor of the present invention under the measurement mode is shown in FIG. 13. As shown in the drawing, the display screen 41 of the image monitor includes a graphic display area 42 and a numeric display area 43. The graphic display area 42 displays the line bright waveform A5 and a cross symbol A6 indicating the determined measurement point. The numeric display area 43 displays a numeral A8 indicating the measurement displacement and a letter A9 indicating the output port. The letter A7 displayed in the upper part of the display screen 41 above the frame indicates that the current operation mode is the "measurement mode".

Figure 14:
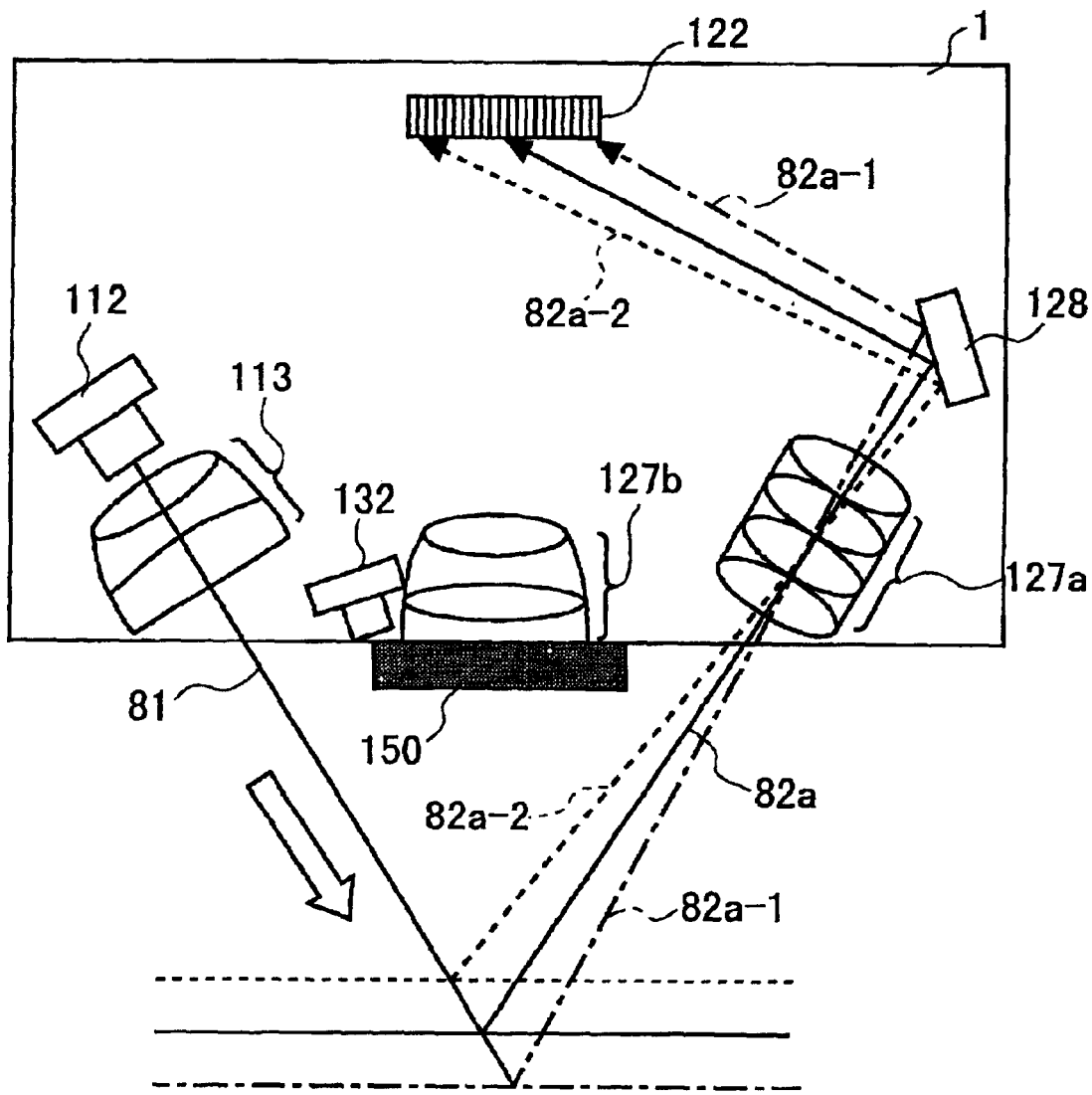
FIG. 14 is a diagram showing the change in the received light path in the displacement sensor of the present invention when the measurement object moves vertically.

As shown in FIG. 14, as the measurement object moves toward and away from the two dimensional CCD 122, the position of the light image moves leftward and rightward, respectively, on the light receiving surface of the two dimensional CCD 122 as indicated by the light path 82a-1 in the case of moving closer and the light path 82a-2 in the case of moving further away. More specifically, as the measurement object surface moves away from the CCD 122, the position of the light image on the light receiving surface of the CCD 122 moves rightward, and as the measurement object surface moves toward the CCD 122, the position of the light image on the light receiving surface of the CCD 122 moves leftward. Therefore, the displacement of the measurement object surface can be accurately measured according to the displacement coordinate of the light image on the CCD 122.

Now, the mode of operation of the controller unit under the observation mode is described in the following with reference to FIG. 15. As discussed earlier, the observation mode can be performed either as the first observation mode or the second observation mode.

When the controller unit 2 operates under the first observation mode, as clearly illustrated in FIG. 15, with the light path of the oblique image acquiring optical system (consisting of the lens assembly 127a and the mirror 128 in this case) shielded by the shutter means (consisting of the mechanical shutter 150 in this case), the light source for measurement (consisting of the red laser diode 112 in this case) is turned off while the illuminator (consisting of the green light emitting diode 132 in this case) is turned on, and the imaging condition is automatically adjusted in such a manner that the measurement position and the image of the surface of the surrounding measurement object can be imaged at an appropriate brightness. Under this condition the control action for displaying the measurement light radiated light position on the surface of the measurement object and the surrounding region on the image monitor according to the video signal VS corresponding to the frontal image obtained by the two-dimensional imaging device (the CCD 122 in this case) is performed. However, even when the measurement light source is kept turned on, by selecting an imaging condition which involves a reduced brightness of the measurement light source and/or shifting the shutter open time period (electric charge accumulation time period) of the two dimensional imaging device to exclude the lighting time period of the measurement light source, it is possible to have the measurement light radiated light source not imaged at all or imaged substantially darker than an appropriate brightness.

The imaging condition which is automatically adjusted according to the set values for the first observation mode includes the brightness control for the illuminator and/or exposure time for the two dimensional imaging device. In other words, as described earlier with reference to FIG. 3, the sensor head control unit 221B forwards the control signal CONT to the sensor head unit 1 so that an optimum image acquiring condition may be read out from the measurement condition storage unit 141, and the CCD control circuit 121 and LED drive circuit 131 are suitably controlled via the timing signal generating circuit 101 according to the obtained optimum image acquiring condition with a result that the adjustment of the brightness control for the illuminator and/or exposure time for the two dimensional imaging device can be accomplished by suitably changing the shutter time of the CCD 122 and the brightness and lighting time period of the LED 132.

According to the first observation mode, the screen of the image monitor 4 displays the image of the circular hole 71 formed in the measurement object 7 and a circular radiated light image 85 surrounding the hole 71 as a circular illuminated area although it is not show in the drawing. At this time, the measurement light image cannot be observed on the screen of the image monitor 4, the positioning of the sensor head with respect to the measurement object can be performed by regarding the center of the screen as the measurement position.

The control action under the second observation mode is described in the following. In the controller unit 2 under the second observation mode, with the light path of the oblique image acquiring optical system (consisting of the lens assembly 127a and a mirror 128 in this case) shielded by the shutter means (consisting of the mechanical shutter 150 in this case), the light source for measurement (consisting of the red laser diode 112 in this case) and the illuminator (consisting of the green light emitting diode 132 in this case) are both turned on, and the imaging condition is automatically adjusted in such a manner that the measurement light radiated light image 83 and the image of the surface of the surrounding measurement object can be imaged at an appropriate brightness. Under this condition the control action for displaying the measurement light radiated light image 83 on the surface of the measurement object and the surrounding region on the image monitor according to the video signal VS corresponding to the frontal image obtained by the two-dimensional imaging device (the CCD 122 in this case) is performed.

Figure 4:
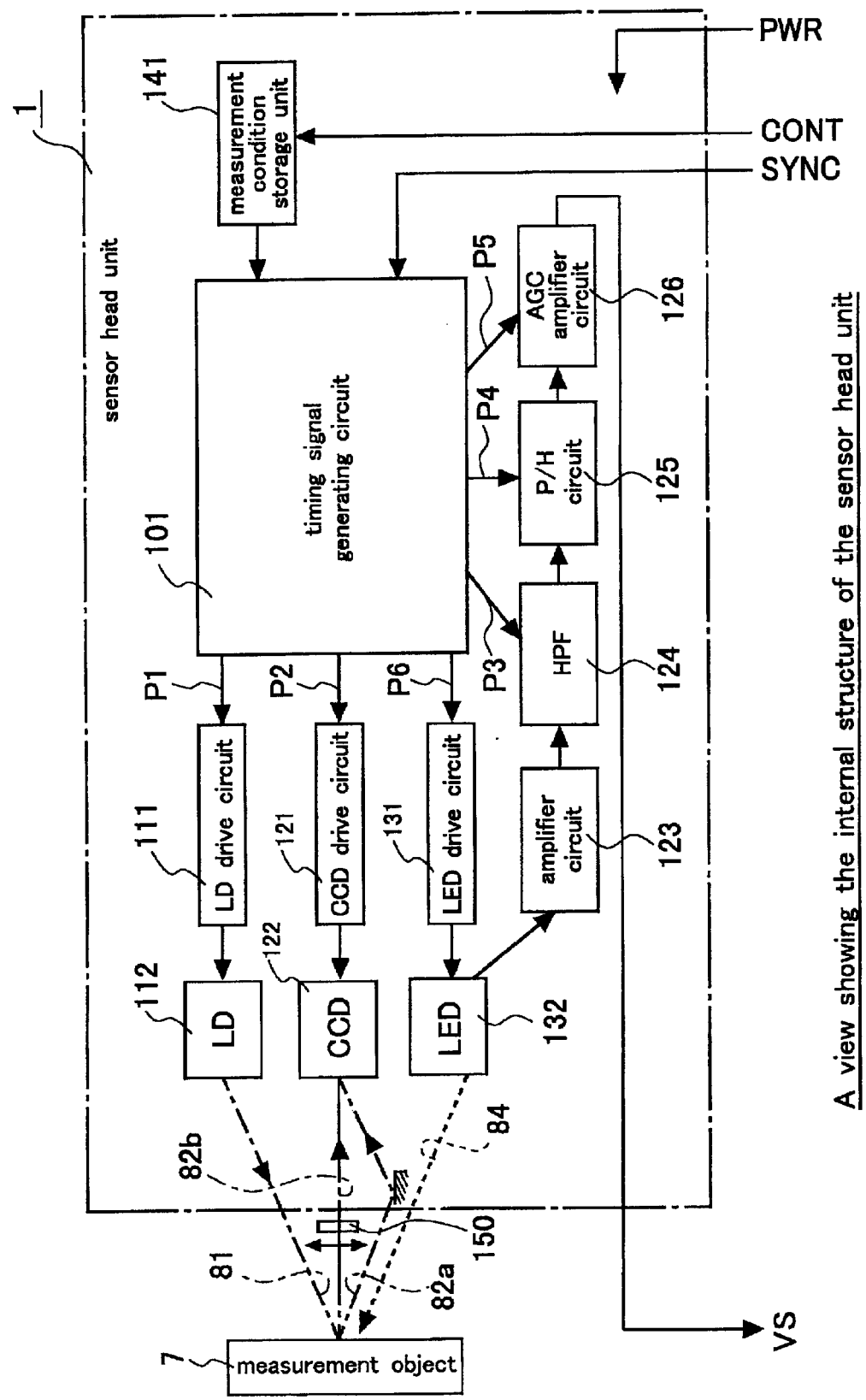
FIG. 4 is a view showing the internal structure of the sensor head unit.

The imaging condition which is automatically adjusted includes the brightness control for the light source for measurement (consisting of the red laser diode 112 in this case), the brightness control for the illuminator (consisting of the green light emitting diode 132 in this case) and/or exposure time for the two dimensional imaging device (the two dimensional CCD 122 in this case). In other words, as described earlier with reference to FIG. 3, the sensor head control unit 221B forwards the control signal CONT to the sensor head unit 1 so that an optimum image acquiring condition may be read out from the measurement condition storage unit 141 shown in FIG. 4, and the LD drive circuit 111, CCD control circuit 121 and LED drive circuit 131 are suitably controlled via the timing signal generating circuit 101 according to the obtained optimum image acquiring condition with a result that an optimum imaging condition is achieved by changing the peak brightness and lighting time period of the laser diode 112, the shutter time of the CCD 122 and the peak brightness and lighting time period of the LED 132.

FIG. 15(b) shows the upper surface of the measurement object directly from above in the second observation mode. In the drawing, numeral 7 denotes the measurement object, numeral 71 denotes the circular through hole formed in the measurement object, numeral 83 denotes the radiated light image formed by impinging the line beam, and numeral 85 denotes the circular radiated light image formed by radiating the illuminating light 84 upon it. The optimum imaging condition for the first observation mode discussed above consists of a condition for clearly capturing the circular hole 71 in the circular light image 85 illuminated by the illuminating light 84, and the optimum imaging condition for the second observation mode discussed above consists of a condition for clearly capturing both the circular hole 71 and the line beam radiated light image 83 in the circular light image 85 illuminated by the illuminating light 84.

FIG. 17 includes a view showing an exemplary monitor screen under the observation mode using the frontal image acquiring optical system as shown in FIG. 15, and a view showing an exemplary monitor screen in the observation mode using the oblique image acquiring optical system (measurement light path) as shown in FIG. 16. The monitor screen shown in FIG. 17(a) corresponds to the received light path shown in FIG. 15(a), and the monitor screen shown in FIG. 17(b) corresponds to the light path shown in FIG. 16(a).

As can be seed from these drawings, when an attempt is made to observe the image using only the oblique image acquiring optical system (consisting of the lens assembly 127a and the mirror 128) without using the frontal image acquiring optical system (consisting of the lens assembly 127a) which can view the measurement position on the measurement object and the surrounding region from directly above, the image A10-2 corresponding to the circular hole distorts into an elliptic shape as shown in FIG. 17(b). Therefore, it is not possible to accurately verify the positional relationship between the line beam radiate light image 83 and the circular hole 71.

On the other hand, when an attempt is made to observe the image using the frontal image acquiring optical system (consisting of the lens assembly 127b) as shown in FIG. 15(a), the image A10-1 corresponding to the circular hole 71 is displayed as a truly circular image without any distortion as shown in FIG. 17(a). Therefore, it is possible to accurately verify the positional relationship between the line beam radiate light image 83 and the circular hole 71, and this allows the positioning of the line beam radiated position onto a desired point for measurement to be made in an appropriate manner.

According to the basic embodiment of the displacement sensor according to the present invention which is described above, a highly reliable measurement process can be carried out in the measurement mode relying only on the light image from the oblique image acquiring optical system (corresponding to the lens assembly 127a and mirror 128) while disregarding the light image from the frontal image acquiring optical system (corresponding to the lens assembly 127b).

In the first observation mode, the peripheral image (the measurement position on the measurement object and the surrounding region) is displayed on the screen of the image monitor 4 without any distortion by relying only on the light image from the frontal image acquiring optical system while disregarding the light image from the oblique image acquiring optical system. Furthermore, because the distance between the measurement object 7 and the sensor head 1 is short, and the sensor head 1 is located closely over the measurement object 7, even when the brightness of the surface of the measurement object is not adequate, a clear image can be displayed on the screen of the image monitor 4 by brightly illuminating the surface of the measurement object 7.

In the second observation mode, the peripheral image (the measurement position on the measurement object and the surrounding region) without any distortion and the measurement light radiate light image (a spot or linear light image which is formed on the surface of the measurement object as a result of the radiation of the measurement light) are displayed on the screen of the image monitor 4 one over the other by relying only on the light image from the frontal image acquiring optical system (corresponding to the lens assembly 127b) while disregarding the light image from the oblique image acquiring optical system (corresponding to the lens assembly 127a and mirror 128). Furthermore, because the distance between the measurement object 7 and the sensor head 1 is short, and the sensor head 1 is located closely over the measurement object 7, even when the brightness of the surface of the measurement object is not adequate, a clear image can be displayed on the screen of the image monitor 4 by brightly illuminating the surface of the measurement object 7.

According to the displacement sensor of the present invention, the observation mode does not necessarily require to include the two different observations modes as was the case with the above described embodiment. In other words, the present invention can be implemented as a combination of the measurement mode and first observation mode or a combination of the measurement mode and second observation mode.

The displacement sensor of the present invention is not necessarily required to have an illuminator. When an illuminator is not used, the resulting shortage of brightness on the surface of the measurement object can be compensated by the automatic adjustment of the imaging condition in the measurement mode by suitably adjusting the brightness control for the measurement light source and/or exposure time for the two dimensional imaging device.

The light paths in the frontal image acquiring optical system and the oblique image acquiring optical system described above in connection with the basic embodiment of the present invention should be considered only as exemplary. For instance, the CCD imaging device 122 may be provided at the position of the mirror 128 and the light path for the frontal image acquiring optical system may be refracted by using a mirror so as to be directed to a CCD provided on an extension of the oblique image acquiring optical system without departing from the spirit of the present invention.

In the displacement sensor of the present invention, it is not necessarily requisite that a common two dimensional imaging device is used for the frontal image acquiring optical system and the oblique image acquiring optical system as was the case in the basic embodiment described above. Two separate two dimensional imaging devices may be used for these two optical systems. For instance, a CCD imaging device for the frontal image acquiring optical system may be provided in the position of the CCD imaging device 122 of the basic embodiment while a CCD imaging device for the oblique image acquiring optical system is provided near the position of the mirror 128.

The shutter is also not required to shield the light path of the frontal image acquiring optical system and the oblique image acquiring optical system in an alternative manner, but may also be capable of shielding only the light path of the frontal image acquiring optical system so as to shut off only the light path of the frontal image acquiring optical system under the measurement mode. In this case, simply by turning off the measurement light under the observation mode, the light image of the measurement light would not be doubly displayed.

The shutter may be adapted to be opened and closed by an electric control. Thereby, it is possible to automatically open and shut the shutter according to the switch over between the measurement mode and observation mode. Remote control is also possible if necessary. To electrically control the shutter, a mechanical shutter may be actuated with an electric motor or solenoid. It is also possible to form a shutter with a liquid crystal panel which can be switched between a transparent state and an opaque state.

According to the displacement sensor of the present invention, having two image acquiring optical systems is not necessarily requisite as opposed to the basic embodiment described above. The present invention requires only at least one image acquiring optical system. For instance, the displacement sensor may include only either one of an oblique image acquiring optical system and a frontal image acquiring optical system, and the image acquiring optical system may be used commonly for both the measurement mode and the observation mode.

Figure 18:
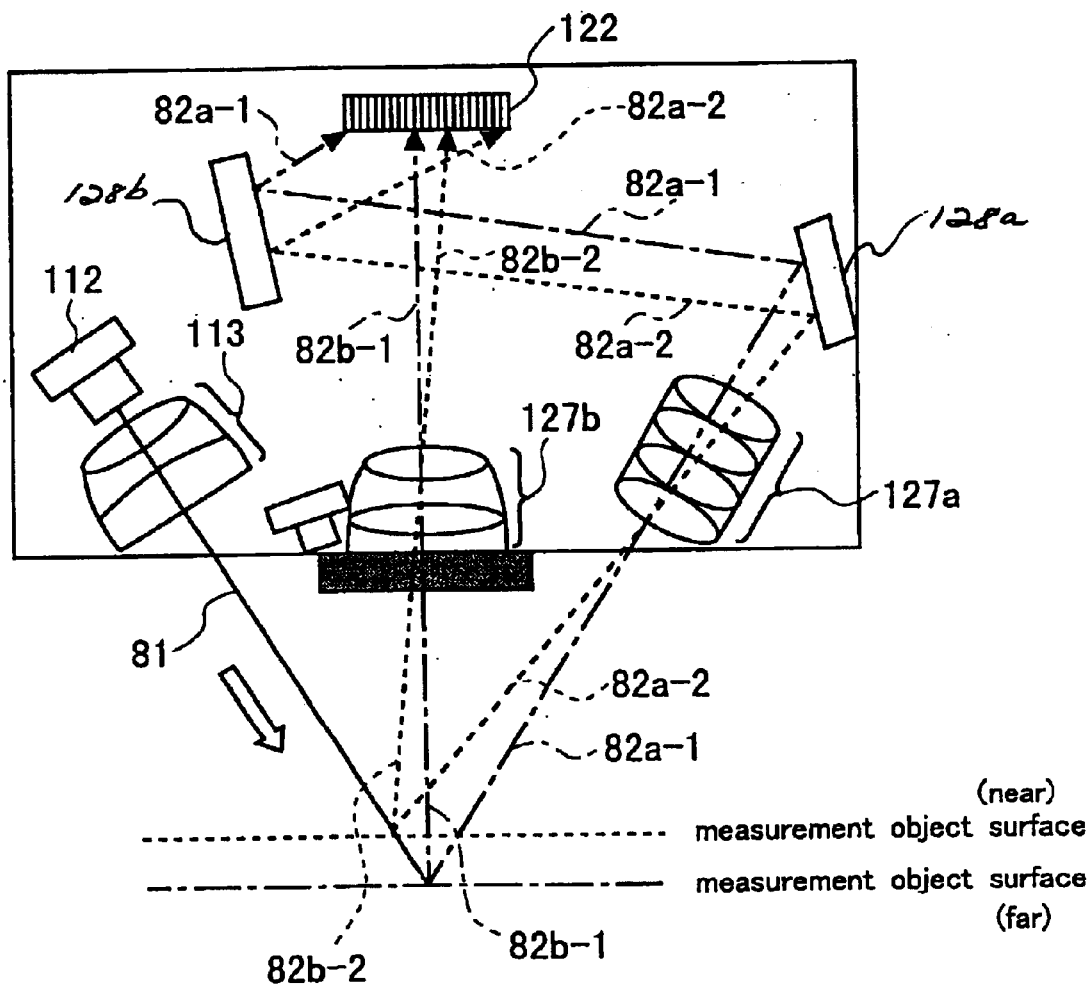
FIG. 18 is a view showing a modified embodiment of the sensor head of the present invention.

A modified embodiment of the sensor head of the present invention is illustrated in FIG. 18. The sensor head given as the modified embodiment is provided with two features. The first feature consists of the use of an optical filter for automatically switching between the first light path reaching the imaging device via the oblique image acquiring optical system and the second light path reaching the imaging device via the frontal image acquiring optical system. The second feature consists of the use of a light axis refracting mechanism for moving the light image of the measurement light formed on the surface of the imaging device via the frontal image acquiring optical system and the light image of the measurement light formed on the surface of the imaging device via the oblique image acquiring optical system are allowed to move in the same direction on the light receiving surface of the imaging device for a given change in the measured displacement.

In other words, as shown in FIG. 18, the inlet of the lens assembly 127a forming the oblique image acquiring optical system is provided with a first optical filter 161 having a band pass property substantially allowing the passage of the measurement light (the light from the red laser diode 112 in this case). The inlet of the lens assembly 127b forming the frontal image acquiring optical system is provided with a second optical filter 162 having a band pass property substantially allowing the passage of the illuminating light (the light from the green light emitting diode 132 in this case).

Therefore, even when the red laser diode 112 and green light emitting diode 132 are both turned on, the light passing through the oblique image acquiring optical system is limited to the measurement light while the light passing through the frontal image acquiring optical system is limited to the illuminating light. As result, without requiring to operate a shutter mechanism either manually or electrically, the light path can be automatically selected by virtue of the light itself.

As for the optical filters, it is possible to use only the second optical filter and omit the first optical filter. In this case, by not turning on the illuminator under the measurement mode, it is possible to obtain an image suitable for measurement which contains substantially nothing other than the light image of the measurement light. In this case, simply by turning off the measurement light under the observation mode, the light image of the measurement light would not be doubly displayed.

A first mirror 128a is provided on an extension line of the incident light axis of the lens assembly 127a forming the oblique image acquiring optical system to refract the light path to the left of the CCD 122. Likewise, a second mirror 128b is provided to the left of the CCD 122 to refract the light that has been refracted by the fist mirror 128a once again onto the light receiving surface of the CCD 122.

According to this structure, when the surface of the measurement object moves toward and away from the sensor, the light image of the measurement light formed on the surface of the imaging device via the frontal image acquiring optical system and the light image of the measurement light formed on the surface of the imaging device via the oblique image acquiring optical system are allowed to move in the same direction on the light receiving surface of the imaging device according to the given change in the measurement displacement.

More specifically, with respect to the oblique image acquiring optical system, as can be appreciated from the comparison between the light axis 82a-1 when the measurement object surface is located further away and the light axis 82a-2 when the measurement object surface is located near, the light image on the light receiving surface of the CCD 122 moves rightward as the measurement object surface comes closer. Likewise, with respect to the frontal image acquiring optical system, as can be appreciated from the comparison between the light axis 82b-1 when the measurement object surface is located further away and the light axis 82b-2 when the measurement object surface is located near, the light image on the light receiving surface of the CCD 122 moves rightward as the measurement object surface comes closer. In other words, as the measurement object surface comes closer, the light images reaching the light receiving surface of the CCD 122 via the two different optical systems both move rightward.

Therefore, according to this structure, when the oblique image and frontal image are both displayed on the screen of the image monitor one over the other, the oblique image and frontal image both move in the same direction as the measurement displacement changes, and this creates a natural impression on the user.

Furthermore, by designing the optical system in such a manner that the movement of the measurement light radiated light image on the light receiving surface of the CCD 122 is the same for the oblique image and frontal image for a given displacement of the measurement object surface, it is possible to observe the two images which are integral to each other.

As can be readily appreciated by a person skilled in the art, even when the modified embodiment of the sensor head illustrated in FIG. 18 is used, it is possible to form a displacement sensor having the measurement mode and the first and second observation modes in a similar manner as in the basic embodiment.

According to this embodiment of the displacement sensor using a sensor head which selects the light axis by using an optical filter, the sensor head 1 and the controller unit 2 can be integrally or separately formed.

The sensor head 1 comprises a measurement light emitting optical system (corresponding to the lens assembly 113) for emitting measurement light 81 onto a measurement position of an measurement object 7 from a oblique angle, an oblique image acquiring optical system (including the lens assembly 127a, first mirror 128a and second mirror 128b) for capturing an image by viewing the measurement position of the measurement object 7 and a surrounding region from an oblique angle, a frontal image acquiring optical system (corresponding to the lens assembly 127b) for capturing an image by viewing the measurement position of the measurement object and the surrounding region from the front, a two dimensional imaging device (corresponding to the two dimensional CCD 122) commonly provided for the two image acquiring optical systems, an illuminator (corresponding to the green light emitting diode 132) for illuminating the measurement position of the measurement object and the surrounding region with light from an illuminator light source, a first optical filter 161 interposed in a first light path reaching an imaging device (corresponding to the two dimensional CCD 122) via the oblique image acquiring optical system (including the lens assembly 127a, first mirror 128a and second mirror 128b) and having a band pass property substantially allowing the passage of the measurement light (the light from the red laser diode 112), and a second optical filter 162 interposed in a second light path reaching the imaging device (corresponding to the two dimensional CCD 122) via the frontal image acquiring optical system (corresponding to the lens assembly 127b) and having a band pass property substantially allowing the passage of the illuminating light (corresponding to the light from the green light emitting diode 132). The band pass property as used herein preferably includes the capability to pass only the measurement light or illuminating light.

The controller unit 2 is adapted to operate under a measurement mode, a first observation mode and a second observation mode. The switch over between these observation modes can be accomplished via the operation of the console unit 3, for instance.

When the controller operates under the measurement mode, with a light source for measurement (corresponding to the red laser diode) turned on while the illuminator (corresponding to the green light emitting diode 132) is turned off, an imaging condition is automatically adjusted in such a manner that a light image 83 radiated by measurement light can be imaged at an appropriate, and a desired displacement is computed according a video signal vs corresponding to the oblique image obtained by the two dimensional imaging device (corresponding to the two dimensional CCD 122).

When the controller operates under the first observation mode, with a light source for measurement (corresponding to the red laser diode 112) turned off while the illuminator (corresponding to the green light emitting diode 132) is turned on, an imaging condition is automatically adjusted in such a manner that an image of the measurement position of the surface of the measurement object and the surrounding region can be imaged both at an appropriate brightness, and the measurement light radiated position of the surface of the measurement object and the surrounding region may be displayed on the screen of an image monitor according a video signal vs obtained by the two dimensional imaging device (corresponding to the two dimensional CCD 122).

When the controller operates under the second observation mode, with a light source for measurement (corresponding to the red laser diode 112) and the illuminator (corresponding to the green light emitting diode 132) both turned on, an imaging condition is automatically adjusted in such a manner that a light image 83 radiated by the measurement light and a surrounding part (such as the circular hole 71) of the measurement object can be imaged both at an appropriate brightness, and an image of the measurement light radiated light image 83 and the surrounding region may be displayed on the screen of an image monitor according a video signal vs corresponding to the frontal image obtained by the two dimensional imaging device (corresponding to the two dimensional CCD 122).

The imaging condition which is automatically adjusted under the measurement mode may include the brightness control for the measurement light source and/or exposure time for the two dimensional imaging device. The imaging condition which is automatically adjusted under the first observation mode may include the brightness control for the illuminator and/or the exposure time for the two dimensional imaging device. The imaging condition which is automatically adjusted under the second observation mode includes the brightness control for the measurement light source, brightness control for the illuminator and/or exposure time for the two dimensional imaging device.

In this modified embodiment of the displacement sensor of the present invention also, as shown in FIG. 17, a peripheral image free from distortion can be shown on the screen of the image monitor, if necessary displayed along with the radiated light image 83 of the line beam, and this can be used for the positioning adjustment at the time of installation. Furthermore, because the radiated light image 83 of the line beam and the peripheral image move in the same direction for a given change in the displacement, the user receives a natural impression and finds no difficulty in using the displacement sensor at the time of distance adjustment for initial installation.

Figure 22:
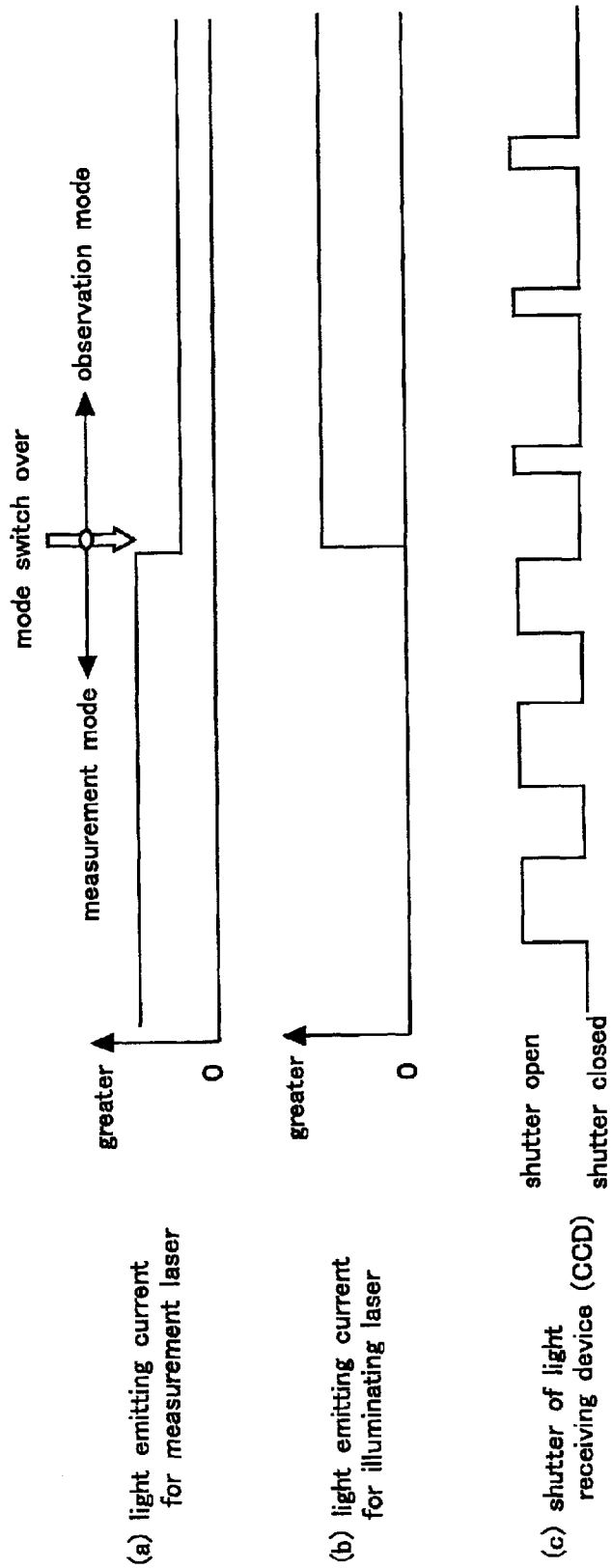
FIG. 22 is a view showing the operation of the measurement laser, LED for illumination and CCD both under the measurement mode and observation mode for comparison.

FIG. 22 shows an example of automatically adjusting the imaging condition when both the measurement light and illuminating light are used. As shown in the drawing, when the controller operates under the measurement mode, light emitting electric current for the measurement laser is somewhat increased, the illuminating LED is turned off, and the shutter open time period for the light receiving element (CCD) is increased to a long time period. Owing to such an arrangement, one can obtain a video signal which is optimum for measurement involving a sharp radiated light image of the measurement light. On the other hand, when the controller operates under the observation mode, light emitting electric current for the measurement laser is somewhat decreased, the illuminating LED is turned on, and the shutter open time period for the light receiving element (CCD) is decreased to a short time period. Under this condition, with the brightness of the illuminating light increased, the brightness of the measurement light decreased and the exposure time period of the light receiving device reduced, one can obtain a video signal corresponding to the radiated light image of the measurement light and the peripheral image both in a highly clear state. The measurement laser and/or the illuminating LED may also be lighted in pulses. In such a case, the average brightness can be adjusting by changing the time duration of the on period.

Figure 23:
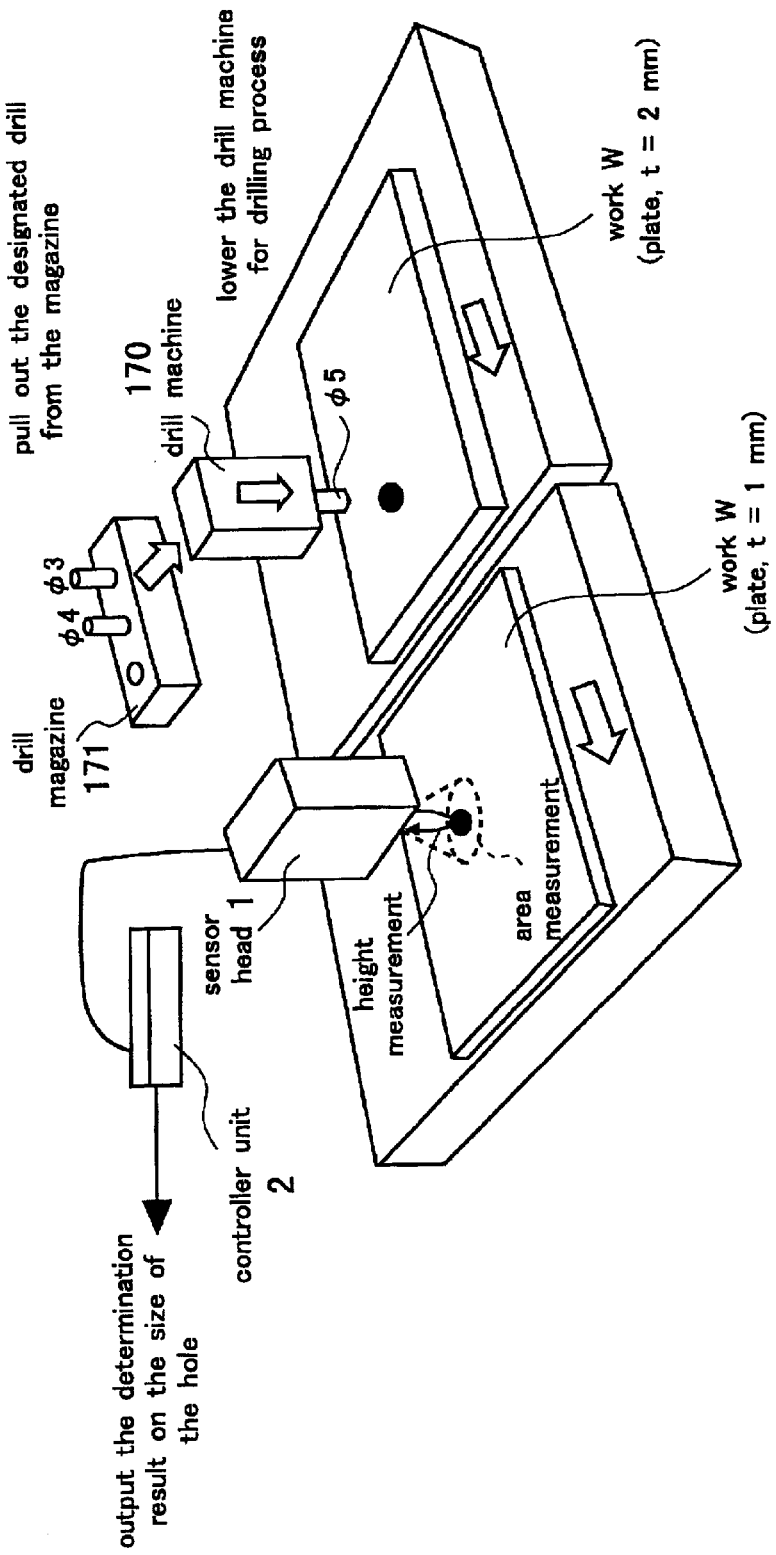
FIG. 23 is a view showing an exemplary application of the displacement sensor of the present invention.

FIG. 23 is a view showing an exemplary application of the displacement sensor of the present invention. In the drawing, letter W denotes work pieces which are transported on a conveyor or the like, numeral 170 denotes a drilling machine which is provided in an intermediate point of the conveyor and adapted to drill holes of various sizes in each work piece W, numeral 171 denotes a drill magazine for storing drills for the drilling machine 170, numeral 1 denotes a sensor head unit according to the present invention, and numeral 2 denotes a controller unit according to the present invention.

In this example, as the work pieces W having varying thickness are being conveyed, a prescribed drilling work is performed by using the drilling machine 170, and the sensor head 1 and controller unit 2 verify if the drilling work has been properly performed.

The verification of the size of each hole by the sensor head 1 can be accomplished by counting the pixels in a circular part in the image obtained by the frontal image acquiring optical system. However, if the thickness of each work piece varies, the relative position between the sensor head 1 and the upper surface of each work piece W varies accordingly. Therefore, simply counting pixels would not allow the size of each hole to be verified. Therefore, in this embodiment, the distance between the sensor head 1 and work piece W is measured via the oblique image acquiring optical system, and the count of the pixels is adjusted according to the measurement distance so that a proper measurement of the size of each hole is enabled without regard the variation in the thickness of the work pieces W.

Thus, the displacement sensor of the present invention enables a highly accurate measurement of distances and areas on the measurement object according to the image formed on the CCD 122 via the frontal image acquiring optical system, and also allows computation of areas and distances in a highly accurate manner by adjusting the measured values with the results of the original displacement measurement.

In the embodiments described above, where the controller unit 2 should operated under the measurement mode or the observation mode is determined by a command entered from the console unit 3. The displacement sensor of the basic embodiment operates as described in the following.

Referring to FIGS. 1 and 6 in particular, the controller unit 2 is set up for the first or second observation mode by operating the console unit 3, and the shutter 150 is placed at the position for shutting off the light path of the oblique image acquiring optical system. The sensor head unit 1 is then positioned with respect to the measurement object 7 so that the measurement light 81 is radiated upon a region near the measurement position, and the relative position between sensor head 1 and measurement object 7 is adjusted while viewing the image of the region near the measurement position displayed on the image monitor 4.

The console unit 3 is then operated to set the control unit 2 to the measurement mode, and the shutter 150 is placed at the position to shut off the light path of the frontal image acquiring optical system to start the measurement. The controller unit 2 can display the image acquired via the oblique image acquiring optical system on the image monitor 4 while operating under the measurement mode.

The measurement light source is turned on and the imaging condition is adjusted in such a manner that the measurement light radiated light image and the surrounding surface region of the measurement object are both imaged at appropriate brightness under the second observation mode of the basic embodiment, but the embodiment of the second observation mode may be modified as described in the following. More specifically, the controller 2 may be adapted to repeatedly carry out a shot under the imaging condition where a measurement light radiated light image is not imaged at all or imaged substantially darker than an appropriate brightness and the measurement position of the measurement object and the surrounding surface of the measurement object are imaged at an appropriate brightness, and a shot under the imaging condition where with the measurement light source turned on a measurement light radiated light image can be imaged at an appropriate brightness but a surrounding surface of the measurement object can be imaged substantially darker than an appropriate brightness, in an alternating manner. At this time, the obtained image may to displayed on the image monitor 4 every time. This causes an image substantially consisting solely of the surface image of the measurement object and an image substantially consisting solely of the measurement light radiated light image to be shown in an alternating fashion in rapid succession. As a result, the viewer would get the impression that both of them are imaged at an appropriate brightness. In this case, instead of performing a single shot under each imaging condition one after the other, a plurality of shots under one condition and another plurality of shots under another condition may be performed in an alternating manner. If the period for changing the imaging condition is long enough, the viewer can identify the images under different conditions as separate images and observe them in a proper positional relationship.

As an alternate display mode, by performing shots under two different imaging conditions in an alternating manner as described above, and combining the obtained images into a single image by controller unit 2 and then to display it on the image monitor 4, the measurement light radiated light image and the surrounding surface region of the measurement object can be displayed both at a proper brightness.

The measurement mode and observation mode were switched over by the operation of the console unit 3 in the basic embodiment, but the controller unit 2 may perform the action for the measurement mode and the action for the observation mode in a time shared manner as another possible embodiment. More specifically, the controller unit 2 in this embodiment repeatedly carries out one or a plurality of shots under the measurement mode and one or a plurality of shots under the observation mode in an alternating manner. By so doing, the displacement measurement can be carried out as the surface image of the measurement object is displayed on the image monitor. The image monitor 4 would not display the image obtained under the measurement mode but only the image obtained under the observation mode so that the displacement measurement may be conducted while verifying the state of the measurement position with the frontal image. If the console unit 3 is adapted to manually select one the image obtained under the measurement mode and the image obtained under the observation mode, and only the selected image is displayed on the image monitor, it is possible to verify the state of the image which is actually used for measurement at will.

Figure 24:
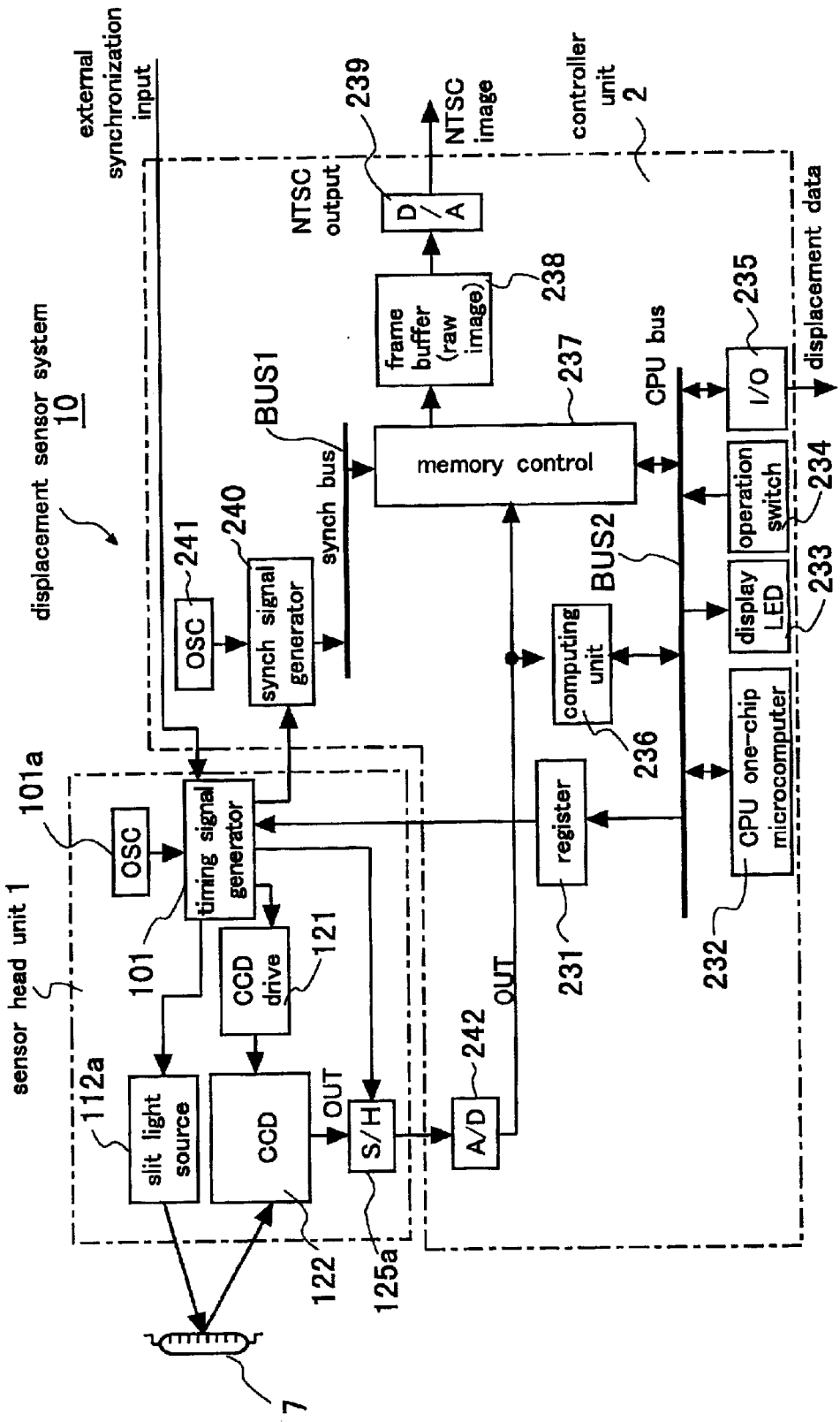
FIG. 24 is a block diagram showing the electric structure of the displacement sensor of the present invention.

FIG. 24 is a block diagram showing the electric hardware structure of a displacement sensor embodying the present invention.

Referring to the drawing, this displacement sensor system 10 essentially consists of a sensor head unit 1 forming an image capturing unit for capturing the image of the surface of a measurement object 7 showing a measurement light radiated thereon from such an angle that the change in position of the measurement light radiated light image corresponding to the displacement of the measurement object 7 can be viewed, and a controller unit 2 for computing the measurement object displacement and producing it as displacement data by processing the image obtained by the sensor head unit 1.

The sensor head unit 1 produces a required timing signal according to an oscillator (OSC 201) and a transfer protocol table stored in a register 231 provided in the controller unit 2, and forwards it to a CCD drive 121 and a slit light source (measurement light emitting optical system) 112a. The slit light source 112a consists of a laser diode (measurement light source) 112 and a slit 208 as described hereinafter, and produces sectional light (measurement light) for the light section method to impinge it onto the measurement object 7. The measurement light radiated light image (linear bright light) 83 is formed on the surface of the measurement object 7 by measurement light radiating upon it. The surface of the measurement object 7 on which the linear bright line is detected is captured by the two-dimensional imaging device consisting of a CCD 122. The CCD 122 is controlled of its signal transfer by transfer pulses TP1 to TP3 forwarded from the CCD drive 121 as described hereinafter. The video signal obtained from the CCD 122 is smoothly shaped by a sample hold circuit 125, and forwarded to the controller unit 2.

Figure 25:
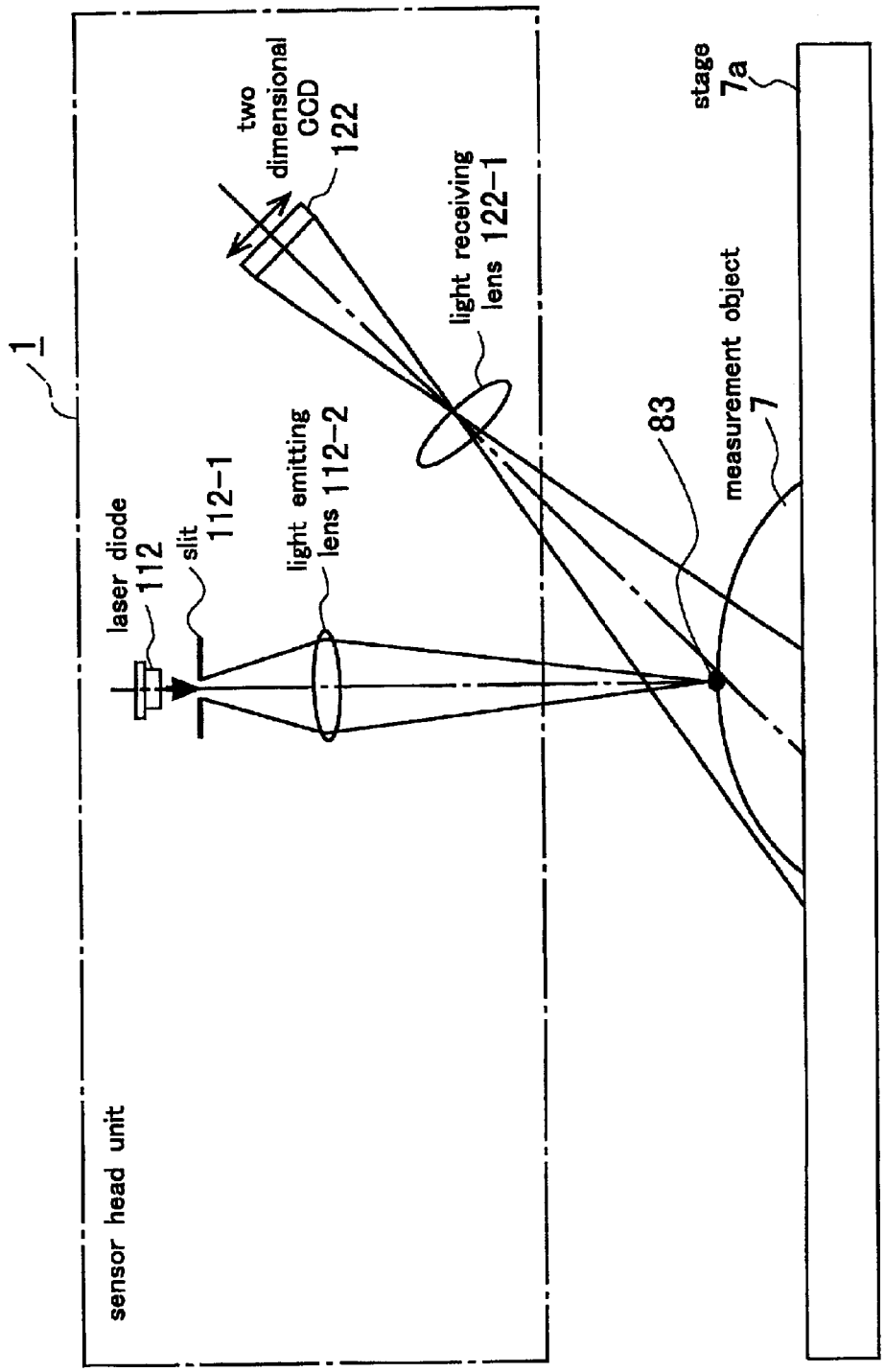
FIG. 25 is a diagram showing the optical system of the sensor head of the displacement sensor of the present invention.

FIG. 25 shows the optical system of the sensor head unit 1. In this drawing, numeral 112 denotes a laser diode, numeral 112-1 denotes a slit, numeral 112-2 denotes light emitting lens, numeral 83 denotes a measurement light radiated light image, numeral 122-1 denotes a light receiving lens, numeral 122 denotes a CCD, numeral 7 denotes a measurement object, and numeral 7A denotes a stage on which the measurement object is placed. The laser beam emitted from the laser diode 112 is shaped into a light beam having a linear cross section (so-called line beam) by passing through the slit 112-1, and impinged upon the surface of the measurement object 7. The resulting measurement light radiated light image 83 is captured by the CCD 122 from a prescribed angle via the light receiving lens (image acquiring optical system) 122-1. As well known in the art, the image capturing angle of the CCD 122 is determined in such a manner that the position of the light image 83 changes with the change in the height of the measurement object 7. The details of the CCD 122 and the drive method therefore will be described in greater detail hereinafter.

The image monitor process is described in the following. As shown in FIG. 24, the sensor main unit 2 comprises a CPU 232 forming a one-chip microcomputer, an LED 233 serving as an indicator lamp, an operation switch 234, I/O circuit 235, a computing unit 236, a memory control unit 237, a frame buffer 238, a D/A converter 239, a register 231, a synchronization signal generating unit 240, and an oscillator (OSC) 241. BUS 1 denotes a synchronization bus, and BUS2 denotes a CPU bus.

The CPU 232 forming the one-chip microcomputer controls the controller unit 2 as a whole. The computing unit 236 is a special hardware circuit dedicated to the various computations that are required to image processing, and performs various processes on the image data acquired through the A/D converter 242. The processed image is then stored in the frame buffer 238 via the memory control unit 239, and is forwarded to an external image monitor such as an external CRT display as an NTSC image via D/A converter 239 if necessary.

The register 231 stores a transfer protocol table that is required for the operation of the sensor head unit 1, and as will be described hereinafter in connection with FIG. 36, the contents of this transfer protocol table give the values of L1, L2 and OE for the corresponding horizontal period counter values.

The LED 233 for display indicates the state of operation of the controller unit 2, and the operation switch 234 is designed for entering various commands to the controller unit 2. The I/O circuit 235 produces the displacement data measured by the controller unit 2 to the outside, and receives signals for the synchronization sensor 5 from outside.

The displacement data includes a switching signal indicating the result of comparing the measurement value with the reference value as well as the measurement value itself. The operation of the controller unit 2 is controlled by a synchronization signal obtained from the oscillator (OSC) 241 and synchronization signal generating unit 240.

The monitoring process by the displacement sensor system 10 described above is now described in the following in terms of a concrete example.

A time chart showing the superimposing process of a slit light image (line beam radiated light image) and a work surface image is given in FIG. 26. Referring to this drawing, VD denotes a vertical reference signal, VBLK denotes a signal indicting the presence or absence of an image in the video signal, and the transfer pulse TP1 is a pulse for transferring electric charges from each light receiving pixel to the corresponding vertical transfer shift register VR (which is described hereinafter).

Upon the start of the first cycle (1), the shutter opens. More specifically, the electric charges which have been accumulated owing to the preceding photoelectric conversions are discharged, and the accumulation of electric charges is started anew. At the same time the laser diode 112 is powered ON for a short time period. The shutter is kept open during the second cycle (2). Upon the start of the third cycle, the shutter closes. At the same time, the transfer pulse TP1 is produced. Then, the electric charges accumulated in the pixel are transferred to the vertical shift register VR. As a result, when the third cycle (3) starts, the image formed by superimposing the surface raw image of the measurement object and the radiated light image produced by the measurement laser light is obtained as the effective image. Thus, according to this embodiment, the shutter is kept open during two vertical cycles, and the laser diode 112 is turned on for a short time period at the start of the first cycle so that the image formed by superimposing the slit light image and the work surface image can be monitored. This is an example of the second observation mode discussed earlier in connection with the previous embodiment.

As another possible embodiment, if the open period of the shutter is limited to the lighting period of the laser diode, a slit light image containing almost no surface raw image of the work can be obtained. This is an example of the measurement mode. If the shutter open period is shifted away from the lighting period of the laser diode and the shutter open period is similarly extended to two cycles or thereabout, a slit light image containing no surface raw image of the work can be obtained. This is an example of the first observation mode.

The exemplary images obtained in these manner are shown in FIG. 27. FIG. 27(a) is a slit light image containing no surface image of the work, FIG. 27(b) is a work surface image containing no slit light image, and FIG. 27(c) is an image formed by superimposing the slit light image and the work surface image.

Figure 28:
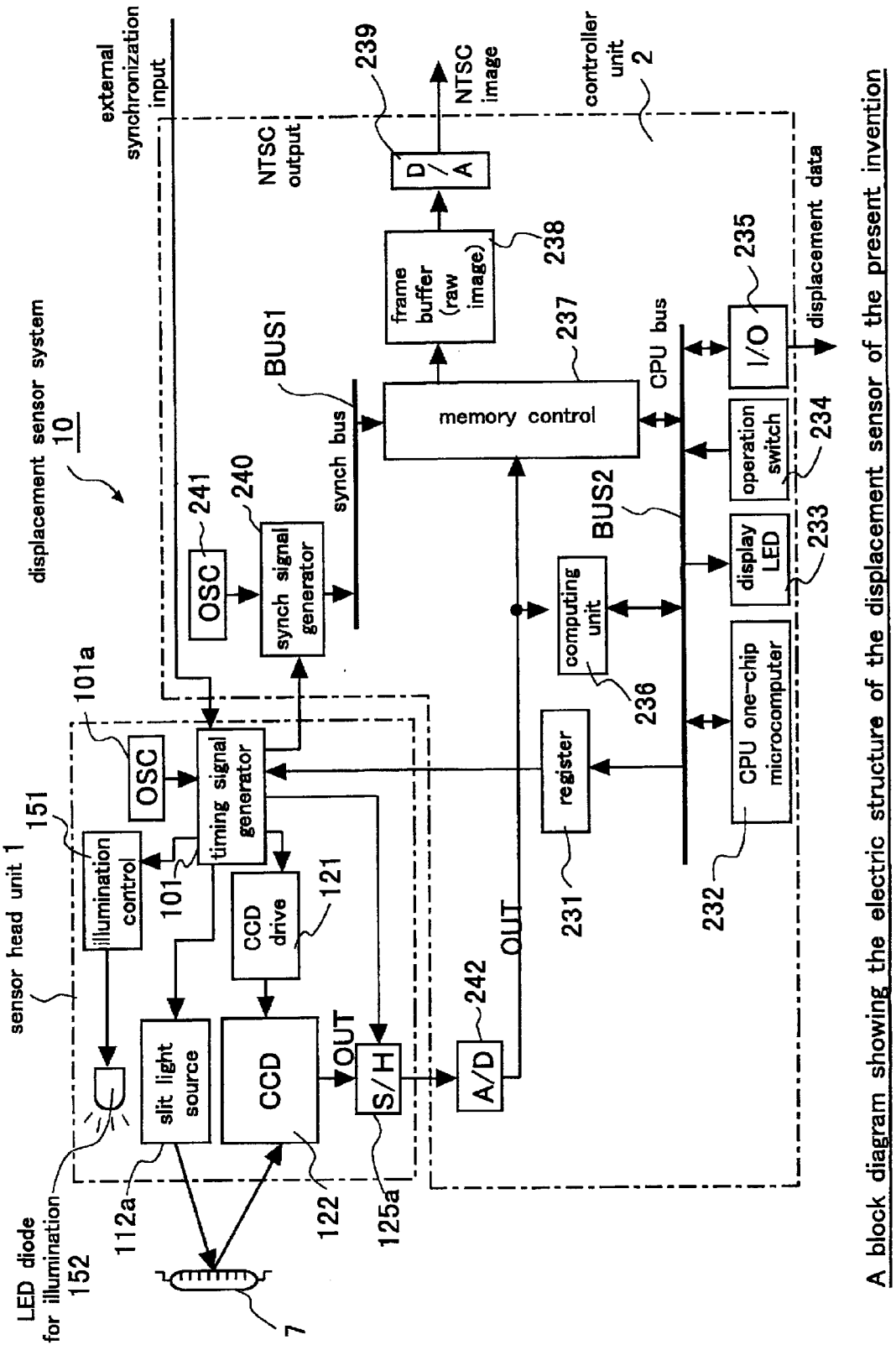
FIG. 28 is a block diagram showing the electric structure of the displacement sensor of the present invention.
Figure 29:
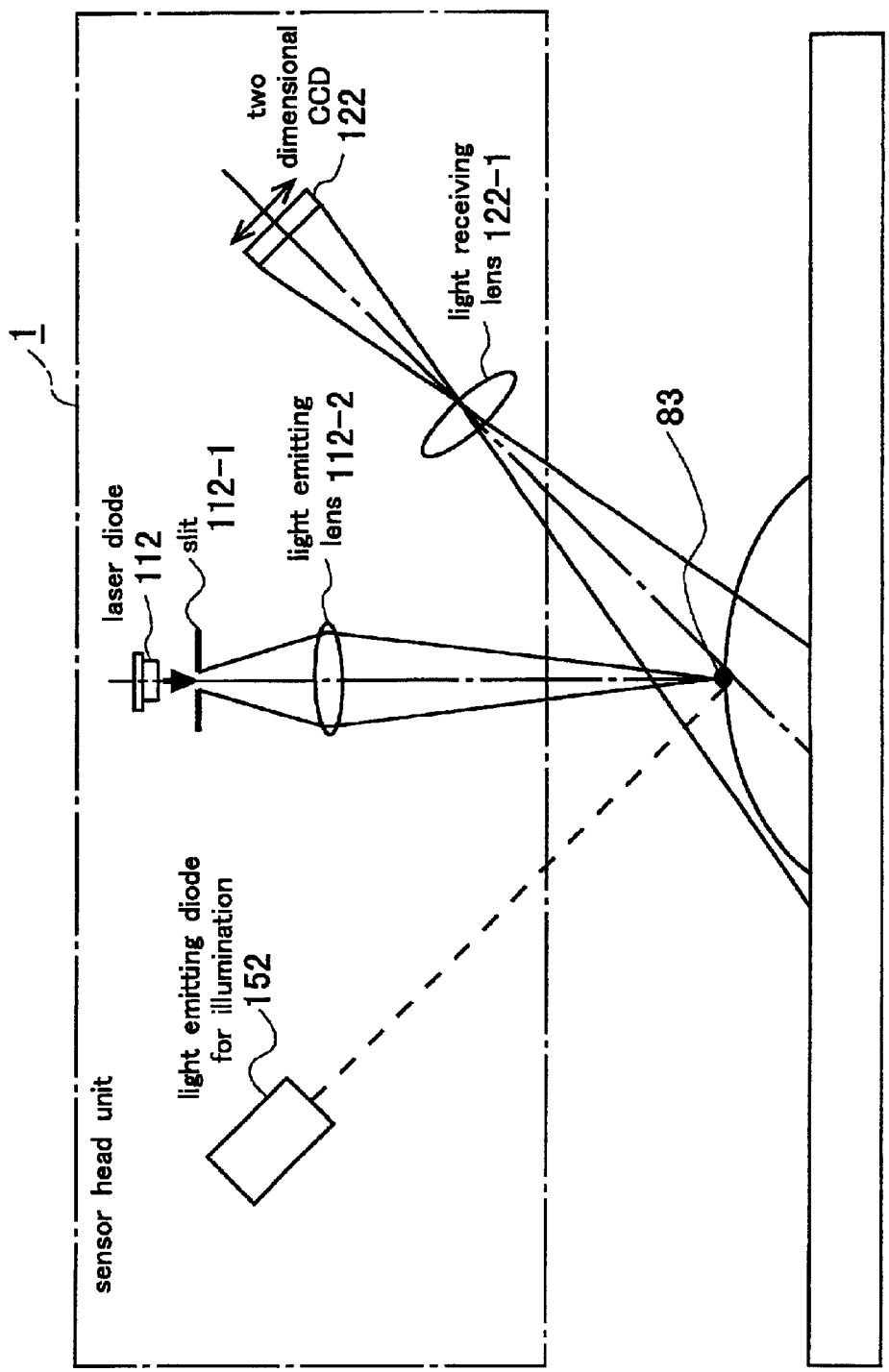
FIG. 29 is a diagram showing the optical system of the sensor head of the displacement sensor of the present invention.
Figure 30:
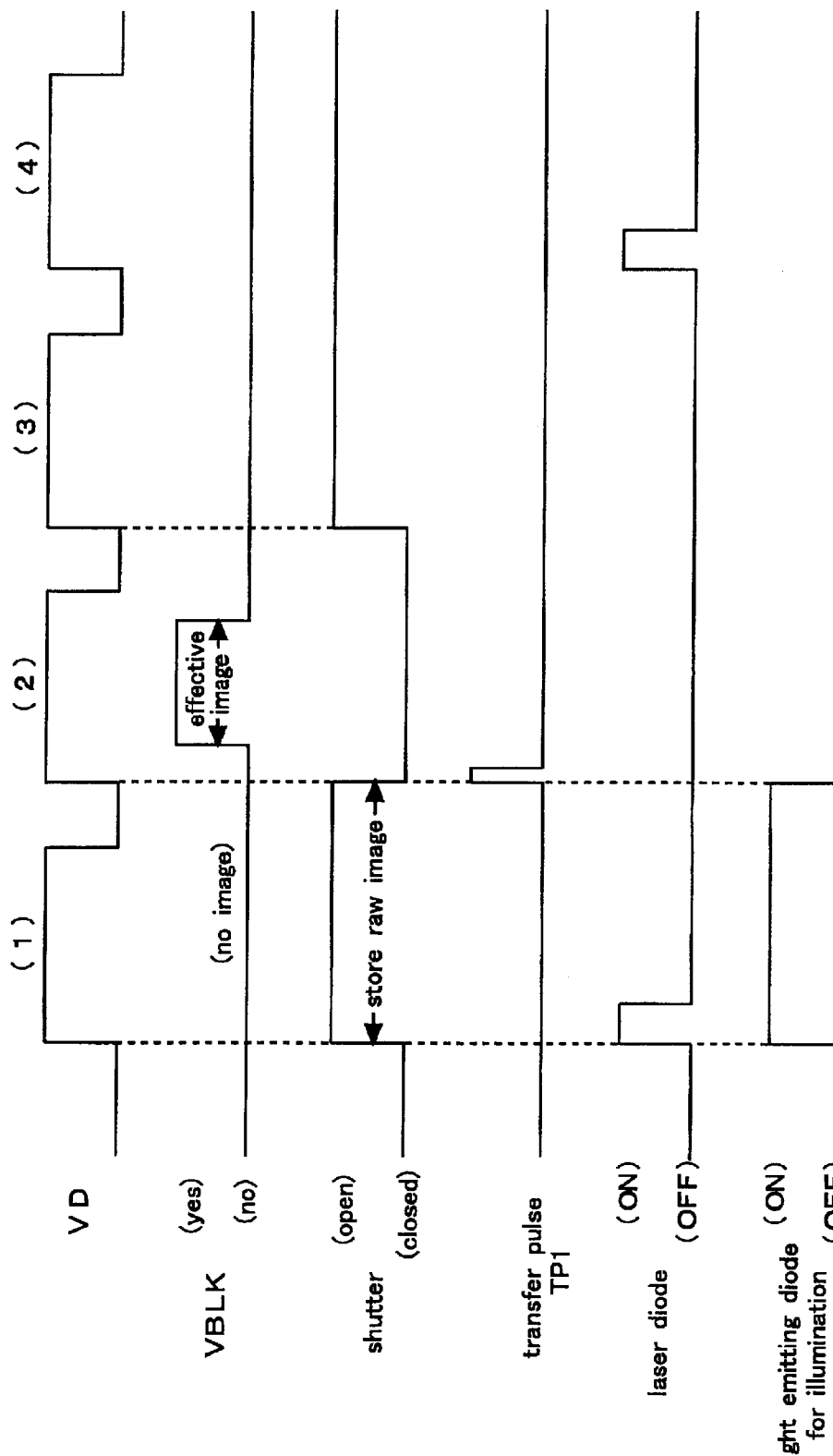
FIG. 30 is a time chart showing the process of superimposing a slit light image and a work surface image.

When the surrounding environment is dark, it is preferable to illuminate the work surface. Such examples are shown in FIGS. 28 to 30. As shown in the block diagram of FIG. 28, the sensor head unit 1 is additionally incorporated with an illumination control unit 151 and an illumination light emitting diode 152. As shown in FIG. 29, the illuminating light emitting diode 152 is installed in the sensor head unit 1 to illuminate the measurement object 7.

The timing of the illumination light emitting diode 152 is shown in FIG. 30. Upon the start of the first cycle (1), the shutter opens and the laser diode 112 is powered ON for a short time period. At the same time, the illumination light emitting diode 152 is lighted. Thereafter, the illumination light emitting diode 152 is lighted up continually during the first cycle (1). Upon completion of the first cycle (1), the shutter closes, and the transfer pulse TP1 is produced at the same time so that the electric charges accumulated in the pixel during the first cycle (1) are transferred to the vertical shift register VR, and are produced as the effective image. According to this embodiment, because of the addition of the illumination by the illuminating light emitting diode 152, the brightness of the work surface is increased, and a work surface image having a sufficient brightness can be obtained during a shutter period only worth a single cycle.

Thus, according to this embodiment, by appropriately combining the open period of the shutter and the lighting time period of the illuminating light emitting diode 152, the slit light image, work surface image and an image formed by superimposing them can be obtained at will to allow the measurement state to be monitored. Furthermore, because the imaging device can be used for both measurement and monitoring purposes, the monitoring function can be achieved at low cost. Moreover, the monitoring image is obtained from the same view angle as the measurement image, it is possible to determine the cause of a measurement failure (such as the existence of external light) from the superimposed image.

Figure 31:
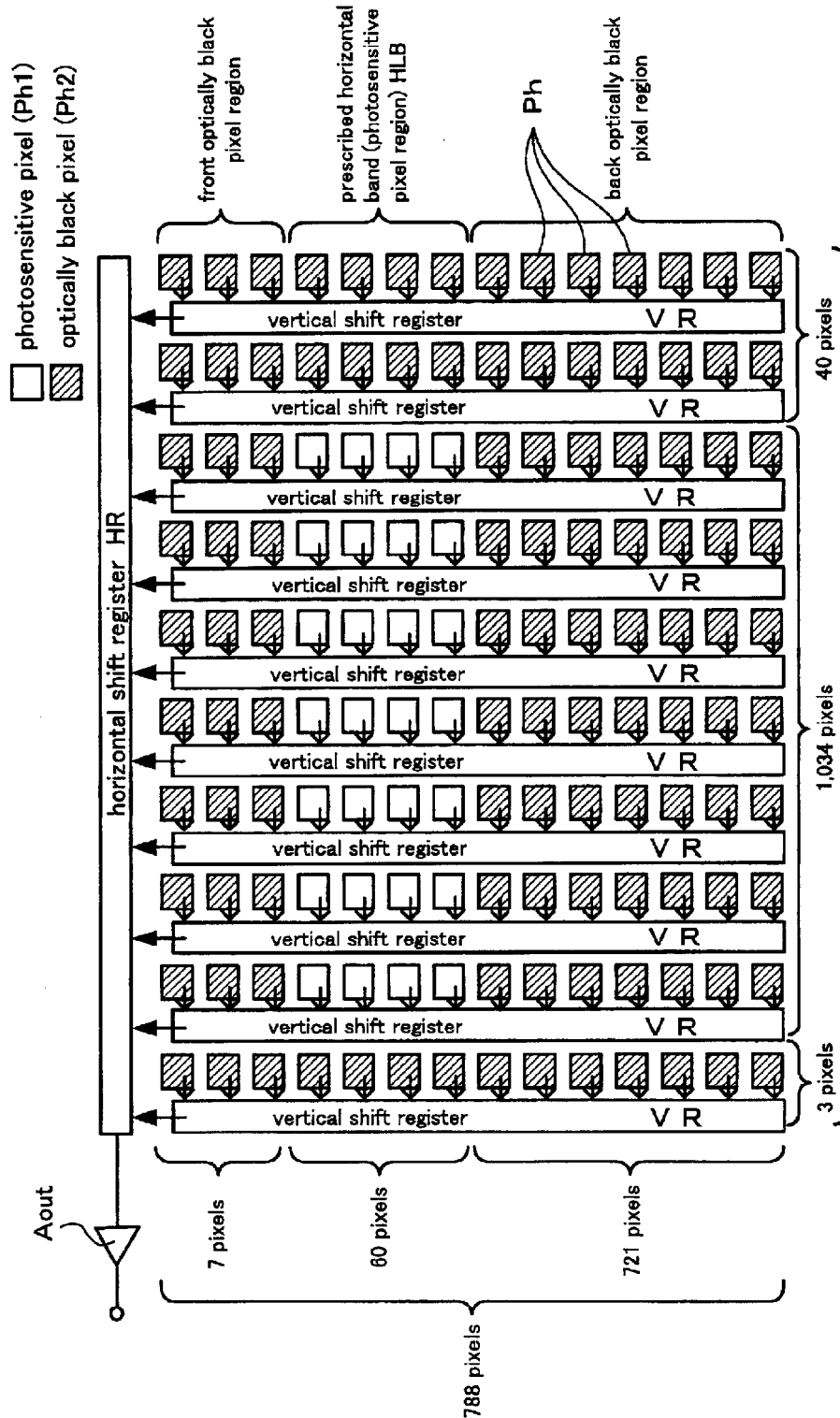
FIG. 31 is a schematic view showing the pixel arrangement on the light receiving surface of the imaging device used in the sensor head unit of the present invention.

The CCD 121 shown in FIGS. 24 and 28 is provided with a novel structure proposed by the inventors. FIG. 31 schematically illustrates an exemplary arrangement of pixels on the light receiving surface of the CCD imaging device. It should be noted that the size of each pixel is somewhat exaggerated in the drawing.

In the drawing, Ph denotes each of a group of light receiving pixels arranged into a matrix of 788 in the vertical direction and 1,077 in the horizontal direction corresponding to the field of view of a digital still camera which is a standard imaging device, VR denotes vertical shift registers for vertically transferring the output of the light receiving pixels Ph for each column, HR denotes a horizontal shift register for receiving electric charges forwarded from the vertical shift registers VR for various columns and transferring them in the horizontal direction, and Aout denotes an output buffer for externally producing the charges transferred from the horizontal shift register HR.

Of the light receiving pixels Ph, those light receiving pixels Ph2 hatched in the drawing are so-called optically black pixels (OB pixels), and those light receiving pixels Ph1 not hatched in the drawing are photosensitive pixels. These light receiving pixels Ph1 and Ph2 each essentially consist of a photo diode device. The vertical and horizontal shift registers VR and HR each essentially consist of a CCD device.

As mentioned earlier, the optically black pixels Ph2 are those light receiving pixels which are shielded from light with a light shield mask, and would not accumulate electric charges when exposed to light, or prevent the accessing of the accumulated electric charges resulting from exposure to light, and the output of these pixels is kept at a prescribed dark level (corresponding to substantially zero electric charges) without regard to the amount of received light. The photosensitive pixels Ph1 consist of regular light receiving pixels without any such modification, and the output of these pixels is at a bright level corresponding to the amount of received light.

A selected pixel can be turned into an optically black pixel Ph2 instead of a photosensitive pixel Ph1 in a number of possible ways. As a first method, the photoelectrical transducer (such as a photo diode, a photo transistor or the like) forming the selected light receiving pixel may be covered with a light shield mask. More specifically, the light shield mask can be formed during the semiconductor manufacturing process by forming an opaque metallic mask over the photo diode forming the light receiving pixel. Alternatively, the light shield mask can be formed by attaching an opaque mask (aluminum foil, for instance) on the light receiving surface of the device following the completion of the semiconductor manufacturing process (such as immediately after purchasing the semiconductor product).

As a second method, the selected pixel may be prevented from receiving light or converting light into electricity by changing the device structure of the photodiode itself which forms the pixel during the semiconductor manufacturing process.

As a third method, the path of transferring electric charges from the photodiode forming the pixel to the vertical shift register can be cut off during the semiconductor manufacturing process.

No matter which of the first to third methods is selected, a substantial saving in both design cost and design time can be gained as compared to the case of designing from scratch a special CCD having a relatively small number of horizontal lines (60 to 70 lines, for instance) to suit an elongated rectangular field of view for measurement. It is also possible to combine the first to third methods.

Referring back to FIG. 31, the light receiving pixels arranged in a matrix include a first group of pixels belonging to a prescribed horizontal band HLB and having a substantially smaller number of lines (60 lines) than the entire number of horizontal lines (788 lines), and a second group of pixels not belonging to the prescribed horizontal band HLB.

More specifically, in this example, the 60 horizontal lines starting from the eighth horizontal line and ending at the 67th line from the top are defined as the prescribed horizontal band HLB, and the pixels belonging to this prescribed horizontal band HLB are defined as the first pixel group. The pixels belong to the seven horizontal lines starting from the top line and ending at the seventh horizontal line, and the 721 horizontal lines starting from the 68th horizontal line and ending at the bottom or the 788th horizontal line are defined as the second pixel group.

All of or most of the pixels Ph forming the first pixel group consist of photosensitive pixels Ph1, and all or most of (all of in this embodiment) the pixels Ph forming the second pixel group consist of optically black pixels Ph2.

More specifically, of the pixels forming the 60 horizontal lines forming the prescribed horizontal band HLB, those pixels belong to the three vertical lines adjacent to the left edge of the screen and the 40 vertical lines adjacent to the right edge of the screen all consist of optically black pixels Ph2. The pixels belonging to the remaining 1,034 vertical lines intermediate between the leftmost three vertical lines and the rightmost 40 vertical lines all consist of photosensitive pixels Ph1. As a result, the region of the photosensitive pixels (60 lines×1,024 columns) is surrounded by the optically black pixels so that the profile of the effective image region is clearly defined.

Figure 32:
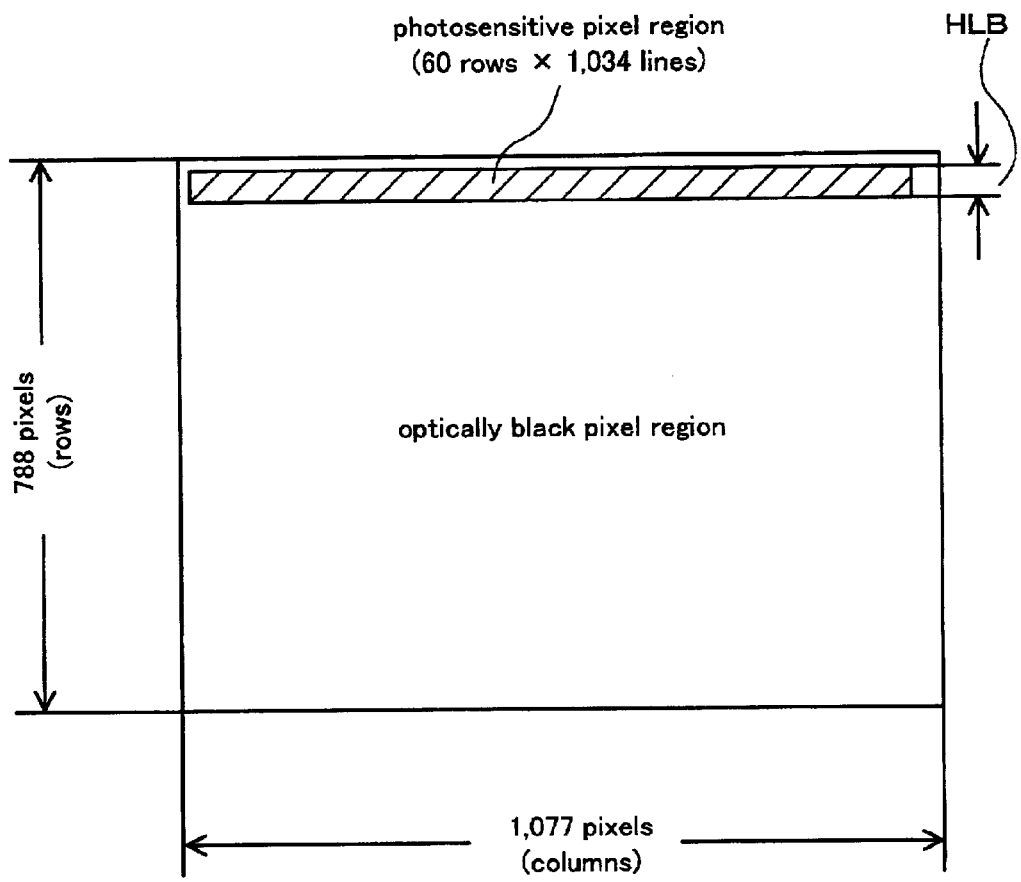
FIG. 32 is a diagram showing the relationship between the photosensitive pixel region and optically black pixel region of the imaging device of the sensor head unit of the present invention in an actual aspect ratio.

The photosensitive pixel region and optically black pixel region in this CCD imaging device are shown in FIG. 32 which represents the actual aspect ratio of the screen. The drawing clearly shows that the photosensitive pixel region (60 lines×1,024 columns) is only a small part of the entire light receiving surface (788 lines×1,077 columns). It is also shown that the prescribed horizontal band HLB forming the photosensitive pixel region is placed adjacent to the uppermost part of the screen where the horizontal shift register HR is located. It is further shown a large part of the light receiving surface is occupied by the optically black pixel region (788 lines×1,077 columns).

Figure 33:
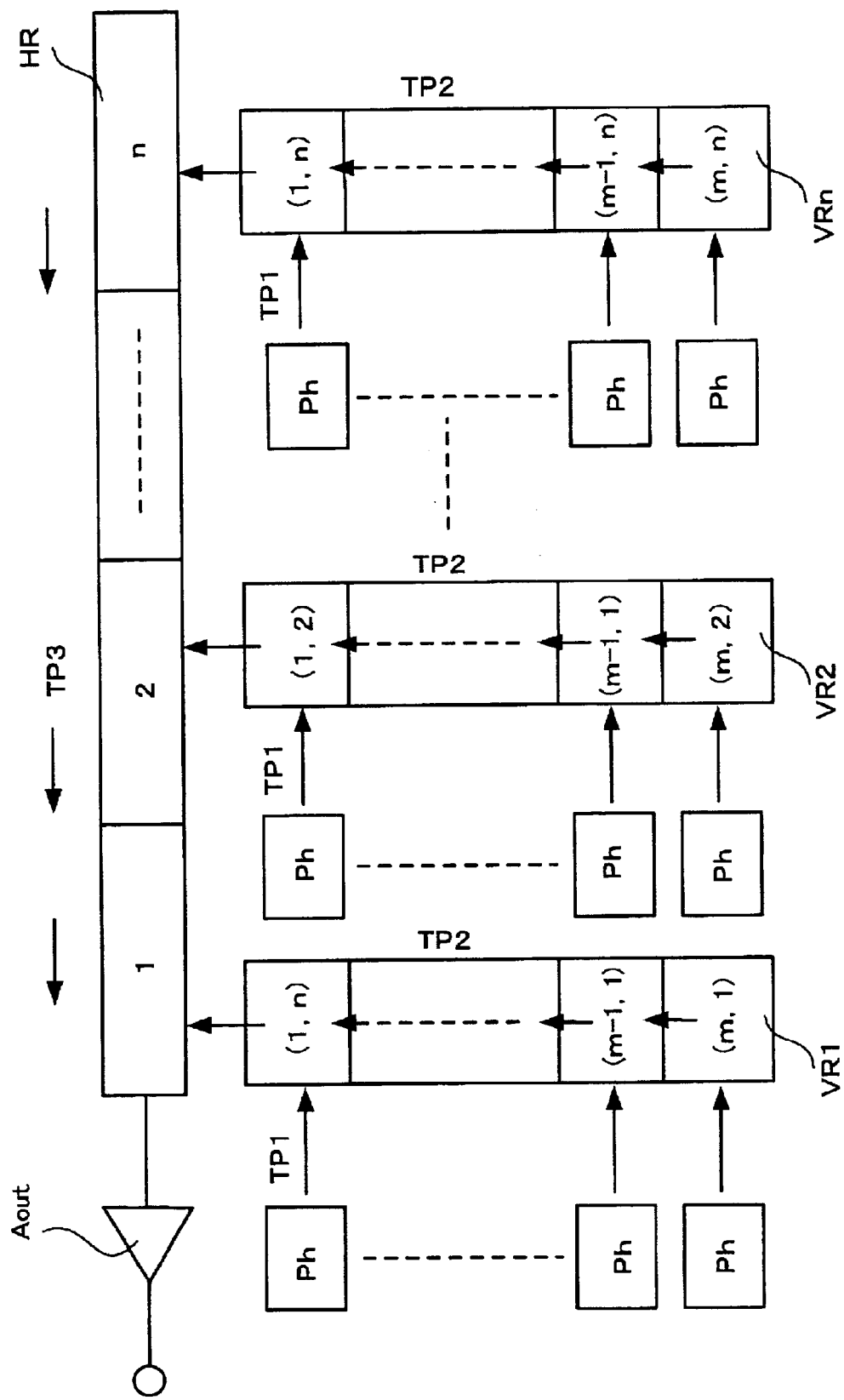
FIG. 33 is a block diagram illustrating the electric charge transfer circuit of the imaging device.

Referring to FIG. 33, in a CCD imaging device of this kind, when a train of first transfer pulses TP1 are given from outside, the output of the light receiving pixels Ph belonging to each vertical line (the electric charges accumulated during the time the electronic shutter is open in the case of photosensitive pixels Ph1, and substantially zero electric charges corresponding to the prescribed dark level in the case of optically black pixels Ph2) is transferred to the corresponding stages of the adjacent vertical shift register VR. When a train of second transfer pulses TP2 are given from outside, each vertical shift register VR is shifted by one stage upward as seen in the drawing, and the electric charges stored in the top stage of each vertical shift register VR are transferred to the corresponding stage of the horizontal shift register HR. When a train of third transfer pulses TP3 are given from outside, the horizontal shift register HR is shifted by one stage to the left as seen in the drawing, and the electric charges stored in the top stage of the horizontal shift register HR are drawn out from the output unit Aout.

The structure of the drive control unit of the CCD imaging device described above is now described in the following. This drive control unit comprises a timing signal generating unit 101 and a CCD drive 121 as described in connection with FIGS. 24 and 28. The timing signal generating unit 101 is incorporated with a transfer pulse generating unit PG (FIG. 34) and a transfer control unit (see the flowchart of FIG. 38).

The transfer control unit is designed to determine how many lines of image data should be transferred during the period of one horizontal line, and if image data should be produced to outside by drawing a number of third transfer pulses TP3 corresponding to the number of pixels of a single horizontal line during the period of each horizontal line. The determined number of transfer lines are converted into two-bit transfer line number signals L1 and L2, and the presence or absence of the external output is converted into an external output present/absent signal OE, and is forwarded to the transfer pulse generating unit PG.

The data structures of the transfer line number signals L1 and L2 for each number of transfer lines and external output present/absent signal are shown in FIGS. 37(a) and 37(b). As shown in the drawing, codes "00", "10", "01" and "11" are allocated to transfer line numbers 1, 2, 4 and 7, respectively, and the upper bit and lower bit of these codes are defined as L1 and L2, respectively. The output present/absent signal OE is defined as "0" for the absence and "1" for the presence of the TP3 output.

Figure 34:
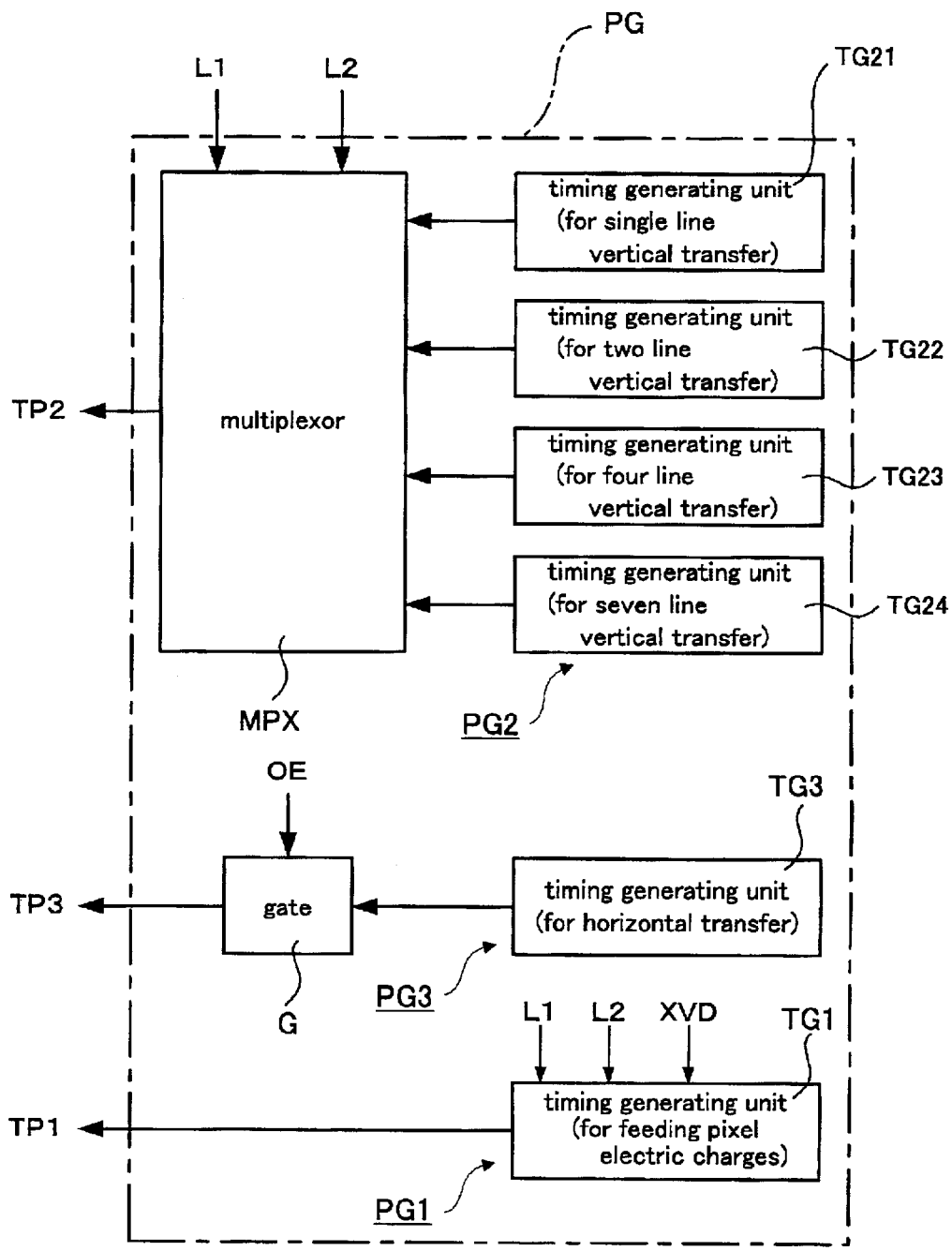
FIG. 34 is a diagram showing the internal structure of the transfer pulse generating unit.

The internal structure of the generating unit incorporated in the transfer pulse generating unit PG for generating the first, second and third transfer pulses TP1, TP2 and TP3 is illustrated in FIG. 34. The first transfer pulse generating unit PG1 includes a timing generating unit TG1 for generating a train of first transfer pulses TP1 for transferring pixel charges in response to a vertical period start command XVD that is given from outside.

The second transfer pulse generating unit PG2 includes four timing generating units TG21, TG22, TG23 and TG24 and a multiplexer MPX for selectively drawing out a pulse train from each of the timing generating units TG21 to TG24.

Figure 35:
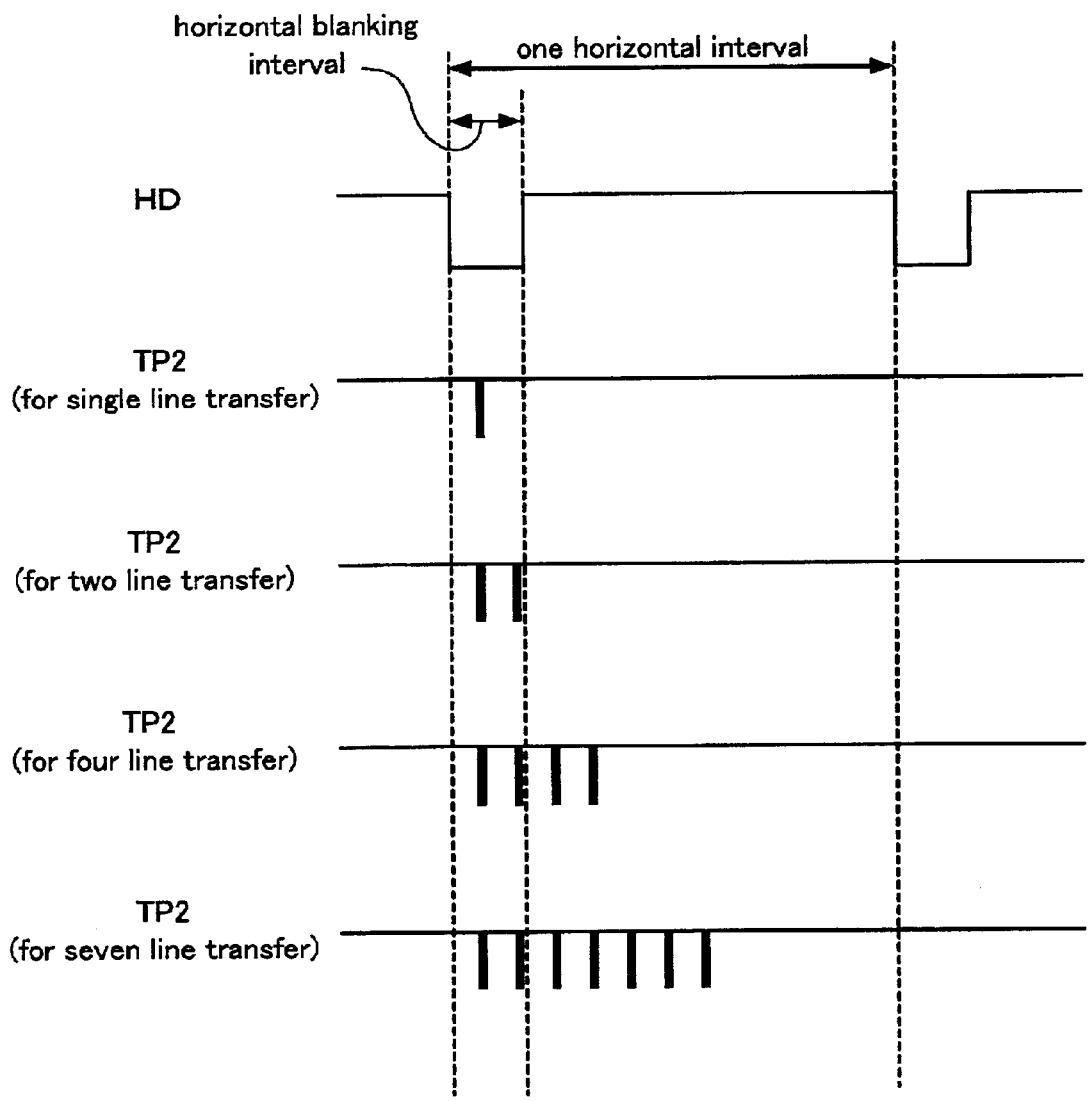
FIG. 35 is a time chart showing the output mode of the transfer pulse (TP2)

The timing generating units TG21 to TG24 are used for transferring one, two, four and seven lines, respectively, and produce second transfer pulses TP2 corresponding to the corresponding number of transfer lines during a period identical to the horizontal period of the normal video standard. The output mode of transfer pulses TP2 from each of the timing generating units TG21 to TG24 is illustrated in FIG. 35.

As shown in the drawing, the timing line generating unit TG21 for transferring one line produces one pulse during a horizontal blanking period. The timing line generating unit TG22 for transferring two lines produces two pulses during a horizontal blanking period. The timing line generating unit TG23 for transferring four lines produces two pulses during a horizontal blanking period and two pulses outside the horizontal blanking period. The timing line generating unit TG24 for transferring seven lines produces two pulses during a horizontal blanking period and five pulses outside the horizontal blanking period.

The multiplexer MPX selects one of the timing generating units TG21 to TG24 corresponding to the number of transfer lines indicated by the transfer line number signals L1 and L2, and the signal input path of the selected timing generating unit is connected to the output path of the CCD imaging device 122. As a result, the output pulse of the selected timing generating unit is selected as the transfer pulse TP2 which is supplied to the CCD imaging device 122.

Although not shown in the drawing, the generating unit for the first transfer pulse TP1 similarly consists of four timing generating units for the corresponding numbers of transfer lines and a multiplexer. Whereas the timing generating unit for transferring one line produces each pulse signal according to the timing of a normal video standard, the timing generating units for two, four and seven transfer lines produce a pulse for each output period for the charges of a single frame determined by the number of transfer lines.

By the multiplexer similarly selecting the timing generating unit corresponding to the transfer line signals L1 and L2, the output pulse of the selected timing generating unit is produced as the transfer pulses TP1 which is then fed to the CCD imaging device 122.

The third transfer pulse generating unit PG3 comprises a timing generating unit TG3 for generating third transfer pulses TP3 by a number corresponding to the pixels in one line, and a gate circuit G for controlling if the third transfer pulses TP3 should be produced or not in response to the output present/absent signal OE. The gate G opens when the output present/absent signal OE is "1", and the gate G closes when the output present/absent signal OE is "0".

As described earlier in connection with FIG. 31, in the CCD imaging device 122 of the illustrated embodiment, the 60 lines ranging over the eighth to 67th lines consist of photosensitive pixel region (effective image region) and the 720 lines ranging over the first to seventh lines and the 68th to 788th lines in the top and backs, respectively, consist of optically black pixel region (ineffective image region). To achieve a highly responsive visual measurement device, the image data (signal charges) for each screen frame is required to be read out as quickly as possible without destroying the data in the effective image region.

According to the high speed image reading system of the present invention, the drive control unit is adapted to repeat the processes, including a signal charge receiving process for receiving signal charges from the light receiving pixels Ph to the vertical shift registers VR1 to VRn in each column at the beginning of each vertical period, a front optically black pixel region handling process for dropping the signal charges in the vertical shift registers VR1 to VRn of each column that were received from the front optically black pixel region into the horizontal shift register HR, and a photosensitive pixel region handling process for reading out the signal charges in the vertical shift registers VR1 to VRn of each column that were received from the photosensitive pixel region to the outside by appropriately associating the transfer of the vertical shift registers VR1 to VRn in each column and the transfer of the horizontal shift register HR, without intervening a back optically black pixel region handling process for dropping the signal charges in the vertical shift registers VR1 to VRn of each column that were received from the back optically black pixel region into the horizontal shift register HR. As a result, the cycle of reading each screen frame can be reduced by an amount corresponding to the omission of the back optically black pixel region handling process.

The signal charge receiving process (A) consists of a process of receiving signal charges from the light receiving pixels Ph (m, n) to the vertical shift registers VR1 to VRn in each column at the beginning of each vertical period.

The front optically black pixel region handling process (B) consists of a process of dropping the signal charges in the vertical shift registers VR1 to VRn of each column that were received from the front optically black pixel region (first to seventh lines) into the horizontal shift register HR.

The photosensitive pixel region handling process (C) consists of a process of reading out the signal charges in the vertical shift registers VR1 to VRn of each column that were received from the photosensitive pixel region (eighth to 67th lines) to the outside by appropriately associating the transfer of the vertical shift registers VR1 to VRn in each column and the transfer of the horizontal shift register HR.

The back optically black pixel region handling process (D) consists of a process of dropping the signal charges in the vertical shift registers VR1 to VRn of each column that were received from the back optically black pixel region (68th to 788th lines) into the horizontal shift register HR.

In this embodiment, the front optically black pixel region handling process (B) includes the action of a consecutive vertical transfer of seven stages for each horizontal period. This action of a consecutive vertical transfer of seven stages for each horizontal period is continued while the transfer of the horizontal shift register is suspended during this horizontal period (see FIGS. 39 and 40).

The photosensitive pixel region handling process (C) comprises the process of performing the action of a consecutive vertical transfer of two stages and the action of a consecutive horizontal transfer of a number stages corresponding to the number of pixels in each horizontal line in a time shift for each horizontal period. As described hereinafter, in the illustrated embodiment, the action of a consecutive vertical transfer of two stages is performed during the horizontal blanking period (see FIGS. 39 and 41).

An exemplary transfer protocol table (which is stored in a register 109 as described hereinafter) that is used in this high speed image reading out system is shown in FIG. 36. As shown in the drawing, this transfer protocol table stores the transfer line number and the set value for indicating the presence/absence of output for each of the horizontal period counter value indicating the corresponding horizontal line number in the form of the transfer line signals L1 and L2.

In this example, the vide signal corresponding to the front optically black pixel region is consecutively transferred by seven lines during a single horizontal period, and the video signal corresponding to the photosensitive pixel region is transferred by two lines during each horizontal period. Therefore, the number of transfer lines during the first horizontal period is seven, and the number of transfer lines during each of the second to 31st horizontal periods is two. The presence or absence of output by horizontal transfer is "no" during the first horizontal period, and "yes" during each of the second to 31st horizontal periods.

Figure 38:
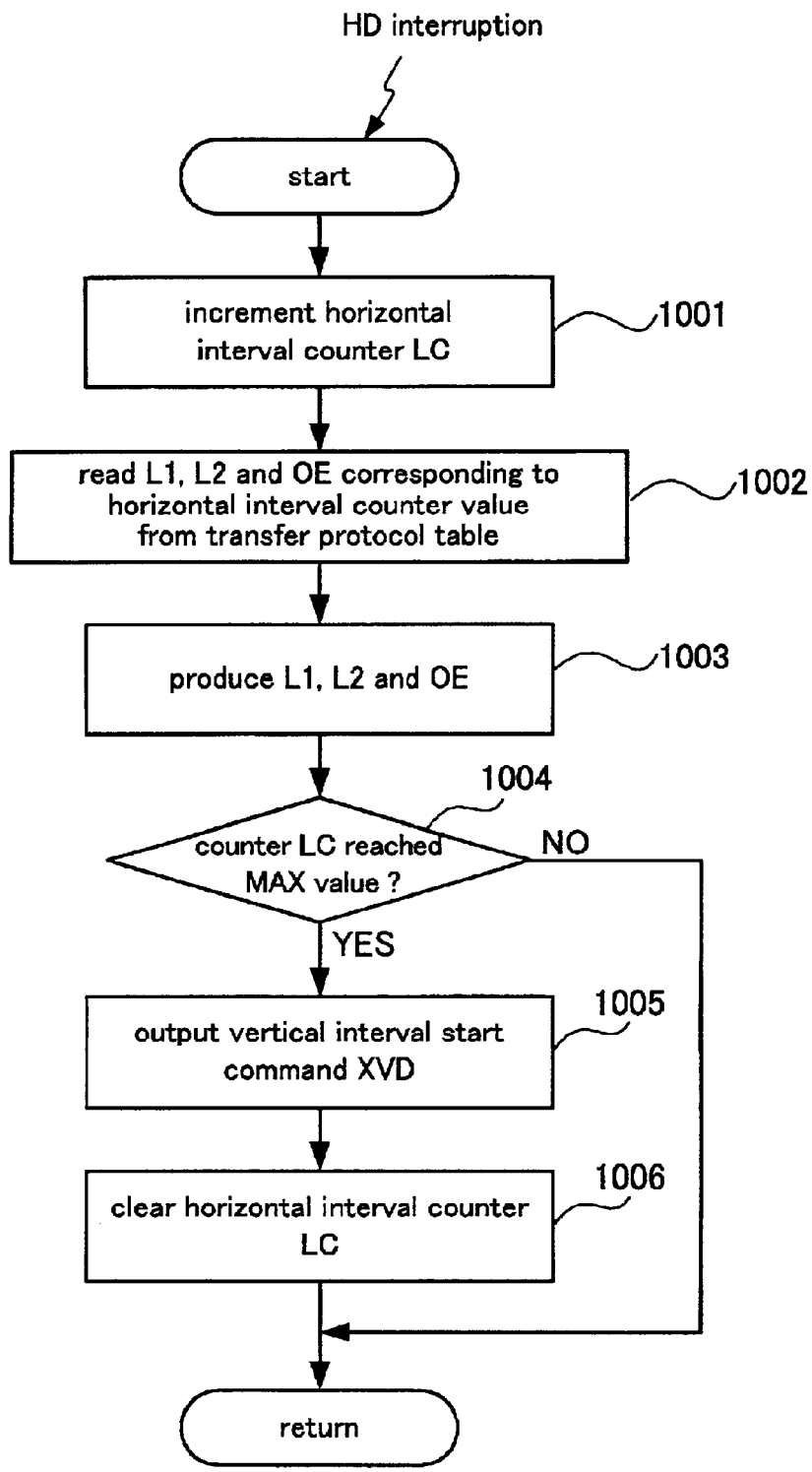
FIG. 38 is a flow chart showing the operation of the transfer control unit.

The transfer control unit (the operation of which is shown in the flowchart of FIG. 38) reads out the set values for the transfer line number signals L1 and L2 and the output presence/absence signal OE stored in the transfer protocol table for each of the horizontal periods, set the transfer line number signals L1 and L2 and the output presence/absence signal OE to appropriate levels corresponding to the set values, and forward them to the transfer pulse generating unit 2. The transfer pulse generating unit 2 determines the output timing of the first transfer pulses according to the MAX value (31 in FIG. 36) of the horizontal period counter value in the transfer protocol table. (In other words, the transfer pulses TP1 are produced at the period of 31/788 of the vertical period of the video standard.)

The transfer pulse generating unit 2 determines the output number of the second transfer pulses TP2 and the presence/absence of the third transfer pulses TP3 according to the transfer line number signals L1 and L2 and the output presence/absence signal OE given by the transfer control unit to start a series of control actions for the CCD imaging device 122 for each horizontal period.

The controller unit 2 is provided with a structure to determine the transfer line numbers and presence/absence of output from the transfer protocol table according to the contents of image processing that is required for the particular measurement.

The outline of the transfer control process that is executed in the transfer control unit is shown in the flow chart of FIG. 38. This transfer control process is initiated in response to the arrival of a horizontal period start signal HD (see FIG. 39) from the transfer pulse generating unit 2. The following series of actions are cyclically repeated according to the value of the horizontal period counter LC incorporated in the transfer control unit.

Suppose that the horizontal period counter LC is cleared. When a horizontal period start signal HD arrives under this condition, the process shown in FIG. 38 is started, and the value of the horizontal period counter LC is incremented from "0" to "1" (step 1001).

When the value of the horizontal period counter LC is "1", the transfer protocol table is looked up by using the count value "1" as the index, and the transfer line number signals L1 and L2 and the set value of the output presence/absence signal OE are read out accordingly. As can be seen from the conversion table of FIG. 37, the transfer line number is "7", and the external output by horizontal transfer is "no" (step 1002).

Figure 39:
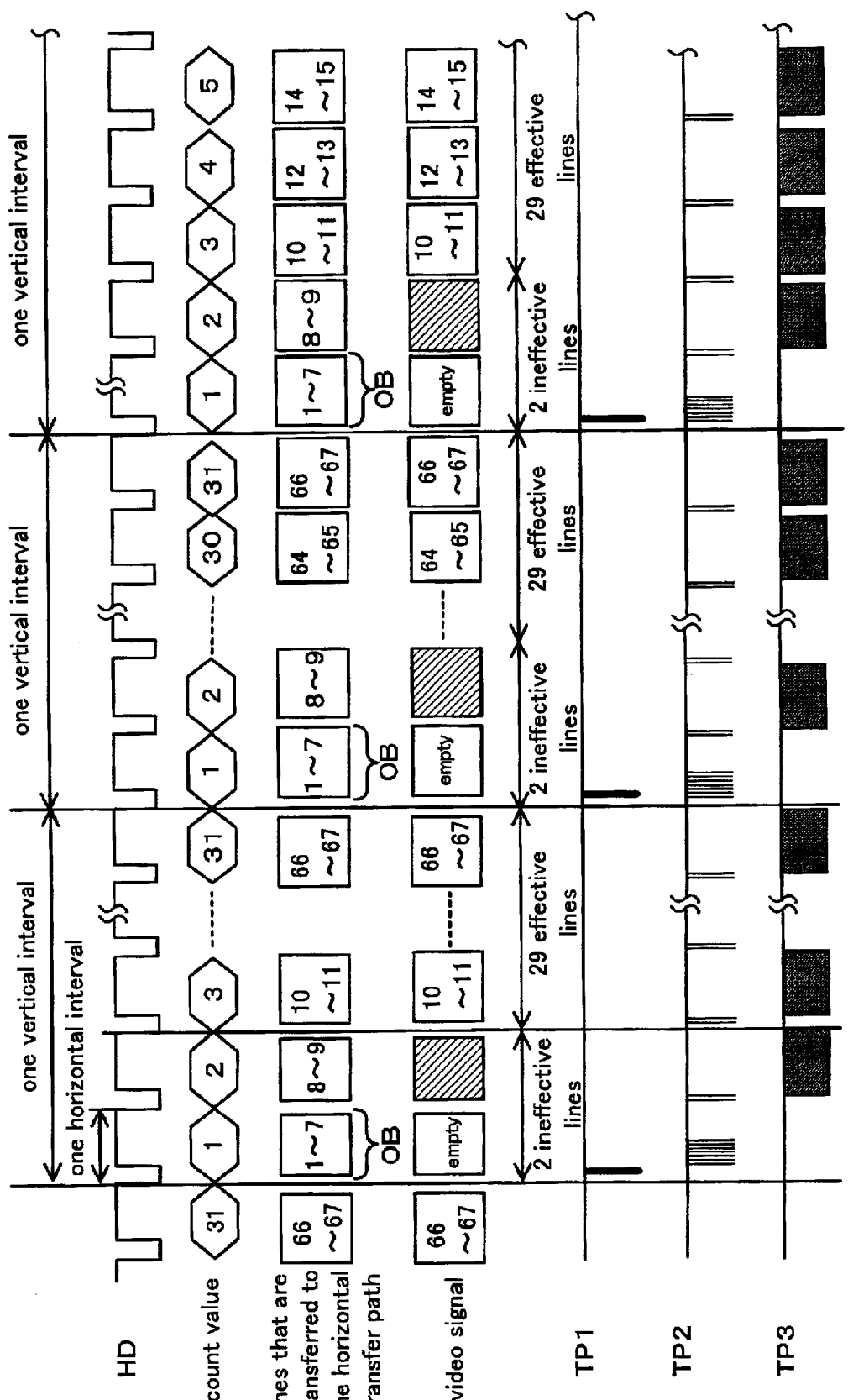
FIG. 39 is a time chart showing an exemplary drive mode of the imaging device.
Figure 40:
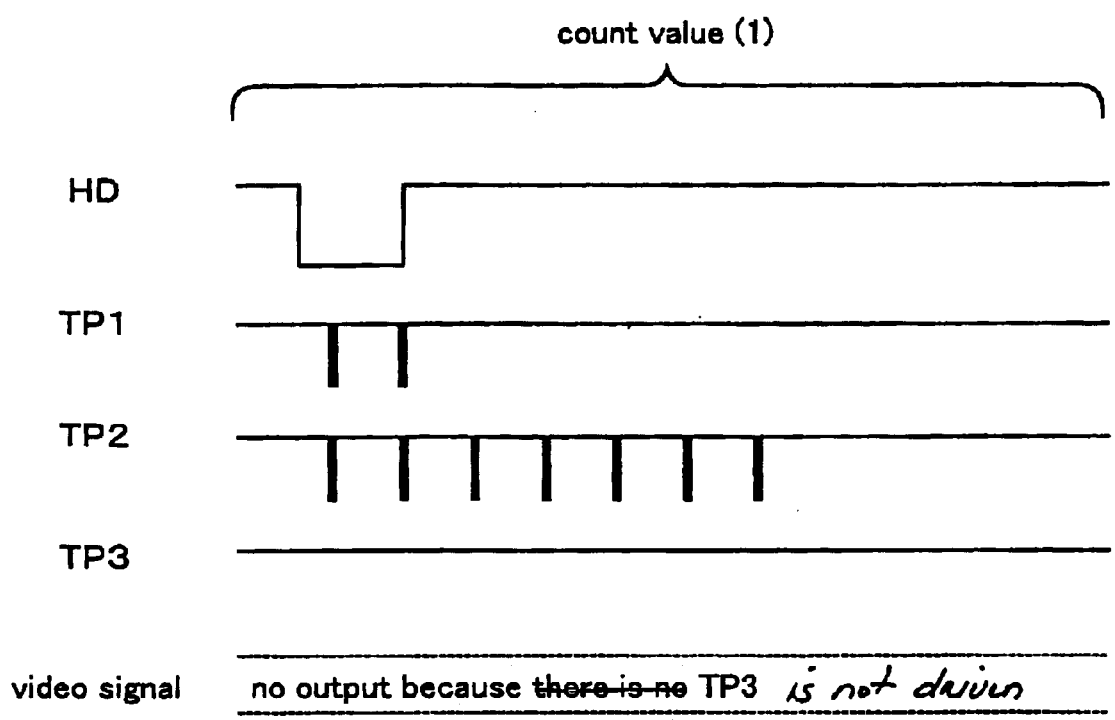
FIG. 40 is a view showing a part of the time chart of FIG. 39.

According to the contents of the set values read out from the transfer protocol table, the transfer line number signals L1 and L2 and the set value of the output presence/absence signal OE are set as L1=1, L2=1, and OE=0, respectively (step 1003). As shown in FIGS. 39 and 40, during the first horizontal period corresponding to count value "1", the third transfer pulses for horizontal transfer are not produced and only the second transfer pulses for vertical transfer are produced from the transfer pulse generating unit 2 by seven consecutive pulses. As a result, no output is produced in the video signals (blanks), and electric charges corresponding to the seven lines ranging from the first to seventh line are dropped into each stage of the horizontal shift register HR. Thereafter, the process is concluded (step 1004 no), and becomes the state for awaiting the arrival of the next horizontal period start signal HD.

When a second horizontal period start signal HD arrives, the process shown in FIG. 38 is started, and the value of the horizontal period counter LC is incremented from "1" to "2" (step 1001).

When the value of the horizontal period counter LC is "2", the transfer protocol table is looked up by using the count value "2" as the index, and the transfer line number signals L1 and L2 and the set value of the output presence/absence signal OE are read out accordingly. As can be seen from the conversion table of FIG. 36, the transfer line number is "2", and the external output by horizontal transfer is "yes" (step 1002).

According to the contents of the set values read out from the transfer protocol table, the transfer line number signals L1 and L2 and the set value of the output presence/absence signal OE are set as L1=0, L2=1, and OE=1, respectively (step 803). As shown in FIGS. 39 and 40, during the second horizontal period corresponding to count value "2", the second transfer pulses TP2 for vertical transfer are produced from the transfer pulse generating unit 2 by two pulses during the horizontal blanking period and upon completion of the horizontal blanking period, the third transfer pulses TP3 for horizontal transfer are produced by a number corresponding to the number of pixels in the horizontal line.

When two second transfer pulses are produced during a horizontal blanking period, electric charges for the two lines or lines 8 and 9 are dropped into the various stages of the horizontal register HR on top of the electric charges for the seven lines ranging from the first to seventh lines so that electric charges for the nine lines ranging from the first to ninth lines are overlaid as a whole. Thereafter, when the third transfer pulses TP3 for horizontal transfer corresponding to the number of pixels in a single horizontal line are produced, the overlaid charges worth the nine lines are produced into the video signal. As shown by the part hatched in FIG. 39 and surrounded by a dotted line in FIG. 41, the overlaid charges worth the nine lines are treated as an OB ineffective video signal. As a result, the first two lines in the vide signal becomes an ineffective part of the image. Then, the process is concluded (step 1004 no), and becomes the state for awaiting the arrival of the next horizontal period start signal.

When a third horizontal period start signal HD arrives, the process shown in FIG. 38 is started, and the value of the horizontal period counter LC is incremented from "2" to "3" (step 1001).

When the value of the horizontal period counter LC is "3", the transfer protocol table 15 is looked up by using the count value "3" as the index, and the transfer line signal number signals L1 and L2 and the set value of the output presence/absence signal OE are read out accordingly. As can be seen from the conversion table of FIG. 36, the transfer line number is again "2", and the external output by horizontal transfer is "yes" (step 1002).

Figure 41:
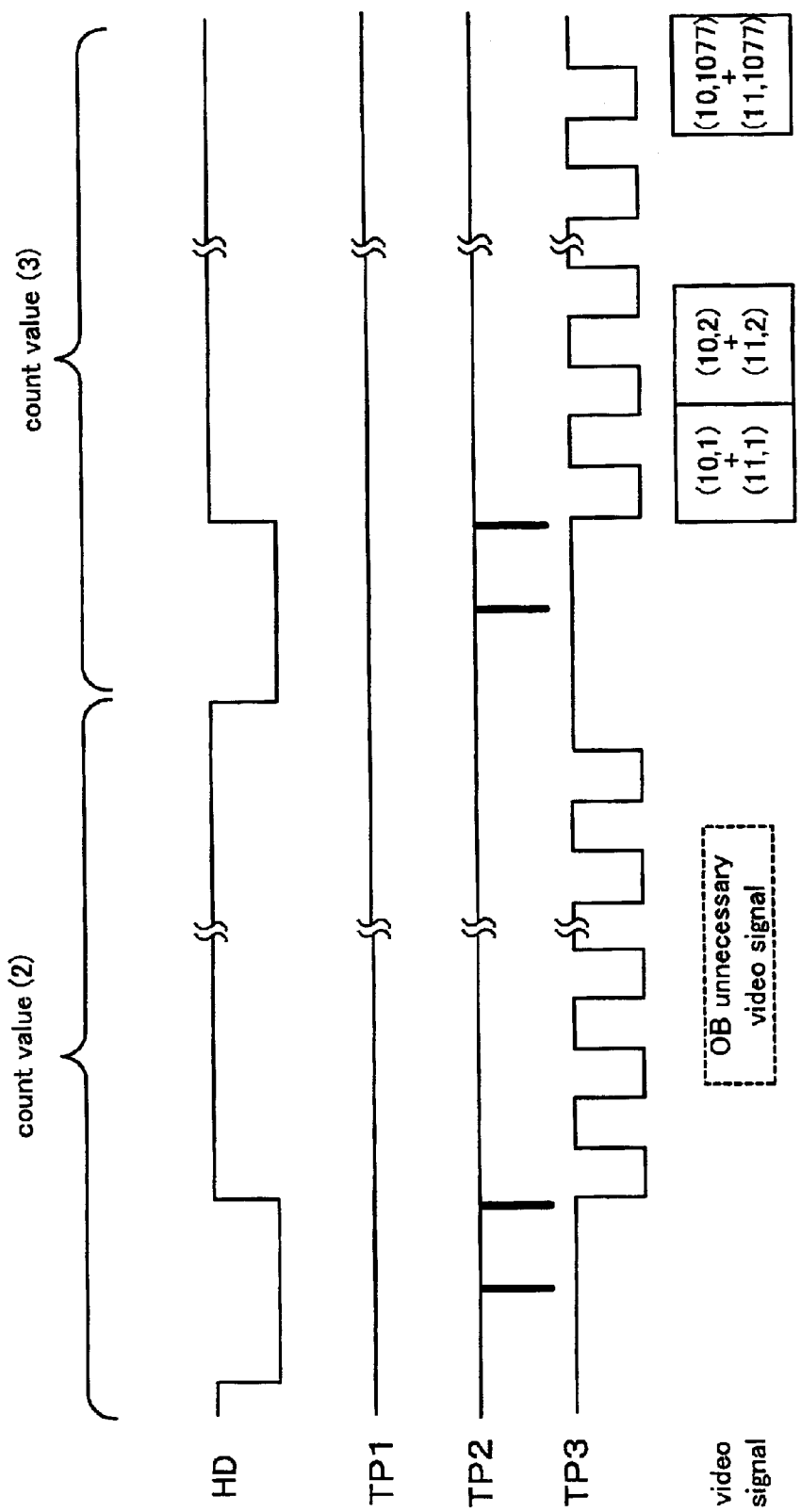
FIG. 41 is a view showing a part of the time chart of FIG. 39.

According to the contents of the set values read out from the transfer protocol table, the transfer line number signals L1 and L2 and the set value of the output presence/absence signal OE are set as L1=0, L2=1, and OE=1, respectively (step 1003). As shown in FIGS. 39 and 41, during the third horizontal period corresponding to count value "3", the second transfer pulses TP2 for vertical transfer are produced from the transfer pulse generating unit 2 by two pulses during the horizontal blanking period and upon completion of the horizontal blanking period, the third transfer pulses TP3 for horizontal transfer are produced by a number corresponding to the number of pixels in the horizontal line.

When two second transfer pulses are produced during a horizontal blanking period, electric charges for the two lines or lines 10 and 11 are dropped into the various blank stages of the horizontal register HR. At this time, electric charges on each stage are accounted for by the two lines laid one over the other, but the features of the original image still remain to a large extent. Thereafter, when the third transfer pulses TP3 for horizontal transfer corresponding to the number of pixels in a single horizontal line are produced, the overlaid charges worth the two lines are produced into the video signal. As shown in FIGS. 39 and 41, the overlaid charges worth the two lines or lines 10 and 11 are treated as an effective video signal.

The action upon arrival of the fourth to 31st horizontal period start signals HD is not different from that for the arrival of the third horizontal period start signal HD. Therefore, upon arrival of the fourth to 31st horizontal period start signals HD, as shown in FIGS. 39 and 41, video signals each having two lines, such as 12 and 13 lines, 14 and 15 lines, . . . , 66 and 67 lines, are sequentially produced.

When the 31st horizontal period start signal arrives, the value of the line counter LC reaches the maximum value (step 1004 yes), and the vertical period start command XVD is produced (step 1005). Then, the content of the horizontal period counter LC is cleared to "0" (step 1006). Upon receipt of this vertical period start command XVD, the first transfer pulses TP1 for retrieving pixel electric charges are produced from the transfer pulse generating unit 12, and while the signal charges for the 68th to 788th lines are left on the vertical shift registers VR1 to VRn, the process for the arrival of the first to 31st horizontal period start signal is repeated as described above.

When the transfer pulses TP1 for retrieving electric charges for the second line and thereafter, signal charges are again charged from the pixels of the received light pixels Ph (m, n) into the vertical shift registers VR1 to VRn. At this time, in the various stages of the vertical shift registers VR1 to VRn corresponding to the photosensitive pixel region, there should be electric charges that were transferred from the back optically black pixel region. However, because the electric charges from the back optically black pixel region are substantially zero so that the effective image would not be degraded due to "double exposure" even though the electric charges for the effective image are written over the electric charges for the back optically black pixel region. In other words, the writing over the back optically black pixel region would not cause a double exposure.

Therefore, according to this high speed image read out system, while the signal charges for the 68th to 788th lines are left on the vertical shift registers VR1 to VRn, the next image capturing can be started. Therefore, it is possible to accomplish what is called a high speed image capturing by increasing the video frames in a unit time.

The image data worth a single frame obtained by this high speed image read out system is shown in the table given in FIG. 42. As shown in the drawing, the two lines or line 1 and 2 account for the ineffective image part, and the 29 lines or lines 3 to 31 account for the effective image part.

At this time, because the image data for each frame can be retrieved in a 25th of the time required for doing the same with the conventional arrangement, the time required for inputting the image can be substantially reduced, and the processing efficiency can be increased. Furthermore, because the electric charges would not saturate on the horizontal shift register, the occurrence of smears due to the saturation of electric charges can be avoided, and the quality of the image in the effective image region can be ensured. Additionally, the precision of measurement can be ensured because the effective image region that requires a precise processing can be obtained as image data having a same resolution as that obtained by the regular video standard.

Then, the measurement result is compared with a predetermined reference value to determine the acceptability of the object. The result of such a measurement or determination process is produced to an external device such as a monitor via the output unit 23.

INDUSTRIAL APPLICABILITY

Thus, according to the present invention, the positional relationship between the measurement light radiated light image and the measurement object surface can be verified on the image monitor, and an accurate measurement is possible by radiating the measurement light precisely onto the intended measurement position.

What is claimed is:

1. A displacement sensor comprising a sensor head and a controller either integrally or separately;
   the sensor head comprising:
      a measurement light emitting optical system for emitting measurement light onto a measurement position of a measurement object from a prescribed angle;
      an image acquiring optical system for capturing an image by viewing the measurement position of the measurement object and a surrounding region from an angle different from that of the measurement light emitting optical system; and
      a two dimensional imaging device for photoelectrically convening an image obtained by the image acquiring optical system into a video signal corresponding to the image;
   the controller being adapted to control an imaging condition associated with a brightness of the image in the form of the video signal, and to operate under a measurement mode and an observation mode;

when the controller operates under the measurement mode, with a light source for measurement turned on, the imaging condition being adjusted in such a manner that a measurement light radiated light image can be imaged at an appropriate brightness but a surrounding part of the measurement object is substantially darker than the appropriate brightness, and a desired displacement being computed according to the video signal obtained by the two dimensional imaging device;

when the controller operates under the observation mode, the imaging condition being adjusted in such a manner that the measurement position and the surrounding part of the measurement object can be imaged both at an appropriate brightness, and an image of the measurement position on the surface of the measurement object and the surrounding region being displayed on the screen of an image monitor according the video signal obtained by the two dimensional imaging device.

2. A displacement sensor according to claim 1, wherein the imaging condition which is adjusted under the measurement mode includes the brightness control for the measurement light source and/or exposure time for the two dimensional imaging device.

3. A displacement sensor according to claim 1, wherein the controller under the observation mode is adapted to adjust the imaging condition in such a manner that the measurement light radiated light image is not imaged at all or substantially darker than the appropriate brightness.

4. A displacement sensor according to claim 3, wherein the imaging condition which is adjusted under the observation mode includes a turned on or turned off state of the measurement light source, the brightness control for the measurement light source and/or the exposure time for the two dimensional imaging device.

5. A displacement sensor according to claim 1, wherein the controller under the observation mode is adapted to adjust the imaging condition in such a manner that the measurement light source is turned on, and the measurement light radiated light image and the surrounding region are both imaged at an appropriate brightness.

6. A displacement sensor according to claim 5, wherein the imaging condition which is adjusted under the observation mode includes the brightness control for the measurement light source and/or the exposure time for the two dimensional imaging device.

7. A displacement sensor according to claim 1, wherein the observation mode includes a first observation mode and a second observation mode, the controller under the first observation mode adjusting the imaging condition in such a manner that a measurement light radiated light is not imaged at all or imaged substantially darker than an appropriate brightness, the controller under the second observation mode adjusting the imaging condition in such a manner that with the measurement light source turned on, and the measurement light radiated light image and the surrounding part of the measurement object can be both imaged at an appropriate brightness.

8. A displacement sensor according to claim 1, wherein the controller under the observation mode is adapted to repeatedly carry out one or a plurality of shots under the imaging condition where a measurement light radiated light image is not imaged at all or imaged substantially darker than an appropriate brightness, and one or a plurality of shots under the imaging condition where with the measurement light source turned on, and a measurement light radiated light image is imaged at an appropriate brightness but a surrounding surface of the measurement object is imaged substantially darker than an appropriate brightness, in an alternating manner.

9. A displacement sensor according to claim 8, wherein the controller is adapted to display the obtained image every time on the image monitor.

10. A displacement sensor according to claim 8, wherein the controller is adapted to display two images obtained under different imaging conditions one over the other on the image monitor.

11. A displacement sensor according to claim 1, wherein the controller is adapted to repeatedly carry out one or a plurality of shots under the measurement mode and one or a plurality of shots under the observation mode, in an alternating manner.

12. A displacement sensor according to claim 11, wherein the controller is adapted not to display an image obtained under the measurement mode but display an image obtained under the observation made.

13. A displacement sensor according to claim 11, wherein the controller is adapted to display one of an image obtained under the measurement made or an image obtained under the observation mode in a selective manner.

14. A displacement sensor according to any one of claim 1, wherein further comprising an illuminator for illuminating a measurement position on the measurement object and a surrounding region, the controller being adapted to turn on the illuminator under the observation mode.

15. A displacement sensor according to claim 14, wherein the imaging condition under the observation mode includes a brightness of the illuminator.

16. A displacement sensor according to any one of claim 1, wherein the image acquiring optical system comprises an oblique image acquiring optical system for capturing an image by viewing the measurement position of the measurement object and a surrounding region from an oblique angle, and a frontal image acquiring optical system for capturing an image by viewing the measurement position of the measurement object and the surrounding region from the front; and the two dimensional imaging device comprises a two dimensional oblique image imaging device for photoelectrically converting an image obtained via the oblique image acquiring optical system and a two dimensional frontal image imaging device for photoelectrically converting an image obtained via the frontal image acquiring optical system;

the controller under the measurement mode being adapted to compute a desired displacement according to a video signal from the two dimensional oblique image imaging device while the controller under the observation mode is adapted to display the measurement point of the measurement object and the surrounding region according a video signal from the two dimensional frontal image imaging device.

17. A displacement sensor according to claim 16, wherein the controller is additionally adapted to operate under an image processing mode for computing a length or area on a surface of the measurement object by suitably adjusting a magnification factor of an image obtained by the frontal image acquiring optical system according a displacement computed from an oblique image obtained by the oblique image acquiring optical system.

18. A displacement sensor according to any one of claim 1, wherein the image acquiring optical system comprises an oblique image acquiring optical system for capturing an image by viewing the measurement position of the measurement object and a surrounding region from an oblique angle, and a frontal image acquiring optical system for capturing an image by viewing the measurement position of the measurement object and the surrounding region from the front;

the two dimensional imaging device is used commonly for the two image acquiring optical systems.

19. A displacement sensor according to claim 18, wherein the two dimensional imaging device is placed at an intersection of light paths of the frontal image acquiring optical system and the oblique image acquiring optical system.

20. A displacement sensor according to claim 19, wherein an exit light axis of the measurement light emitting optical system and an incident light axis of the oblique image acquiring optical system are arranged symmetrically at a same inclination angle, and the two dimensional imaging device is placed on an extension of an incident light axis of the frontal image acquiring optical system, the oblique image acquiring optical system comprising a light axis refracting mechanism for refracting an incident light axis onto the two dimensional imaging device.

21. A displacement sensor according to claim 20, wherein the light axis refracting mechanism is adapted in such a manner that light images formed on a light receiving surface of the two dimensional imaging device via the oblique image acquiring optical system and via the frontal image acquiring optical system move in a same direction on the light receiving surface of the two dimensional imaging device for a given change in the measurement displacement.

22. A displacement sensor according to claim 18, further comprising shutter means for selectively shutting off one of a first light path reaching the imaging device via the oblique image acquiring optical system or a second light path reaching the imaging device via the frontal image acquiring optical system either manually or electrically, so that the light path for the frontal image acquiring optical system is shut off under the measurement mode and the light path for the oblique image acquiring optical system is shut off under the observation mode.

23. A displacement sensor according to claim 18, further comprising:
an illuminator for illuminating a measurement position of a measurement object and a surrounding region;
a first optical filter having a band pass property for substantially permitting the passage of the measurement light provided in a first light path reaching the imaging device via the oblique image acquiring optical system; and
a second optical filter having a band pass property for substantially permitting the passage of the illuminating light provided in a second light path reaching the imaging device via the frontal image acquiring optical system;
the controller under the observation mode being adapted to turn on the illuminator.

24. A displacement sensor according to claim 18, wherein the controller is additionally adapted to operate under an image processing mode for computing a length or area on a surface of the measurement object by suitably adjusting a magnification factor of an image obtained by the frontal image acquiring optical system according a displacement computed from an oblique image obtained by the oblique image acquiring optical system.

25. A sensor head for an optical displacement sensor comprising:
a measurement light emitting optical system for emitting measurement light onto a measurement position of an measurement object from a prescribed angle;
an oblique image acquiring optical system for capturing an image by viewing the measurement position of the measurement object and a surrounding region from an oblique angle;
a frontal image acquiring optical system for capturing an image by viewing the measurement position of the measurement object and the surrounding region from the front; and
a two dimensional imaging device for photoelectrically converting an oblique image obtained by the oblique image acquiring optical system and a frontal image obtained by the frontal image acquiring optical system into a video signal corresponding to the images; wherein
the oblique image acquiring optical system and the frontal image acquiring optical system comprise a single, two-dimensional imaging device which is common to the oblique image acquiring optical system and the frontal image acquiring optical system.

26. A sensor head for an optical displacement sensor according to claim 25, wherein the two dimensional imaging device is placed at an intersection of light paths of the frontal image acquiring optical system and the oblique image acquiring optical system.

27. A sensor head for an optical displacement sensor according to claim 26, wherein an exit light axis of the measurement light emitting optical system and an incident light axis of the oblique image acquiring optical system are arranged symmetrically at same inclination angle, and the two dimensional imaging device is placed on an extension of an incident light axis of the frontal image acquiring optical system, the oblique image acquiring optical system comprising a light axis refracting mechanism for refracting an incident light axis onto the two dimensional imaging device.

28. A sensor head for an optical displacement sensor according to claim 27, wherein the light axis refracting mechanism is adapted in such a manner that light images formed on a light receiving surface of the two dimensional imaging device via the oblique image acquiring optical system and via the frontal image acquiring optical system move in a same direction on the light receiving surface of the two dimensional imaging device for a given change in the measurement displacement.

29. A sensor head for an optical displacement sensor according to any one of claim 25, further comprising shutter means for selectively shutting off one of a first light path reaching the two dimensional imaging device via the oblique image acquiring optical system and a second light path reaching the imaging device via the frontal image acquiring optical system in an alternative manner either manually or remotely.

30. A sensor head for an optical displacement sensor according to any one of claim 25, further comprising an illuminator for illuminating a measurement position of a measurement object and a surrounding region.

31. A sensor head for an optical displacement sensor according to claim 30, further comprising a first optical filter having a band pass property for substantially permitting the passage of the measurement light provided in a first light path reaching the imaging device via the oblique image acquiring optical system; and
a second optical filter having a band pass property for substantially permitting the passage of the illuminating light provided in a second light path reaching the imaging device via the frontal image acquiring optical system.

* * * * *